(12) United States Patent
　　　 Park

(10) Patent No.: US 12,585,082 B2
(45) Date of Patent: Mar. 24, 2026

(54) LENS DRIVING DEVICE, AND CAMERA MODULE AND OPTICAL DEVICE INCLUDING SAME

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 866 days.

(21) Appl. No.: 17/759,142

(22) PCT Filed: Jan. 19, 2021

(86) PCT No.: PCT/KR2021/000719
§ 371 (c)(1),
(2) Date: Jul. 20, 2022

(87) PCT Pub. No.: WO2021/149992
PCT Pub. Date: Jul. 29, 2021

(65) Prior Publication Data
US 2023/0038190 A1　　Feb. 9, 2023

(30) Foreign Application Priority Data

Jan. 20, 2020　　(KR) ........................ 10-2020-0007413

(51) Int. Cl.
*G03B 5/00*　　　(2021.01)
*G02B 7/02*　　　(2021.01)
(Continued)

(52) U.S. Cl.
CPC ................ G02B 7/08 (2013.01); G02B 7/02 (2013.01); G02B 27/646 (2013.01); G03B 5/00 (2013.01);
(Continued)

(58) Field of Classification Search
CPC .......... G02B 7/08; G02B 7/02; G02B 27/646; G03B 5/00; G03B 2205/0007; G03B 2205/0053; G03B 2205/0069
See application file for complete search history.

(56) References Cited

U.S. PATENT DOCUMENTS

2011/0262122 A1　　10/2011　Minamisawa et al.
2015/0331250 A1*　11/2015　Terajima .................. G03B 3/10
　　　　　　　　　　　　　　　　　　　359/557
(Continued)

FOREIGN PATENT DOCUMENTS

EP　　　　3 521 923 A1　　8/2019
JP　　2014-126668 A　　7/2014
(Continued)

OTHER PUBLICATIONS

Office Action dated Mar. 7, 2025 in Korean Application No. 10-2020-0007413.
(Continued)

*Primary Examiner* — George G. King
*Assistant Examiner* — Natasha Nigam
(74) *Attorney, Agent, or Firm* — Saliwanchik, Lloyd & Eisenschenk

(57)　　　　　ABSTRACT

One embodiment comprises: a housing; a bobbin arranged in the housing; a first coil arranged on the bobbin; a magnet, which is arranged in the housing and corresponds to the first coil; an upper elastic member coupled to the top of the bobbin and the top of the housing; a second coil, which is arranged below the housing and corresponds to the magnet in the optical axis direction; a circuit board including a body arranged below the second coil, and a connective elastic part extending from the body; a base arranged below the body of the circuit board; and a support member having one end coupled to the upper elastic member, and having the other end coupled to the connective elastic part, wherein the (Continued)

connective elastic part includes a coupling part coupled to the other end of the support member, and a connection part for connecting the body and the coupling part.

20 Claims, 33 Drawing Sheets

(51) Int. Cl.
    *G02B 7/08*         (2021.01)
    *G02B 27/64*      (2006.01)

(52) U.S. Cl.
    CPC ................ *G03B 2205/0007* (2013.01); *G03B 2205/0053* (2013.01); *G03B 2205/0069* (2013.01)

(56)             References Cited

U.S. PATENT DOCUMENTS

2016/0187671 A1*   6/2016   Park ....................... H04N 23/54
                                                 359/557

2016/0191754 A1*   6/2016   Cho ....................... H04N 23/57
                                                 348/357
2017/0146773 A1    5/2017   Park
2019/0011614 A1*   1/2019   Park ....................... H04N 23/54

FOREIGN PATENT DOCUMENTS

| KR | 10-2015-0042681 | A | | 4/2015 | |
|---|---|---|---|---|---|
| KR | 10-2015-0054719 | A | | 5/2015 | |
| KR | 10-2016-0054636 | A | | 5/2016 | |
| KR | 20160054636 | A | * | 5/2016 | ............. H04N 23/54 |
| KR | 10-2019-0023761 | A | | 3/2019 | |
| KR | 10-2019-0031804 | A | | 3/2019 | |
| WO | 2018/186674 | A1 | | 10/2018 | |

OTHER PUBLICATIONS

International Search Report dated Apr. 29, 2021 in International Application No. PCT/KR2021/000719.
Office Action dated Aug. 13, 2024 in Japanese Application No. 2022-542425.
European Search Report dated Sep. 26, 2025 in European Application No. 25190436.3.

* cited by examiner

LENS DRIVING DEVICE, AND CAMERA MODULE AND OPTICAL DEVICE INCLUDING SAME

CROSS-REFERENCE TO RELATED APPLICATIONS

This application is the U.S. national stage application of International Patent Application No. PCT/KR2021/000719, filed Jan. 19, 2021, which claims the benefit under 35 U.S.C. § 119 of Korean Application No. 10-2020-0007413, filed Jan. 20, 2020, the disclosures of each of which are incorporated herein by reference in their entirety.

TECHNICAL FIELD

Embodiments relate to a lens moving apparatus, a camera module including the same, and an optical device.

BACKGROUND ART

Voice coil motor (VCM) technology, which is used in conventional general camera modules, is difficult to apply to a micro-scale camera module, which is intended to exhibit low power consumption, and study related thereto has been actively conducted.

There is increasing demand for, and production of, electronic products such as smart phones and cellular phones equipped with cameras. Cameras for cellular phones have been increasing in resolution and decreasing in size, and accordingly, an actuator therefor is also becoming smaller, larger in diameter, and more multifunctional. In order to realize a high-resolution cellular phone camera, improvement in the performance of the cellular phone camera and additional functions, such as auto-focusing, shutter shaking prevention, and zooming in and out, are required.

In addition, with the increasing demand for a cellular phone camera having enhanced functions and high resolution, the size of an image sensor and the aperture of a lens, which are mounted in a camera module, are increasing. Due to the increase in the aperture of the lens, when a vibration or impact is applied to a cellular phone, an OIS wire, which is included in a voice coil motor of the camera module, receives increased stress, and thus is deformed or disconnected, which may cause operation failure or deterioration in oscillation of an OIS of the camera module.

DISCLOSURE

Technical Problem

Embodiments provide a lens moving apparatus capable of alleviating or reducing the stress applied to a support member, a camera module including the same, and an optical device.

Technical Solution

A lens moving apparatus according to an embodiment may include a housing, a bobbin disposed in the housing, a first coil disposed on the bobbin, a magnet disposed in the housing so as to correspond to the first coil, an upper elastic member coupled to the upper portion of the bobbin and to the upper portion of the housing, a second coil disposed under the housing so as to correspond to the magnet in an optical-axis direction, a circuit board including a body disposed under the second coil and an elastic connection portion extending from the body, a base disposed under the body of the circuit board, and a support member having one end coupled to the upper elastic member and another end coupled to the elastic connection portion. The elastic connection portion may include a coupling portion coupled to the other end of the support member and a connection portion connecting the body to the coupling portion.

The elastic connection portion may extend from a corner of the body.

The base may include a stepped portion including a first surface having a first height difference from the upper surface of the base on which the body is disposed, and the elastic connection portion may be spaced apart from the first surface of the stepped portion, and may overlap the first surface of the stepped portion in the optical-axis direction.

The stepped portion may be formed at a corner region of the base, and the base may include a guide portion protruding from the first surface in the upward direction or the optical-axis direction to surround the corner region.

The circuit board may include a terminal portion extending from the body and including a terminal, and the elastic connection portion may conductively connect the support member to the terminal.

The length of the elastic connection portion in the optical-axis direction may be shorter than the length of the body in the optical-axis direction.

The connection portion may include a portion formed to decrease in width in a direction from the body toward the support member.

The elastic connection portion may be a leaf spring.

The lens moving apparatus may include a first damper disposed between the elastic connection portion and the body to connect the elastic connection portion to the body.

The lens moving apparatus may include a second damper disposed between the elastic connection portion and the first surface to connect the elastic connection portion to the first surface.

The body may include an extension portion extending toward the elastic connection portion and overlapping the first surface in the optical-axis direction, and the first damper may connect the extension portion of the body and the elastic connection portion to each other.

The extension portion may have a hole formed in one end thereof. The hole may include an opening, and at least part of the elastic connection portion may be disposed in the hole through the opening.

The body may include a first conductive layer disposed on the upper surface of the base, a second conductive layer disposed on the first conductive layer, and a first insulating layer disposed between the first conductive layer and the second conductive layer. The elastic connection portion may be a portion of one of the first conductive layer and the second conductive layer, which extends from the body.

Advantageous Effects

An embodiment includes an elastic connection portion provided on a circuit board, thereby alleviating or reducing the stress applied to a support member.

BEST MODE

Figure 1:
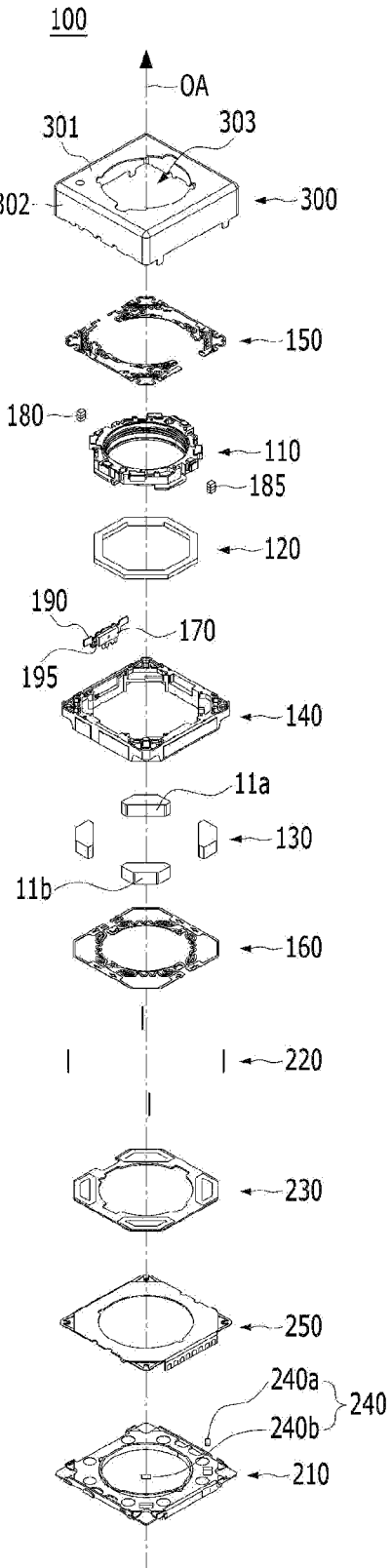
FIG. 1 is an exploded perspective view of a lens moving apparatus according to an embodiment.

Hereinafter, exemplary embodiments of the present disclosure will be described in detail with reference to the accompanying drawings.

The technical spirit of the disclosure is not limited to the embodiments to be described, and may be implemented in various other forms, and one or more of the components may be selectively combined and substituted for use without exceeding the scope of the technical spirit of the disclosure.

In addition, terms (including technical and scientific terms) used in the embodiments of the disclosure, unless specifically defined and described explicitly, are to be interpreted as having meanings that may be generally understood by those having ordinary skill in the art to which the disclosure pertains, and meanings of terms that are commonly used, such as terms defined in a dictionary, should be interpreted in consideration of the context of the relevant technology.

Further, the terms used in the embodiments of the disclosure are for explaining the embodiments and are not intended to limit the disclosure. In this specification, the singular forms may also include plural forms unless otherwise specifically stated in a phrase, and in the case in which "at least one (or one or more) of A, B, or C" is stated, it may include one or more of all possible combinations of A, B, and C.

In addition, in describing the components of the embodiments of the disclosure, terms such as "first", "second", "A", "B", "(a)", and "(b)" can be used. Such terms are only for distinguishing one component from another component, and do not determine the nature, sequence, or procedure of the corresponding constituent elements.

In addition, when it is described that a component is "connected", "coupled" or "joined" to another component, the description may include not only being directly "connected", "coupled" or "joined" to the other component but also being "connected", "coupled" or "joined" by another component between the component and the other component. In addition, in the case of being described as being formed or disposed "above (on)" or "below (under)" another component, the description includes not only the case where the two components are in direct contact with each other, but also the case where one or more other components are formed or disposed between the two components. In addition, when expressed as "above (on)" or "below (under)", it may refer to a downward direction as well as an upward direction with respect to one element.

Hereinafter, the "lens moving apparatus" may be referred to as a "lens moving unit", a "voice coil motor (VCM)", an "actuator" or a "lens moving device". Hereinafter, the "coil" may be referred to as a "coil unit" or a "coil portion", and the "elastic member" may be referred to as an "elastic unit" or a "spring".

In the following description, the "terminal" may be referred to as a "pad", an "electrode", a "conductive layer" or a "bonding portion".

For the convenience of description, although the lens moving apparatus according to an embodiment will be described using the Cartesian coordinate system (x, y, z), the lens moving apparatus may be described using some other coordinate systems, and the embodiments are not limited thereto. In the drawings, the X-axis direction and the Y-axis direction are directions perpendicular to the Z-axis direction, which is an optical-axis direction. The Z-axis direction, which is the direction of the optical axis OA, may be referred to as a "first direction", the X-axis direction may be referred to as a "second direction", and the Y-axis direction may be referred to as a "third direction".

The lens moving apparatus according to an embodiment may perform an "auto-focusing function". Here, the "auto-focusing function" serves to automatically focus an image of a subject on the surface of an image sensor.

In addition, the lens moving apparatus according to the embodiment may perform a "handshake correction function". Here, the "handshake correction function" may serve to inhibit the contour line of a captured image from being blurred due to vibration caused by shaking of the user's hand when capturing a still image.

Figure 2:
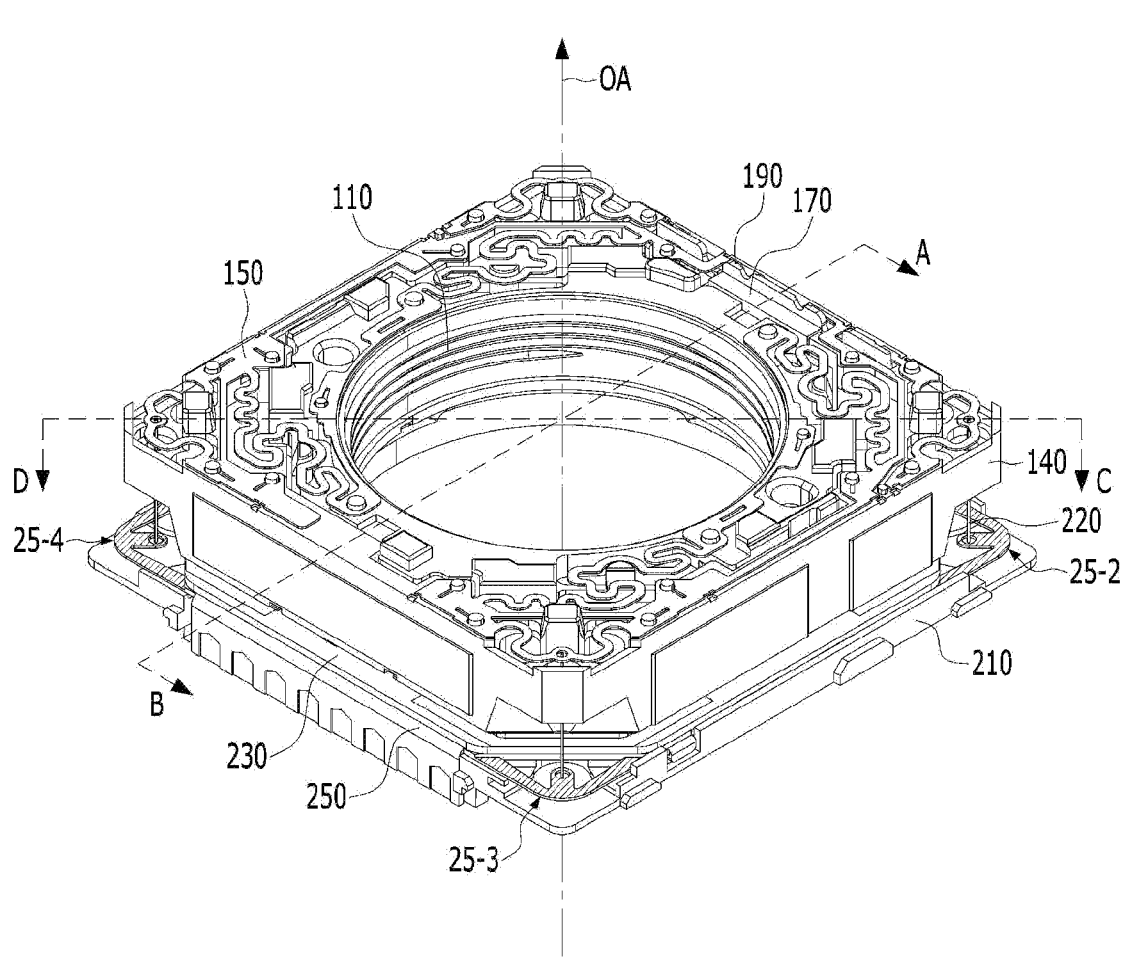
FIG. 2 is an assembled perspective view of the lens moving apparatus, from which the cover member in FIG. 1 is removed.

FIG. 1 is an exploded perspective view of a lens moving apparatus 100 according to an embodiment, and FIG. 2 is an assembled perspective view of the lens moving apparatus 100, from which the cover member 300 in FIG. 1 is removed.

Referring to FIGS. 1 and 2, the lens moving apparatus 100 includes a bobbin 110, a first coil 120, a first magnet 130, a housing 140, an upper elastic member 150, a lower elastic member 160, a base 210, a support member 220, a second coil 230, and a circuit board 250.

In addition, the lens moving apparatus 100 may further include a first position sensor 170, a circuit board 190, and a second magnet 180 in order to implement AF feedback. The circuit board 250 may be referred to as a "first circuit board", and the circuit board 190 may be referred to as a "second circuit board".

In order to perform the handshake correction function, the lens moving apparatus 100 may further include a second position sensor 240.

In addition, the lens moving apparatus 100 may further include a third magnet 185 and a cover member 300.

In addition, the lens moving apparatus 100 may further include a capacitor 195 mounted on the circuit board 190.

First, the bobbin 110 will be described.

The bobbin 110 may be disposed in the housing 140 so as to be movable in the direction of the optical axis OA or the first direction (e.g. the Z-axis direction) by the electromagnetic interaction between the first coil 120 and the first magnet 130.

Figure 3A:
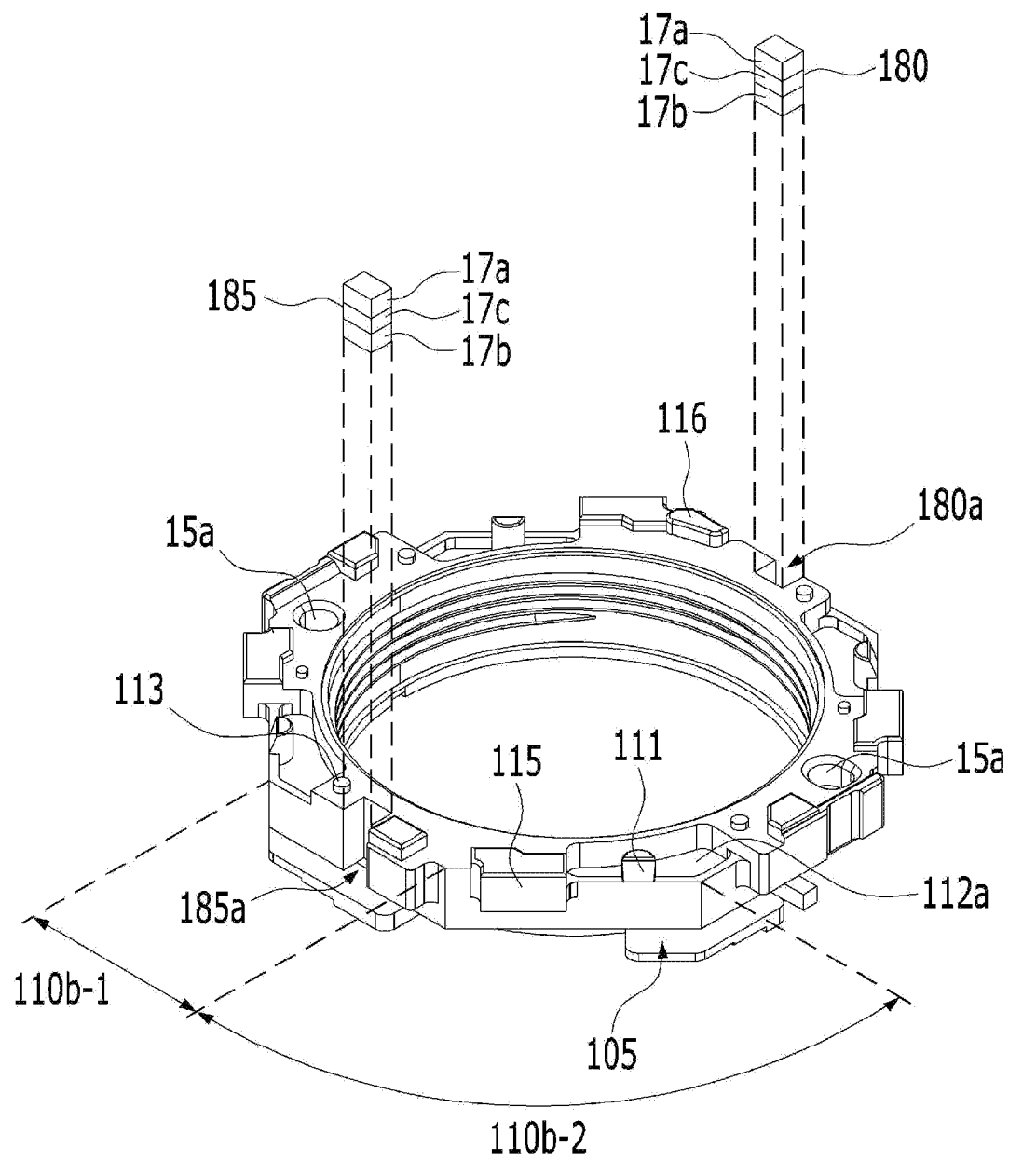
FIG. 3A is a perspective view of the bobbin, the second magnet, and the third magnet shown in FIG. 1.
Figure 3B:
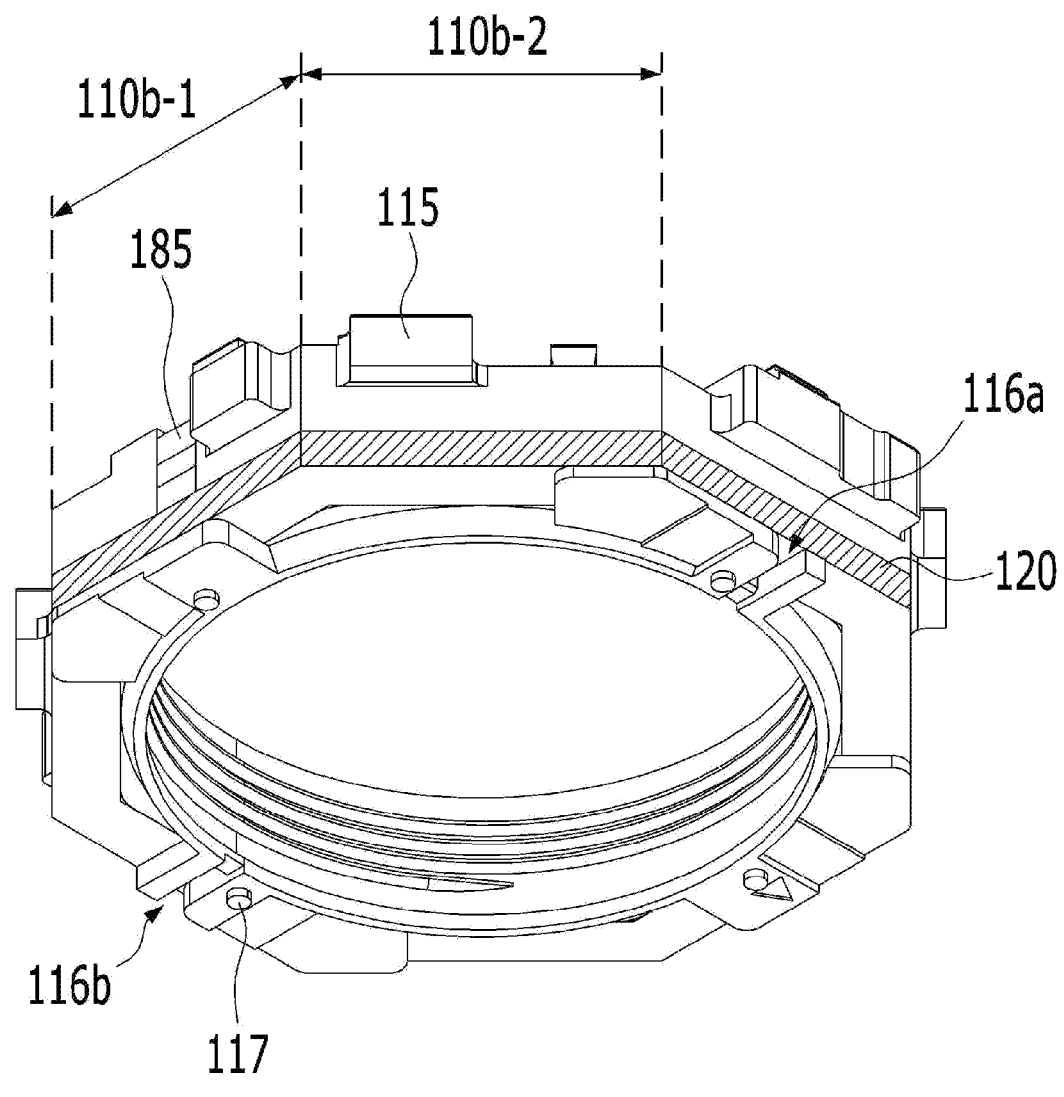
FIG. 3B illustrates a first coil coupled to the bobbin.

FIG. 3A is a perspective view of the bobbin 110, the second magnet 180, and the third magnet 185, which are shown in FIG. 1, and FIG. 3B illustrates the first coil 120 coupled to the bobbin 110.

Referring to FIGS. 3A and 3B, the bobbin 110 may have a bore formed therein to mount a lens or a lens barrel therein. In an example, the bore in the bobbin 110 may be a through-hole formed through the bobbin 110 in the optical-axis direction, and may have a circular shape, an elliptical shape, or a polygonal shape, without being limited thereto.

A lens may be directly mounted in the bore in the bobbin 110, but the disclosure is not limited thereto. In another embodiment, a lens barrel, to which at least one lens is mounted or coupled, may be coupled or mounted in the bore in the bobbin 110. The lens or the lens barrel may be coupled to the inner circumferential surface of the bobbin 110 in any of various manners.

The bobbin 110 may include first side portions 110b-1, which are spaced apart from each other, and second side portions 110b-2, which are spaced apart from each other. Each of the second side portions 110b-2 may connect two adjacent ones of the first side portions to each other. In an example, the length of each of the first side portions 110b-1 of the bobbin 110 in the horizontal direction or the transverse direction may be different from the length of each of the second side portions 110b-2 in the horizontal direction or the transverse direction. In an example, the length of each of the first side portions 110b-1 in the horizontal direction may be longer than the length of each of the second side portions 110b-2 in the horizontal direction, but the disclosure is not limited thereto. In another embodiment, the former may be equal to or shorter than the latter.

The bobbin 110 may include a protruding portion 115, which is provided on the outer surface thereof.

In an example, the protruding portion 115 may be disposed on the outer surface of each of the second side portions 110b-2 of the bobbin 110, but the disclosure is not limited thereto. The protruding portion 115 may protrude in a direction parallel to a line that extends through the center of the bore in the bobbin 110 and is perpendicular to the optical axis, but the disclosure is not limited thereto.

The protruding portion 115 of the bobbin 110 may correspond to a recess portion 25a in the housing 140, and may be inserted into or disposed in the recess portion 25a in the housing 140 so as to minimize or inhibit rotation of the bobbin 110 about the optical axis beyond a predetermined range.

Furthermore, when the bobbin 110 is moved beyond a predetermined range in the optical-axis direction (for example, in a direction from the upper elastic member 150 toward the lower elastic member 160) due to an external impact or the like, the protruding portion 115 may serve as a stopper for minimizing or inhibiting direct collision of the lower surface of the bobbin 110 with the base 210, the second coil 230, or the circuit board 250.

The bobbin 110 may have a first escape recess 112a formed in the upper surface thereof to avoid spatial interference with a first frame connection portion 153 of the upper elastic member 150. In an example, the first escape recess 112a may be disposed in each of the second side portions 110b-2 of the bobbin 110, but the disclosure is not limited thereto.

The bobbin 110 may be provided on the upper surface thereof with a guide portion 111 to guide the upper elastic member 150 to the mounting position. As illustrated in FIG. 3A, in an example, the guide portion 111 of the bobbin 110 may be disposed in the first escape recess 112a in order to guide the frame connection portion 153 of the upper elastic member 150 to extend along a predetermined path. In an example, the guide portion 111 may protrude from the bottom surface of the first escape recess 112a in the optical-axis direction.

In addition, a damper (refer to DA5 in FIG. 11) may be disposed between the guide portion 111 and the first frame connection portion 153 of the upper elastic member 150.

The bobbin 110 may include a stopper 116, which protrudes from the upper surface thereof.

The stopper 116 of the bobbin 110 may serve to inhibit the upper surface of the bobbin 110 from directly colliding with the inner side of the upper plate of the cover member 300 when the bobbin 110 is moved beyond a prescribed range due to an external impact or the like while the bobbin 110 is being moved in the first direction in order to perform the auto-focusing function.

In order to couple and fix the bobbin 110 to the upper elastic member 150, the bobbin 110 may include a first coupling portion 113, which is formed on the upper portion or the upper surface thereof. In an example, the first coupling portion 113 of the bobbin 110 is illustrated in FIG. 3A as having the form of a protrusion, but the disclosure is not limited thereto. In another embodiment, the first coupling portion 113 of the bobbin 110 may be formed as a recess or a flat surface.

In addition, in order to couple and fix the bobbin 110 to the lower elastic member 160, the bobbin 110 may include a second coupling portion 117, which is formed on the lower portion or the lower surface thereof. The second coupling portion 117 of the bobbin 110 is illustrated in FIG. 3B as having the form of a protrusion, but the disclosure is not limited thereto. In another embodiment, the second coupling portion of the bobbin 110 may be formed as a recess or a flat surface.

The bobbin 110 may have a seating recess 105 formed in the outer surface thereof to allow the first coil 120 to be seated, inserted, or disposed thereinto. The seating recess 105 may be recessed from the outer surface of each of the first and second side portions 110b-1 and 110b-2 of the bobbin 110, and may have a closed curve shape (e.g. a ring shape), which coincides with the shape of the first coil 120.

In addition, in order to inhibit separation of the coil 120 and to guide the two ends of the coil 120 when the coil 120 is connected to the lower elastic members 160-1 and 160-2, guide recesses 116a and 116b may be formed in two of the side portions 110b-1 and 110b-2 of the bobbin 110. In an example, the guide recesses 116a and 116b may be formed in the lower surfaces of two first side portions 110b-1 of the bobbin 110 that are located opposite each other or the lower surfaces of two second side portions 110b-2 of the bobbin 110 that are located opposite each other.

In addition, the bobbin 110 may have a seating recess 180a formed in the outer surface thereof to allow the second magnet 180 to be seated, inserted, fixed, or disposed therein.

The seating recess 180a in the bobbin 110 may be recessed from the outer surface of the bobbin 110, and may include an opening formed in at least one of the upper surface or the lower surface of the bobbin 110, without being limited thereto.

In addition, the bobbin 110 may have a seating recess 185a formed in the outer surface thereof to allow the third magnet 185 to be seated, inserted, fixed, or disposed thereinto.

The seating recess 185a in the bobbin 110 may be recessed from the outer surface of the bobbin 110, and may have an opening formed in at least one of the upper surface or the lower surface of the bobbin 110, without being limited thereto.

Each of the seating recesses 180a and 185a in the bobbin 110 may be located above the seating recess 105, in which the first coil 120 is disposed, and may be connected to or contiguous with the seating recess 105, without being limited thereto. In another embodiment, the two seating recesses may be spaced apart from each other.

The seating recess 180a in the bobbin 110 may be formed in one of the first side portions 110b-1 of the bobbin 110, and the seating recess 185a in the bobbin 110 may be formed in another of the first side portions 110b-2 of the bobbin 110.

In an example, the seating recesses 180a and 185a may be formed in two first side portions of the bobbin 110 that face each other or are located opposite each other.

Since the second magnet 180 and the third magnet 185 are disposed in the seating recesses 180a and 185a formed in two first side portions of the bobbin 110 that are located opposite each other, it is possible to achieve weight equilibrium between the second magnet 180 and the third magnet 185, and it is possible for the influence on AF driving force due to the magnetic field interference between the first magnet 130 and the second magnet 180 to cancel out the influence on AF driving force due to the magnetic field interference between the first magnet 130 and the third magnet 185, thereby increasing the accuracy of the auto-focusing (AF) operation.

The bobbin 110 may be provided on the inner circumferential surface thereof with a thread 11 for coupling to the lens or the lens barrel. The thread 11 may be formed on the inner circumferential surface of the bobbin 110 in the state in which the bobbin 110 is held by a jig or the like. The bobbin 110 may have jig-fixing recesses 15a and 15b formed in the upper surface thereof. In an example, the jig-fixing recesses 15a and 15b may be formed in the upper surfaces of two first side portions 110b-1 or two second side portions 110b-1 of the bobbin 110 that are located opposite each other, but the disclosure is not limited thereto. The jig-fixing recesses 15a and 15b may also serve as a foreign-substance collector for collecting foreign substances.

Next, the first coil 120 will be described.

The first coil 120 is disposed on the bobbin 110. In an example, the first coil 120 may be disposed on the outer surface of the bobbin 110. In an example, the first coil 120 may be moved in the optical-axis direction together with the bobbin 110.

The first coil 120 may be disposed under the second and third magnets 180 and 185, but the disclosure is not limited thereto. In an example, the first coil 120 may be disposed under the protruding portion 115 of the bobbin 110, but the disclosure is not limited thereto.

In an example, the first coil 120 may not overlap the second and third magnets 180 and 185 in a direction perpendicular to the optical axis, but the disclosure is not limited thereto. In another embodiment, the first coil may overlap at least a portion of each of the second and third magnets 180 and 185 in a direction perpendicular to the optical axis.

In an example, the first coil 120 may be disposed in the seating recess 105 in the bobbin 110, the second magnet 180 may be inserted into or disposed in the seating recess 180a in the bobbin 110, and the third magnet 185 may be inserted into or disposed in the seating recess 185a in the bobbin 110. The first and second magnets 180 and 185 may be disposed inside the first coil 120.

Each of the second magnet 180 and the third magnet 185, which are disposed on the bobbin 110, may be spaced apart from the first coil 120 in the direction of the optical axis OA, but the disclosure is not limited thereto. In another embodiment, each of the second magnet 180 and the third magnet 185, which are disposed on the bobbin 110, may be in contact with the first coil 120, or may overlap a portion of the first coil 120 in a direction perpendicular to the optical axis.

The first coil 120 may surround the outer surface of the bobbin 110 in a winding direction about the optical axis OA. In an example, the first coil 120 may have the shape of a closed curve that surrounds the outer surface of the bobbin 110, for example, a ring shape.

The first coil 120 may be directly wound around the outer surface of the bobbin 110, but the disclosure is not limited thereto. In another embodiment, the first coil 120 may be wound around the bobbin 110 using a coil ring, or may be embodied as a coil block having an angled ring shape.

Power or a drive signal may be supplied to the first coil 120. The power or the drive signal supplied to the first coil 120 may be a DC signal, an AC signal, or a signal containing both DC and AC components, and may be of a voltage type or a current type.

When a drive signal (e.g. drive current) is supplied to the first coil 120, electromagnetic force may be generated by electromagnetic interaction with the first magnet 130, and the bobbin 110 may be moved in the direction of the optical axis OA by the generated electromagnetic force.

At the initial position of the AF operation unit, the bobbin 110 may be moved upwards or downwards, which is referred to as bidirectional driving of the AF operation unit.

Alternatively, at the initial position of the AF operation unit, the bobbin 110 may be moved upwards, which is referred to as unidirectional driving of the AF operation unit.

At the initial position of the AF operation unit, the first coil 120 may be disposed so as to correspond to or overlap the first magnet 130, which is disposed in the housing 140, in a direction parallel to a line that is perpendicular to the optical axis OA and extends through the optical axis.

In an example, the AF operation unit may include the bobbin 110 and components (e.g. the first coil 120 and the second and third magnets 180 and 185) coupled to the bobbin 110. The AF operation unit may further include the lens or the lens barrel coupled to the bobbin 110.

The initial position of the AF operation unit may be the original position of the AF operation unit in the state in which no electric power is applied to the first coil 1120 or the position at which the AF operation unit is located as the result of the upper and lower elastic members 150 and 160 being elastically deformed due only to the weight of the AF operation unit.

In addition, the initial position of the bobbin 110 may be the position at which the AF operation unit is located when gravity acts in the direction from the bobbin 110 toward the base 210 or when gravity acts in the direction from the base 210 toward the bobbin 110.

Next, the second and third magnets 180 and 185 will be described.

The second magnet 180 may be referred to as a "sensing magnet" because the second magnet 180 provides a magnetic field, which is detected by the first position sensor 170, and the third magnet 185 may be referred to as a "balancing magnet" because the third magnet 185 cancels out the influence of the magnetic field of the sensing magnet 180 and establishes weight equilibrium with the sensing magnet 180.

The second magnet 180 may be disposed in the seating recess 180a in the bobbin 110 so as to face the first position sensor 170. In an example, at the initial position of the bobbin 110, the second magnet 180 may overlap the first position sensor 170 in a direction parallel to a line that is perpendicular to the optical axis and extends through the optical axis, but the disclosure is not limited thereto. In another embodiment, at the initial position of the bobbin 110, the second magnet 180 and the first position sensor 170 may not overlap each other in a direction parallel to a line that is perpendicular to the optical axis and extends through the optical axis.

The second magnet 180, which faces the first position sensor 170, may be exposed at a portion of one surface thereof from the seating recess 180a, but the disclosure is not limited thereto. In another embodiment, the second magnet 180, which faces the first position sensor 170, may not be exposed at a portion of one surface thereof from the seating recess 180a.

In an example, each of the second and third magnets 180 and 185 may be a bipolar magnetized magnet or a 4-pole magnet, which includes two N poles and two S poles.

Each of the second and third magnets 180 and 185 may include a first magnet part 17a, a second magnet part 17b, and a partition wall 17c disposed between the first magnet part 17a and the second magnet part 17b. Here, the partition wall 17c may be referred to as a "non-magnetic partition wall".

The first magnet part 17a may include an N pole, an S pole, and a first interface portion between the N pole and the S pole. The first interface portion may be a portion that has substantially no magnetism and has a zone having almost no polarity, and may be a portion that is naturally formed in order to form a magnet composed of one N pole and one S pole.

The second magnet part 17b may include an N pole, an S pole, and a second interface surface between the N pole and the S pole. The second interface portion may be a portion that has substantially no magnetism and includes a zone having almost no polarity, and may be a portion that is naturally formed in order to form a magnet composed of one N pole and one S pole.

The partition wall 17c may separate or isolate the first magnet part 17a and the second magnet part 17b from each other, and may be a portion having substantially no magnetism or polarity. In an example, the partition wall may be a non-magnetic material, air or the like. The non-magnetic partition wall may be referred to as a "neutral zone" or a "neutral section".

The partition wall 17c may be a portion that is artificially formed when the first magnet part 17a and the second magnet part 17b are magnetized. The width of the partition wall 17c may be larger than the width of the first interface portion (or the width of the second interface portion). Here, the width of the partition wall 17c may be the length of the partition wall 17c in a direction from the first magnet part 17a toward the second magnet part 17b. The width of the first interface portion (or the second interface portion) may be the length of the first interface portion in a direction from the N pole toward the S pole of each of the first and second magnet parts 17a and 17b.

In an example, the first magnet 17a and the second magnet 17b may be disposed so as to face each other in the optical-axis direction. In an example, the partition wall 17c may be parallel to a line that is perpendicular to the optical axis and extends through the optical axis.

In another embodiment, each of the second and third magnets may be a unipolar magnetized magnet, which has one N pole and one S pole.

In an example, each of the second and third magnets 180 and 185, which are disposed on the bobbin 110, may be configured such that the interface between the N pole and the S pole is parallel to a direction perpendicular to the optical axis OA. In an example, the N pole and the S pole of each of the second and third magnets 180 and 185 may face each other in the optical-axis direction.

In an example, each of the surfaces of the second and third magnets 180 and 185 that face the first position sensor 170 may be divided into the N pole and the S pole, but the disclosure is not limited thereto.

In another embodiment, for example, the interface between the N pole and the S pole of each of the second and third magnets 180 and 185, which are disposed on the bobbin 110, may be parallel to the optical axis OA.

The second magnet 180 may be moved together with the bobbin 110 in the optical-axis direction, and the first position sensor 170 may detect the intensity of the magnetic field or the magnetic force of the second magnet 180, which is moved in the optical-axis direction, and may output an output signal corresponding to the result of the detection.

In an example, the intensity of the magnetic field or the magnetic force detected by the first position sensor 170 may vary depending on displacement of the bobbin 110 in the optical-axis direction. The first position sensor 170 may output an output signal proportional to the detected intensity of the magnetic field, and the displacement of the bobbin 110 in the optical-axis direction may be detected using the output signal from the first position sensor 170.

Next, the housing 140 will be described.

The housing 140 accommodates therein the bobbin 110, and supports the first magnet 130, the first position sensor 170, and the circuit board 190.

Figure 4A:
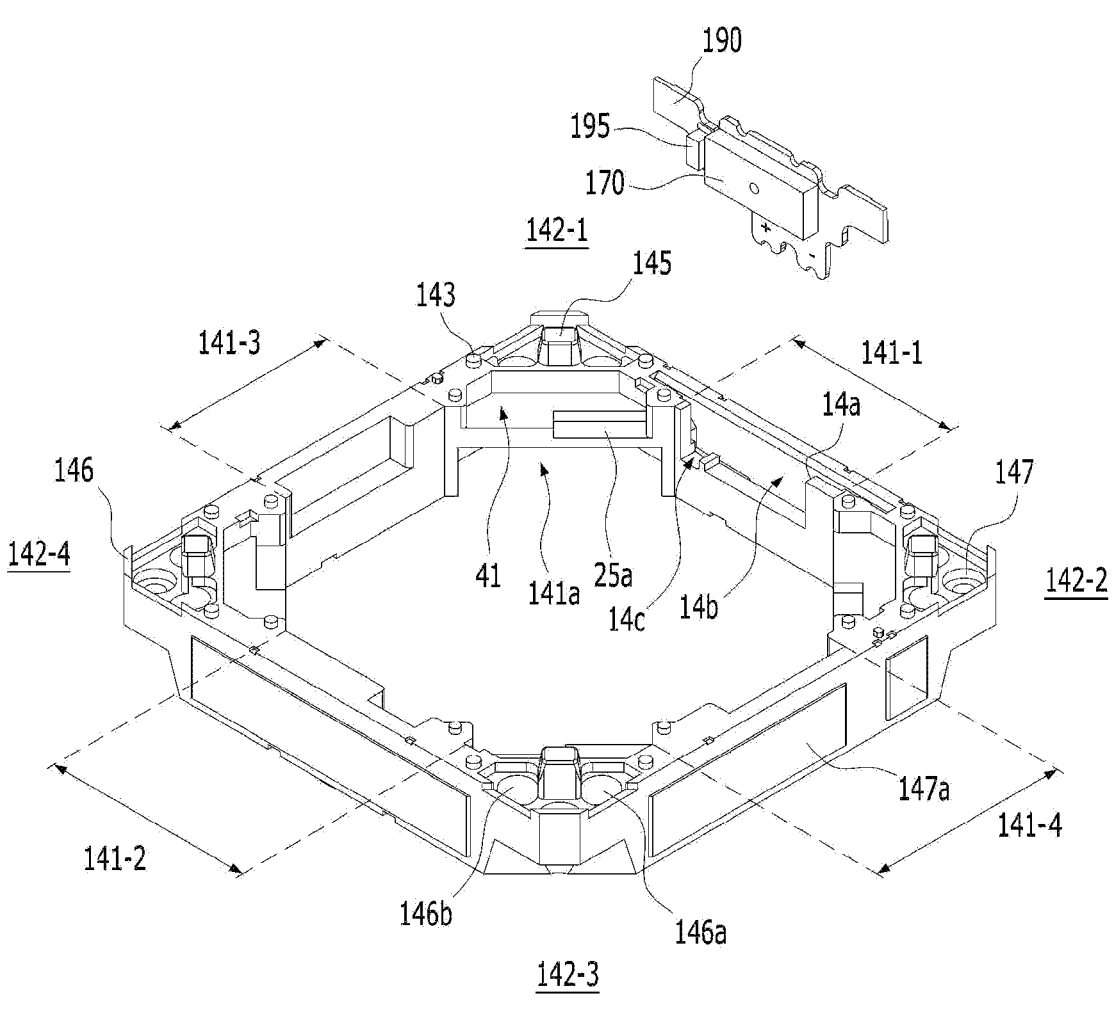
FIG. 4A is a perspective view of the housing, the circuit board, the first position sensor, and the capacitor shown in FIG. 1.
Figure 4B:
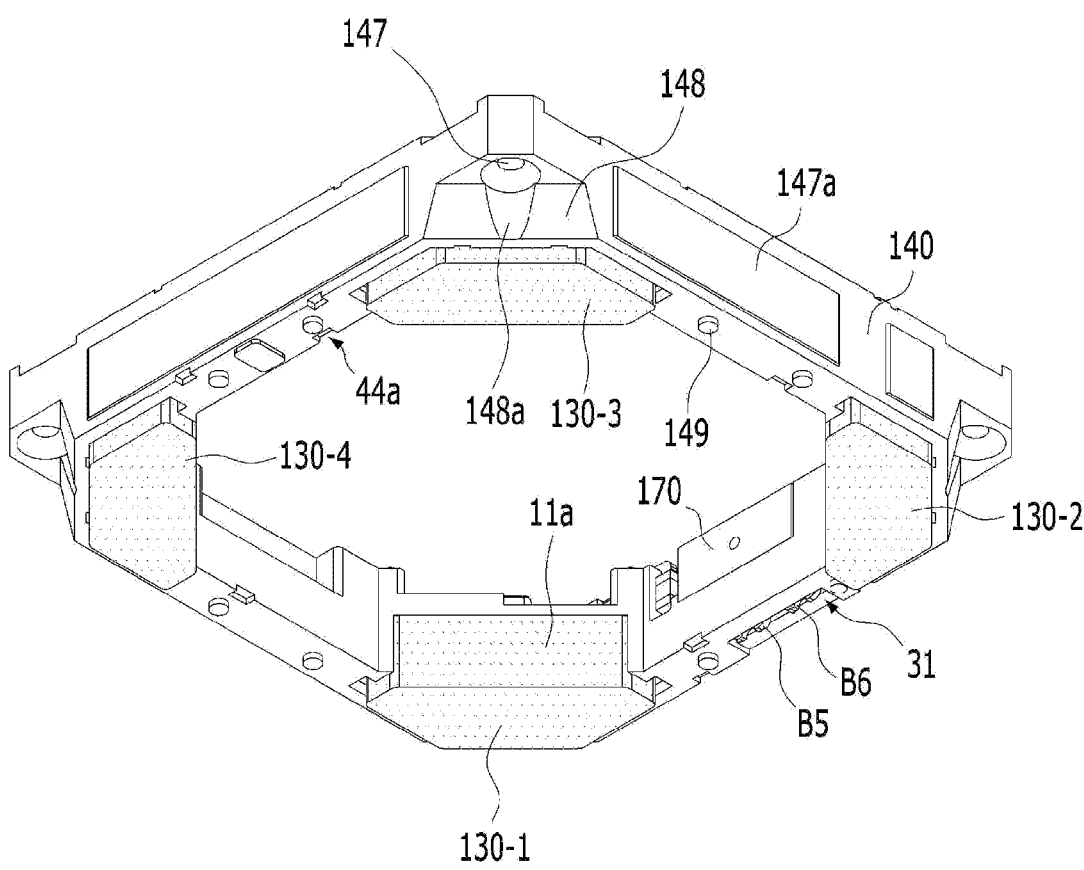
FIG. 4B is an assembled perspective view of the housing, a first magnet, the circuit board, the first position sensor, and the capacitor.

FIG. 4A is a perspective view of the housing 140, the circuit board 190, the first position sensor 170, and the capacitor 195, which are shown in FIG. 1, and FIG. 4B is an assembled perspective view of the housing 140, the first magnet 130, the circuit board 190, the first position sensor 170, and the capacitor 195.

Referring to FIGS. 4A and 4B, the housing 140 may be formed in a hollow column shape overall. In an example, the housing 140 may have a polygonal (e.g. rectangular or octagonal) or circular bore formed therein, and the bore in the housing 140 may be a through-hole, which is formed through the housing 140 in the optical-axis direction.

The housing 140 may include a plurality of side portions 141-1 to 141-4 and corner portions 142-1 to 142-4.

In an example, the housing 140 may include first to fourth side portions 141-1 to 141-4, which are spaced apart from each other, and first to fourth corner portions 142-1 to 142-4, which are spaced apart from each other.

In an example, the first and second side positions 141-1 and 141-2 of the housing 140 may face each other or may be located opposite each other, and the third and fourth side portions 141-3 and 141-4 of the housing 140 may face each other or may be located opposite each other.

Each of the corner portions 142-1 to 142-4 of the housing 140 may be disposed or located between two adjacent ones 141-1 and 141-2, 141-2 and 141-3, 141-3 and 141-4, and 141-4 and 141-1 of the side portions so as to connect the side portions 141-1 to 141-4 to each other.

In an example, the corner portions 142-1 to 142-4 may be located at the corners of the housing 140. In an example, the number of side portions of the housing 140 is four, and the number of corner portions is four, but the disclosure is not limited thereto. The number of side portions or corner portions may be five or more.

Each of the side portions 141-1 to 141-4 of the housing 140 may be disposed parallel to a corresponding one of side plates 302 of the cover member 300.

In an example, the side portions 141-1 to 141-4 of the housing 140 may correspond to or face the first side portions 110b-1 of the bobbin 110, and the corner portions 142-1 to 142-4 of the housing 140 may correspond to or face the second side portions 110b-2 of the bobbin 110.

The first magnet 130 may be disposed or mounted on the corner portions 142-1 to 142-4 of the housing 140.

In an example, the housing 140 may have a seating portion 141a or a receiving portion formed in the corners or the corner portions 142-1 to 142-4 thereof to receive the magnet 130 therein.

The seating portion 141a in the housing 140 may be formed in the lower portion or the lower end of at least one of the corner portions 142-1 to 142-4 of the housing 140.

In an example, the seating portion 141a in the housing 140 may be formed in the inner side of the lower portion or the lower end of each of the four corner portions 142-1 to 142-4.

The seating portion 141a in the housing 140 may be formed in the shape of a recess, e.g. a concave recess, corresponding to the first magnet 130, but the disclosure is not limited thereto.

In an example, a first opening may be formed in the side surface of the seating portion 141a in the housing 140 that faces the first coil 120, and a second opening may be formed in the lower surface of the seating portion 141a in the housing 140 that faces the second coil 230, in order to facilitate mounting of the first magnet 130.

In an example, a first surface 11a of the first magnet 130, which is fixed to or disposed in the seating portion 141a in the housing 140, may be exposed through the first opening in the seating portion 141a. Furthermore, the lower surface of the first magnet 130, which is fixed to or disposed in the seating portion 141a in the housing 140, may be exposed through the second opening in the seating portion 141a.

The housing 140 may have an escape recess 41 formed in the upper surfaces of the corner portions 142-1 to 142-4 in order to avoid spatial interference with the first frame connection portion 153 of the upper elastic member 150.

In an example, the escape recess 41 in the housing 140 may be recessed from the upper surface of the housing 140, and may be located closer to the center of the housing 140 than a stopper 145 or adhesive injection holes 146a and 146b. In an example, the escape recess 41 may be located further inwards than the stopper 145 of the housing 140 in a direction toward the center of the housing 140, and the adhesive injection holes 146a and 146b may be located further outwards than the escape recess 41.

The housing 140 may have a recess portion 25a formed in the corner portions 142-1 to 142-4 so as to correspond to or face the protruding portion 115 of the bobbin 110. The recess portion 25a in the housing 140 may be located above the seating portion 141a in the housing 140. In an example, the recess portion 25a in the housing 140 may be formed in the bottom surface of the escape recess 41. In an example, the bottom surface of the recess portion 25a may be located lower than the bottom surface of the escape recess 41, and the seating recess 141a may be located lower than the bottom surface of the escape recess 41.

The first magnet 130 may be fixed to the seating portion 141a by means of an adhesive, but the disclosure is not limited thereto.

In an example, the housing 140 may have one or more adhesive injection holes 146a and 146b formed in the corner portions 142-1 to 142-4 to receive an adhesive injected thereinto. The one or more adhesive injection holes 146a and 146b may be recessed from the upper surfaces of the corner portions 142-1 to 142-4.

The one or more adhesive injection holes 146a and 146b may be through-holes formed through the corner portions 142-1 to 142-4. The adhesive injection holes 146a and 146b may be connected to or communicate with the seating recess 141a in the housing 140, and may expose at least a portion of the first magnet 130 (e.g. at least a portion of the upper surface of the magnet 130). Since the adhesive injection holes 146a and 146b expose at least a portion of the first magnet 130 (e.g. at least a portion of the upper surface of the magnet 130), an adhesive may be efficiently applied to the first magnet 130, and accordingly, the coupling force between the first magnet 130 and the housing 140 may increase.

The housing 140 may include at least one stopper 147a protruding from the outer surfaces of the side portions 141-1 to 141-4. The at least one stopper 147a may inhibit the housing 140 from colliding with the side plates 302 of the cover member 300 when the housing 140 moves in a direction perpendicular to the optical axis.

In order to inhibit the lower surface of the housing 140 from colliding with the base 210 and/or the circuit board 250, the housing 140 may further include a stopper (not shown) protruding from the lower surface thereof.

The housing 140 may have formed therein a mounting recess 14a (or a seating recess) for receiving the circuit board 190, a mounting recess 14b (or a seating recess) for receiving the first position sensor 170, and a mounting recess 14c (or a seating recess) for receiving the capacitor 195.

The mounting recess 14a in the housing 140 may be formed in the upper portion or the upper end of one of the side portions 141-1 to 141-4 of the housing 140 (e.g. 141-1).

In order to facilitate mounting of the circuit board 190, the mounting recess 14a in the housing 140 may be formed so as to be open at the upper surface thereof and to have a side surface, a bottom surface, and an opening that is open to the inside of the housing 140. The mounting recess 14a in the housing 140 may have a shape that corresponds to or coincides with the shape of the circuit board 190.

The mounting recess 14b in the housing 140 may be formed in the inner surface of the first side portion 141-1 of the housing 140, and may be connected to the mounting recess 14a.

The mounting recess 14c in the housing 140 may be disposed on one side of the mounting recess 14b, and a projection or a protruding portion may be provided between the mounting recess 14b and the mounting recess 14c in order to separate or isolate the capacitor 195 from the first position sensor 170. The reason for this is to position the capacitor 195 and the position sensor 170 close to each other, thereby reducing the length of the path for conductive connection between the capacitor 195 and the position sensor 170, thus reducing the amount of noise introduced by a long path.

The capacitor 195 may be disposed or mounted on a first surface 19b of the circuit board 190.

The capacitor 195 may be of a chip type. In this case, the chip may include a first terminal, which corresponds to one end of the capacitor 195, and a second terminal, which corresponds to the other end of the capacitor 195. The capacitor 195 may be referred to as a "capacitive element" or a "condenser".

In another embodiment, the capacitor may be embodied as being included in the circuit board 190. In an example, the circuit board 190 may include a capacitor including a first conductive layer, a second conductive layer, and an insulating layer (e.g. a dielectric layer) disposed between the first conductive layer and the second conductive layer.

The capacitor 195 may be conductively connected in parallel to two terminals (e.g. B1 and B2) of the circuit board 190, through which power (or a drive signal) is supplied to the position sensor 170 from the outside.

Alternatively, the capacitor 195 may be conductively connected in parallel to the terminals of the first position sensor 170, which is conductively connected to the first and second terminals B1 and B2 of the circuit board 190.

In an example, one end of the capacitor 195 (or the first terminal of the capacitor chip) may be conductively connected to the first terminal B1 of the circuit board 190, and the other end of the capacitor 195 (or the terminal of the capacitor chip) may be conductively connected to the second terminal B2 of the circuit board 190.

Since the capacitor 195 is conductively connected in parallel to the first and second terminals B1 and B2 of the circuit board 190, the capacitor 195 may serve as a smoothing circuit for removing ripple components included in the power signals GND and VDD, which are supplied to the first position sensor 170 from the outside, and thus may supply stable and consistent power signals to the first position sensor 170.

Since the capacitor 195 is conductively connected in parallel to the first and second terminals B1 and B2 of the circuit board 190, it is possible to protect the first position sensor 170 from high-frequency noise, ESD, or the like, which is introduced from the outside.

In addition, the capacitor 195 may inhibit overcurrent, which is caused by high-frequency noise, ESD, or the like introduced from the outside, from being applied to the first position sensor 170, and may inhibit a calibration value for displacement of the bobbin 110, which is obtained based on the signal output from the first position sensor 170, from being reset due to the overcurrent.

In addition, the mounting recess 14b in the housing 140 may be open at the upper portion thereof in order to facilitate mounting of the first position sensor 170. The seating recess 14b may have an opening formed in the inner surface of the first side portion 141-1 of the housing 140 in order to increase the sensitivity of the first position sensor 170. The mounting recess 14b in the housing 140 may have a shape corresponding to or coinciding with the shape of the first position sensor 170.

In an example, the circuit board 190 may be secured in the mounting recess 14a in the housing 140 using an adhesive member. The adhesive member may be, for example, epoxy or a sheet of double-sided adhesive tape, but the disclosure is not limited thereto.

The corner portions 142-1 to 142-4 of the housing 140 may be provided with support members 220-1 to 220-4.

The corner portions 142-1 to 142-4 of the housing 140 may be provided therein with holes 147, which define paths through which the support members 220-1 to 220-4 extend. In an example, the housing 140 may include the holes 147, which are formed through the upper portions of the corner portions 142-1 to 142-4 of the housing 140. The number of holes 147 in the housing 140 may be equal to the number of support members.

In another embodiment, the housing may have an escape structure for avoiding spatial interference with the support members 220-1 to 220-4. In an example, the housing of the other embodiment may have an escape structure in which the holes 147 are recessed from the outer surfaces of the corner portions or in which at least a portion of each of the holes 147 is open.

One end of each of the support members 220 may be connected or bonded to the upper elastic member 150 through the hole 147. In an example, one end of each of the support members 220 may be coupled to the first outer frame of the upper elastic member 150 through the hole 147.

In an example, the diameter of the hole 147 may gradually increase in a direction toward the lower surface of the housing 140 from the upper surface thereof in order to allow a damper to be easily applied, but the disclosure is not limited thereto. In another embodiment, the diameter of the hole 147 may be constant.

In order not only to define the paths through which the support members 220-1 to 220-4 extend but also to avoid spatial interference between the support members 220-1 to 220-4 and the corner portions 142-1 to 142-4 of the housing 140, escape recesses 148a may be formed in the outer surfaces 148 of the corner portions 142-1 to 142-4. Each of the escape recesses 148a may be connected to the hole 147 in the housing 140, and may have a semicircular or semi-elliptical section, but the disclosure is not limited thereto. The lower portion or the lower end of each of the escape recesses 148a may be connected to the lower surface of the housing 140.

In an example, the diameter of the escape recess 148a may gradually decrease downwards, but the disclosure is not limited thereto.

In addition, in order to inhibit the housing 140 from directly colliding with the inner surface of the upper plate 301 of the cover member 300, the housing 140 may be provided at the upper portion, the upper end, or the upper surface thereof with the stopper 145.

In an example, the stopper 145 may be disposed on the upper surface of each of the corner portions 142-1 to 142-4 of the housing 140, but the disclosure is not limited thereto. In another embodiment, the stopper 145 may be disposed on each of the side portions of the housing 140.

In addition, in order to inhibit the lower surface of the housing 140 from colliding with the base 210 and/or the circuit board 250, the housing 140 may further be provided at the lower portion, the lower end, or the lower surface thereof with a stopper (not shown).

In addition, guide protruding portions 146 may be formed on the corners of the upper surfaces of the corner portions 142-1 to 142-4 of the housing 140 in order to inhibit the damper from overflowing.

In an example, each of the holes 147 in the housing 140 may be located between the corner (e.g. the guide protruding portion 146) of the upper surface of a corresponding one of the corner portions 142-1 to 142-4 of the housing 140 and the stopper 145.

The housing 140 may be provided at the upper portion, the upper end, or the upper surface thereof with at least one first coupling portion 143, which is coupled to the first outer frame 152 of the upper elastic member 150.

The first coupling portion 143 of the housing 140 may be disposed on at least one of the side portions 141-1 to 141-4 or at least one of the corner portions 142-1 to 142-4 of the housing 140.

The housing 140 may be provided at the lower portion, the lower end, or the lower surface thereof with a second coupling portion 149, which is coupled or secured to the second outer frame 162 of the lower elastic member 160.

In an example, each of the first and second coupling portions 143 and 149 of the housing 140 may take the form of a protrusion, but the disclosure is not limited thereto. In another embodiment, each of the first and second coupling portions may be formed as a recess or a flat surface.

In an example, the first coupling portion 143 of the housing 140 may be coupled to the hole 152a in the first outer frame 152 of the upper elastic member 150 using an adhesive member or heat fusion, and the second coupling portion 149 of the housing 140 may be coupled to the hole 162a in the second outer frame 162 of the lower elastic member 160 using an adhesive member or heat fusion.

In order to avoid spatial interference with the portions where the second outer frames 162-1 to 162-3 of the lower elastic member 160 meet second frame connection portions 163, an escape recess 44a may be formed in the lower surface of at least one of the side portions 141-1 of the housing 140.

Next, the first magnet 130 will be described.

The first magnet 130 may be disposed on at least one of the corners (or the corner portions 142-1 to 142-4) of the housing 140. In an example, the first magnet 130 may be disposed on each of the corners of the housing 140.

At the initial position of the AF operation unit, the first magnet 130 may be disposed in the housing 140 such that at least a portion thereof overlaps the first coil 120 in a direction parallel to a line that is perpendicular to the optical axis OA and extends through the optical axis OA.

In an example, the first magnet 130 may be inserted into or disposed in the seating portion 141a in a corresponding one of the corner portions 141-1 to 141-4 of the housing 140.

In another embodiment, the first magnet 130 may be disposed on the outer surface of each of the corner portions 141-1 to 141-4 of the housing 140.

The first magnet 130 may have a polyhedral shape so as to be easily seated on each of the corner portions of the housing 140.

In an example, the area of the first surface 11a of the first magnet 130 may be greater than the area of the second surface 11b thereof. The first surface 11a of the first magnet 130 may be a surface that faces one surface of the first coil 120 (or the outer surface of the bobbin 110), and the second surface 11b of the first magnet 130 may be a surface opposite the first surface 11a.

In an example, the length of the second surface 11b of the first magnet 130 in the transverse direction may be shorter than the length of the first surface 11a thereof in the transverse direction.

In an example, the transverse direction of the first surface 11a of the first magnet 130 may be a direction perpendicular to a direction from the lower surface of the first magnet 130 toward the upper surface thereof, or may be a direction perpendicular to the optical-axis direction.

In an example, the transverse direction of the second surface 11b of the first magnet 130 may be a direction perpendicular to a direction from the lower surface of the first magnet 130 toward the upper surface thereof, or may be a direction perpendicular to the optical-axis direction.

In an example, the first magnet 130 may include a portion in which the length thereof in the transverse direction gradually decreases in a direction from the center of the housing 140 toward the corner portion 142-1, 142-2, 142-3, or 142-4 of the housing 140.

In an example, the first magnet 130 may include a portion in which the length thereof in the transverse direction decreases in a direction from the first surface 11a toward the second surface 11b. In an example, the transverse direction of the first magnet 130 may be a direction parallel to the first surface 11a of the first magnet 130.

The first magnet 130 may include a plurality of magnets 130-1 to 130-4, which are disposed in the housing 140.

Each of the plurality of magnets 130-1 to 130-4 may be formed as a unitary body, and may be disposed such that the first surface 11*a*, which faces the coil 120, is an S pole and the second surface 11*b* is an N pole. However, the disclosure is not limited thereto. In another embodiment, each of the plurality of magnets 130-1 to 130-4 may be disposed such that the first surface 11*a* is an N pole and the second surface 11*b* is an S pole.

The first magnets may be disposed or mounted on the corner portions of the housing 140 such that at least two thereof face each other.

In an example, two pairs of magnets 130-1 and 130-3 & 130-2 and 130-4, which are disposed such that the magnets in each pair face each other, may be disposed on the corner portions 142-1 to 142-4 of the housing 140. In this case, the planar shape of each of the plurality of magnets 130-1 to 130-4 in the horizontal direction may be a polygonal shape, such as a triangular, pentagonal, hexagonal, or rhombic shape.

In another embodiment, one pair of magnets, which face each other, may be disposed on only two of the corner portions of the housing 140, which face each other.

In still another embodiment, the magnet may be disposed on the side portion of the housing 140, rather than being disposed on the corner portion of the housing 140. The circuit board 190, the first position sensor 170, and the capacitor 195 may be disposed on one of the corner portions of the housing 140. The sensing magnet may be disposed on the outer surface of the bobbin 110 that corresponds to the first position sensor 170. In still another embodiment, a plurality of magnets disposed on the side portions of the housing 140 may be included, and the shape of each of the magnets may be a polyhedral shape suitable for being disposed on the side portion of the housing, for example, a cubic or rectangular parallelepiped shape, but the disclosure is not limited thereto.

Figure 5:
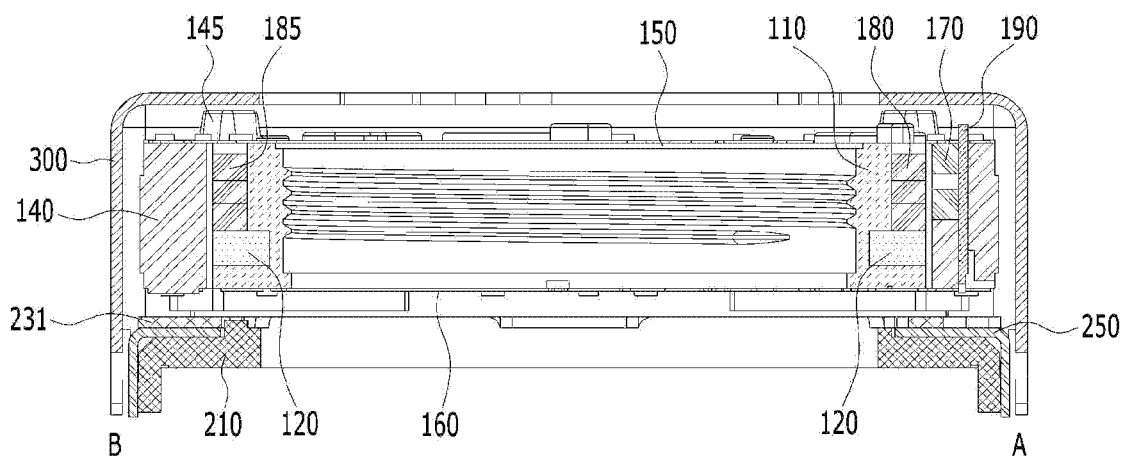
FIG. 5 is a cross-sectional view of the lens moving apparatus shown in FIG. 2 taken in the direction AB.
Figure 6:
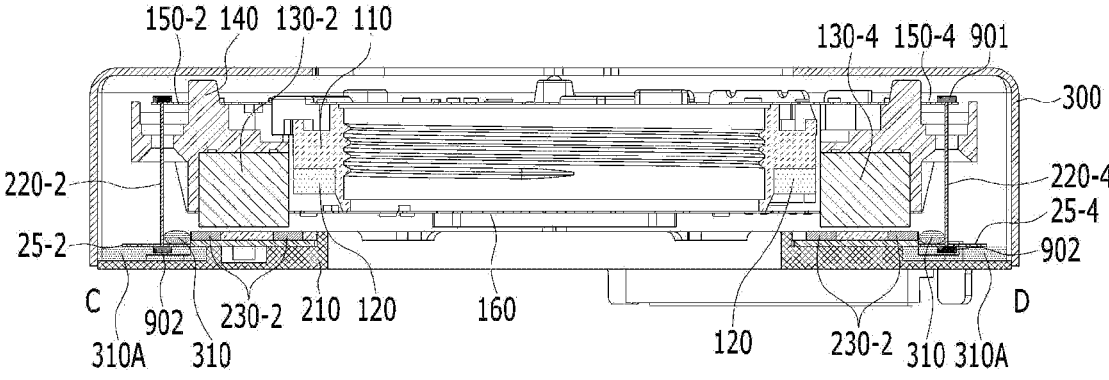
FIG. 6 is a cross-sectional view of the lens moving apparatus shown in FIG. 2 taken in the direction CD.

FIG. 5 is a cross-sectional view of the lens moving apparatus 100 shown in FIG. 2 taken in the direction AB, and FIG. 6 is a cross-sectional view of the lens moving apparatus 100 shown in FIG. 2 taken in the direction CD.

Referring to FIGS. 5 and 6, each of the second and third magnets 180 and 185 may not overlap the first coil 120 in a direction perpendicular to the optical axis OA or in a direction parallel to a line that is perpendicular to the optical axis and extends through the optical axis, but the disclosure is not limited thereto. In another embodiment, each of the second and third magnets 180 and 185 may overlap the first coil 120.

In addition, at the initial position of the AF operation unit, the second magnet 180 may overlap or be aligned with the third magnet 185 in a direction perpendicular to the optical axis OA or in a direction parallel to a line that is perpendicular to the optical axis and extends through the optical axis, but the disclosure is not limited thereto. In another embodiment, the second magnet 180 and the third magnet 185 may not overlap each other.

In addition, at the initial position of the AF operation unit, the first position sensor 170 may overlap the second and third magnets 180 and 185 in a direction perpendicular to the optical axis OA or in a direction parallel to a line that is perpendicular to the optical axis and extends through the optical axis, but the disclosure is not limited thereto. In another embodiment, the first position sensor 170 may not overlap at least one of the second magnet 180 or the third magnet 185.

In addition, the first position sensor 170 may not overlap the first magnet 130 in a direction perpendicular to the optical axis OA or in a direction parallel to a line that is perpendicular to the optical axis and extends through the optical axis.

In an example, the first position sensor 170 may not overlap the first magnet 130 in a direction from the first position sensor 170 toward the first coil 120 or in a direction that is perpendicular to the optical axis and is oriented from the first side portion 141-1 of the housing 140 toward the center of the housing 140.

Next, the circuit board 190 and the first position sensor 170 will be described.

The circuit board 190 may be disposed in or coupled to the housing 140.

In an example, the circuit board 190 may be disposed on or coupled to one side portion 141-1 of the housing 140. The first position sensor 170 may be disposed or mounted on the circuit board 190. In an example, the circuit board 190 may be disposed in the mounting recess 14*a* in the housing 140.

In an example, the circuit board 190 may be disposed between the first corner portion 142-1 and the second corner portion 142-2 of the housing 140, and first to fourth terminals B1 to B4 of the circuit board 190 may be conductively connected to the first position sensor 170.

In an example, the circuit board 190 may not overlap an imaginary line that connects the corner portion (e.g. the first corner portion 142-1) (or the corner) of the housing 140 to the optical axis OA. The reason for this is to inhibit spatial interference between the support member 220 and the circuit board 190.

Figure 7A:
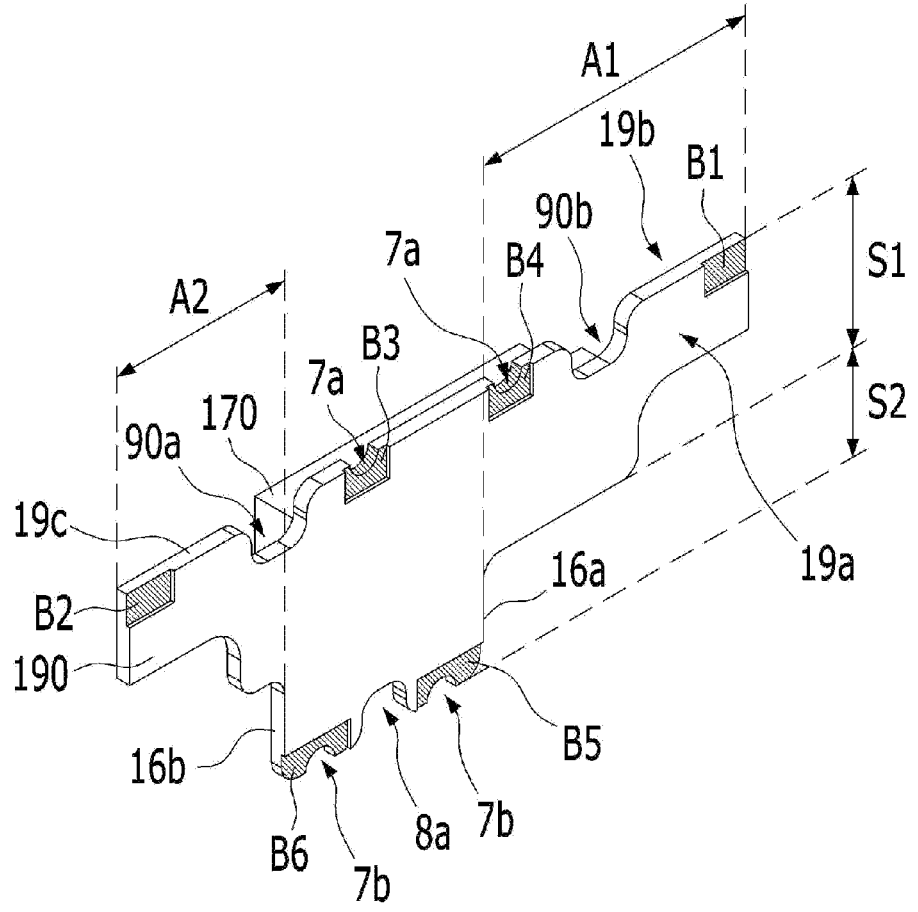
FIG. 7A is an enlarged view of the circuit board and the first position sensor.
Figure 7B:
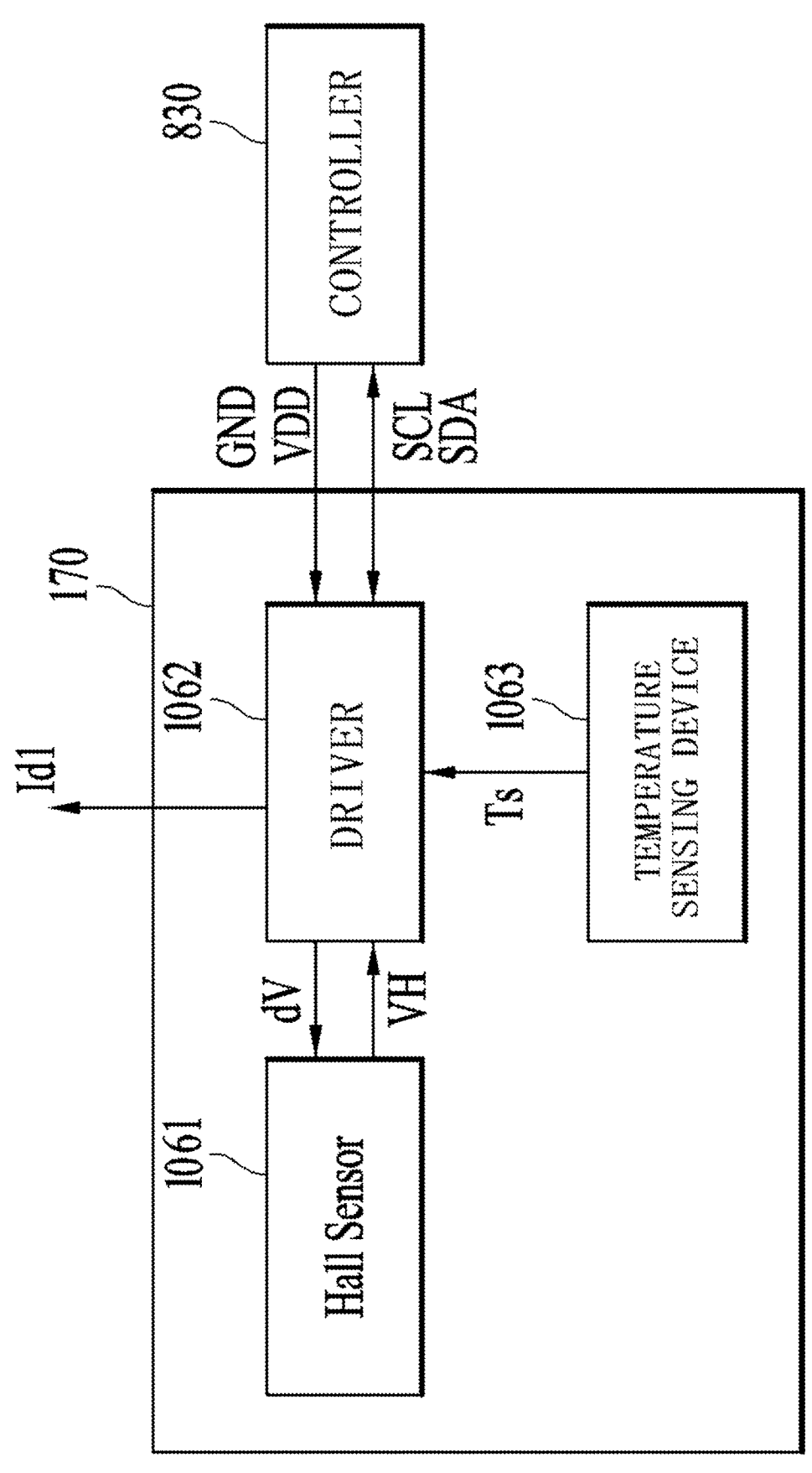
FIG. 7B is a diagram showing the configuration of an embodiment of the first position sensor shown in FIG. 7A.

FIG. 7A is an enlarged view of the circuit board 190 and the first position sensor 170, and FIG. 7B is a diagram showing the configuration of an embodiment of the first position sensor 170 shown in FIG. 7A.

Referring to FIGS. 7A and 7B, the circuit board 190 may include terminals B1 to B6, which are conductively connected to external terminals or external devices.

The first position sensor 170 may be disposed on the first surface 19*b* of the circuit board 190, and the terminals B1 to B6 may be disposed on the second surface 19*a* of the circuit board 190. However, the disclosure is not limited thereto.

In another embodiment, the first position sensor 170 and the terminals B1 to B6 may be disposed on one of the first surface and the second surface of the circuit board 180. In still another embodiment, the first position sensor 170 may be disposed on one of the first and second surfaces of the circuit board 180, and the terminals B1 to B6 may be disposed on the other of the first and second surfaces of the circuit board 180.

Here, the second surface 19*a* of the circuit board 190 may be the surface opposite the first surface 19*b* of the circuit board 190. In an example, the second surface 19*a* of the circuit board 190 may be the surface of the circuit board 190 that faces the bobbin 110.

The circuit board 190 may include a body portion S1 and an extension portion S2, which is located under the body portion S1. The body portion S1 may be referred to as an "upper end portion", and the extension portion S2 may be referred to as a "lower end portion".

The extension portion S2 may extend downwards from the body portion S1.

The body portion S1 may have a form protruding from side surfaces 16*a* and 16*b* of the extension portion S2. In an example, the side surfaces 16*a* and 16*b* of the extension portion S2 may be surfaces connecting the first surface 19*b*
of the extension portion S2 to the second surface 19*a* of the
extension portion S2.

The body portion S1 may include a first extension region
A1, which extends in a direction toward the first corner
portion 142-1 of the housing 140, and a second extension
region A2, which extends in a direction toward the second
corner portion 142-2 of the housing 140.

In an example, the first extension region A1 may extend
or protrude from the first side surface 16*a* of the extension
portion S2, and the second extension region A2 may extend
or protrude from the second side surface 16*b* of the exten-
sion portion S2.

In an example, the length of the first extension region A1
in the transverse direction is illustrated in FIG. 7A as being
longer than the length of the second extension region A2 in
the transverse direction, but the disclosure is not limited
thereto. In another embodiment, the length of the first
extension region A1 in the transverse direction may be equal
to or shorter than the length of the second extension region
A2 in the transverse direction.

In an example, the length of the body portion S1 of the
circuit board 190 in the transverse direction may be longer
than the length of the extension portion S2 in the transverse
direction.

In an example, the first to fourth terminals B1 to B4 of the
circuit board 190 may be disposed on the second surface 19*a*
of the body portion S1 so as to be spaced apart from each
other. In an example, the four terminals B1 to B4 may be
disposed in a line in the transverse direction of the circuit
board 190.

The first terminal B1 and the second terminal B2 may be
disposed adjacent to respective ends of the body portion S1
of the circuit board 190. That is, each of the first terminal B1
and the second terminal B2 may be disposed adjacent to a
corresponding one of the two ends of the body portion S1 of
the circuit board 190.

In an example, the first terminal B1 of the circuit board
190 may be disposed on one end of the circuit board 190
(e.g. one end of the upper end portion), the second terminal
B1 may be disposed on the other end of the circuit board
190, the third terminal B3 may be disposed between the first
terminal B1 and the second terminal B2, and the fourth
terminal B4 may be disposed between the third terminal B3
and the first terminal B1.

The first terminal B1 of the circuit board 190 may be
disposed in the first extension region A1 of the body portion
S1 of the circuit board 190, and the second terminal B2 may
be disposed in the second extension region A2 of the body
portion S1 of the circuit board 190.

The first to fourth terminals B1 to B4 may be disposed
closer to the upper surface 19*c* than to the lower surface of
the circuit board 190.

In an example, the first to fourth terminals B1 to B4 may
be formed so as to be contiguous with the second surface
19*a* and the upper surface 19*c* of the body portion S1 of the
circuit board 190, which is contiguous with the second
surface 19*a*.

In addition, in an example, at least one of the first to fourth
terminals B1 to B4 may include a recess 7*a* or a via formed
in the upper surface 19*c* of the circuit board 190.

In an example, each of the third terminal B3 and the fourth
terminal B4 may include a curved surface portion that is
recessed from the upper surface 19*c* of the circuit board 190,
e.g. a semicircular-shaped via or recess 7*a*.

The recess 7*a* functions to increase the contact area
between solder and the terminals B3 and B4, thereby
increasing adhesive force and improving soldering effi-
ciency.

The fifth terminal B5 and the sixth terminal B6 of the
circuit board 190 may be disposed on the second surface 19*a*
of the extension portion S2 of the circuit board 190 so as to
be spaced apart from each other.

The circuit board 190 may have a recess 8*a* or a hole
formed between the fifth terminal B5 and the sixth terminal
B6. The recess 8*a* may be recessed from the lower surface
of the circuit board 190, and may be open both to the first
surface 19*b* and to the second surface 19*a* of the circuit
board 190.

The spacing distance between the fifth terminal B5 and
the sixth terminal B6 may be shorter than the spacing
distance between two adjacent ones of the first to fourth
terminals B1 to B4. When soldering for conductive connec-
tion to an external device is performed, solder is inhibited
from being applied to the portion between the fifth terminal
B5 and the sixth terminal B6 by virtue of the recess 8*a*,
thereby inhibiting an electrical short between the fifth ter-
minal B5 and the sixth terminal B6.

In addition, in an example, at least one of the fifth and
sixth terminals B5 and B6 may include a recess 7*b* or a via,
which is formed in the lower surface of the circuit board 190.

In an example, each of the fifth terminal B5 and the sixth
terminal B6 may include a curved surface portion that is
recessed from the lower surface of the circuit board 190, e.g.
a semicircular-shaped via or recess.

The recess 7*b* functions to increase the contact area
between solder and the fifth and sixth terminals B5 and B6,
thereby increasing adhesive force and improving soldering
efficiency.

The circuit board 190 may include a recess 90*a* formed
between the second terminal B2 and the third terminal B3
and a recess 90*b* formed between the first terminal B1 and
the fourth terminal B4. Here, each of the recesses 90*a* and
90*b* may be referred to as an "escape recess".

Each of the first recess 90*a* and the second recess 90*b* may
be recessed from the upper surface 19*c* of the circuit board
190, and may be open both to the first surface 19*b* and to the
second surface 19*a* of the circuit board 190.

The first recess 90*a* in the circuit board 190 may be
formed in order to avoid spatial interference with a first outer
frame 151 of a third upper elastic unit 150-3, and the second
recess 90*b* in the circuit board 190 may be formed in order
to avoid spatial interference with a first outer frame 151 of
a fourth upper elastic unit 150-4.

In an example, the circuit board 190 may be embodied as
a printed circuit board or an FPCB.

The circuit board 190 may include a circuit pattern or a
wire (not shown) for conductively connecting the first to
sixth terminals B1 to B6 to the first position sensor 170.

The first position sensor 170 may detect the magnetic field
or the intensity of the magnetic field of the second magnet
180, which is mounted on the bobbin 110, during movement
of the bobbin 110, and may output an output signal corre-
sponding to the result of the detection.

The first position sensor 170 may be mounted on the
circuit board 190 disposed in the housing 140, and may be
secured to the housing 140. In an example, the first position
sensor 170 may be disposed in the mounting recess 14*b* in
the housing 190, and may be moved together with the
housing 140 during handshake correction.

The first position sensor 170 may be disposed on the first
surface 19*b* of the circuit board 190. In another embodiment, the first position sensor 170 may be disposed on the second surface 19a of the circuit board 190.

The first position sensor 170 may include a Hall sensor 1061 and a driver 1062.

In an example, the Hall sensor 1061 may be made of a silicon-based material, and the output VH of the Hall sensor 1061 may increase as the ambient temperature increases. In an example, the ambient temperature may be the temperature of the lens moving apparatus, for example, the temperature of the circuit board 190, the temperature of the Hall sensor 1061, or the temperature of the driver 1062.

In another embodiment, the Hall sensor 1061 may be made of GaAs, and the output VH of the Hall sensor 1061 may decrease as the ambient temperature increases. In another embodiment, the output of the Hall sensor 1061 may have a slope of about −0.06%/° C. with respect to the ambient temperature.

The first position sensor 170 may further include a temperature-sensing element 1063 capable of detecting the ambient temperature. The temperature-sensing element 1063 may output a temperature detection signal Ts corresponding to the result of detection of the ambient temperature of the first position sensor 170 to the driver 1062.

In an example, the Hall sensor 1061 of the first position sensor 190 may generate the output VH corresponding to the result of detection of the intensity of the magnetic force of the second magnet 180. In an example, the intensity of the output of the first position sensor 190 may be proportional to the intensity of the magnetic force of the second magnet 180.

The driver 1062 may output a drive signal dV for driving the Hall sensor 1061 and a drive signal Id1 for driving the first coil 120.

In an example, the driver 1062 may receive a clock signal SCL, a data signal SDA, and power signals VDD and GND from the controller 830 or 780 through data communication using a protocol such as I2C communication.

Here, the second power signal VDD may be a predetermined voltage for driving the driver 1062. The first power signal GND may be a ground voltage or 0 V, but the disclosure is not limited thereto. In another embodiment, the first power signal GND may be a voltage lower than the second power signal. In an example, each of the first and second power signals may be a DC voltage and/or an AC voltage, but the disclosure is not limited thereto.

The driver 1062 may generate a drive signal dV for driving the Hall sensor 1061 and a drive signal Id1 for driving the first coil 120 using the clock signal SCL and the power signals VDD and GND.

The first position sensor 170 may include four terminals for transmitting and receiving the clock signal SCL, the data signal SDA, and the power signals VDD and GND and two terminals for supplying a drive signal to the first coil 120.

In addition, the driver 1062 may receive the output VH of the Hall sensor 1061, and may transmit the clock signal SCL and the data signal SDA, corresponding to the output VH from the Hall sensor 1061, to the controller 830 or 780 through data communication using a protocol such as I2C communication.

In addition, the driver 1062 may receive the temperature detection signal Ts detected by the temperature-sensing element 1063, and may transmit the temperature detection signal Ts to the controller 830 or 780 through data communication using a protocol such as I2C communication.

The controller 830 or 780 may perform temperature compensation for the output VH from the Hall sensor 1061 based on a change in ambient temperature detected by the temperature-sensing element 1063 of the first position sensor 170.

In an example, when the drive signal dV or the bias signal from the Hall sensor 1061 is 1 mA, the output VH from the Hall sensor 1061 of the first position sensor 170 may be −20 mV to +20 mV, but the disclosure is not limited thereto.

In the case of temperature compensation for the output VH from the Hall sensor 1061, which has a negative slope with respect to a change in ambient temperature, the output VH of the Hall sensor 1061 of the first position sensor 170 may be 0 mV to +30 mV, but the disclosure is not limited thereto.

When the output from the Hall sensor 1061 of the first position sensor 170 is plotted on an xy coordinate system, the reason why the range of the output from the Hall sensor 1061 of the first position sensor 170 appears in the first quadrant (e.g. 0 mV to +30 mV) is as follows.

Because the output from the Hall sensor 1061 in the first quadrant of the xy coordinate system and the output from the Hall sensor 1061 in the third quadrant of the xy coordinate system move in opposite directions depending on a change in ambient temperature, the accuracy and reliability of the Hall sensor may decrease when both the first quadrant and the third quadrant are used as AF operation control zones. Accordingly, in order to accurately compensate for the change in ambient temperature, a specific range in the first quadrant may be set to the range of the output from the Hall sensor 1061 of the first position sensor 170.

The first position sensor 170 may include first to fourth terminals for transmitting and receiving the two power signals VDD and GND, the clock signal SCL, and the data signal SDA and fifth and sixth terminals for supplying a drive signal to the first coil 120.

Each of the first to fourth terminals of the first position sensor 170 may be conductively connected to a corresponding one of the first to fourth terminals B1 to B4 of the circuit board 190, and each of the fifth and sixth terminals of the first position sensor 170 may be conductively connected to a corresponding one of the fifth and sixth terminals B5 and B6 of the circuit board 190.

In another embodiment, the first position sensor 170 may be embodied as a single position detection sensor, such as a Hall sensor. In this case, the first position sensor 170 may include two input terminals for receiving power signals and two output terminals for outputting output signals, and a drive signal may be supplied to the first coil 120 from the outside through the circuit board 250.

The first to fourth terminals B1 to B4 of the circuit board 190 may be conductively connected to the terminals 251-1 to 251-n (n being a natural number greater than 1 (n>1)) via the upper elastic units 150-1 to 150-4 and the support members 220-1 to 220-4, whereby the first position sensor 170 may be conductively connected to the terminals 251-1 to 251-n (n=4) of the circuit board 250.

In an example, each of the upper elastic units 150-1 to 150-4 may be directly coupled to a corresponding one of the first to fourth terminals of the circuit board 180 so as to be conductively connected thereto. In addition, one end of each of the support members 220-1 to 220-4 may be directly coupled to a corresponding one of the upper elastic units 150-1 to 150-4, and the other end of each of the support members 220-1 to 220-4 may be directly coupled to the circuit board 250 by means of a conductive adhesive member, such as solder.

In addition, the fifth and sixth terminals B5 and B6 of the circuit board 190 may be coupled to the lower elastic units

160-1 and 160-2, and the first position sensor 170 may be conductively connected to the first coil 120 via the lower elastic units 160-1 and 160-2.

In an example, the fifth terminal B5 of the circuit board 190 may be coupled to the first lower elastic unit 160-1, and the sixth terminal B6 of the circuit board 190 may be coupled to the second lower elastic unit 160-2.

The lens moving apparatus 100 is configured such that the first position sensor 170 is disposed in the housing 140 and the second magnet 180 is disposed on the bobbin 110. In another embodiment, the first position sensor may be disposed on the bobbin, and the second magnet may be disposed in the housing. In this case, the circuit board may be disposed on the bobbin, and the third magnet may be disposed in the housing.

Next, the upper elastic member 150, the lower elastic member 160, and the support member 220 will be described.

Figure 8:
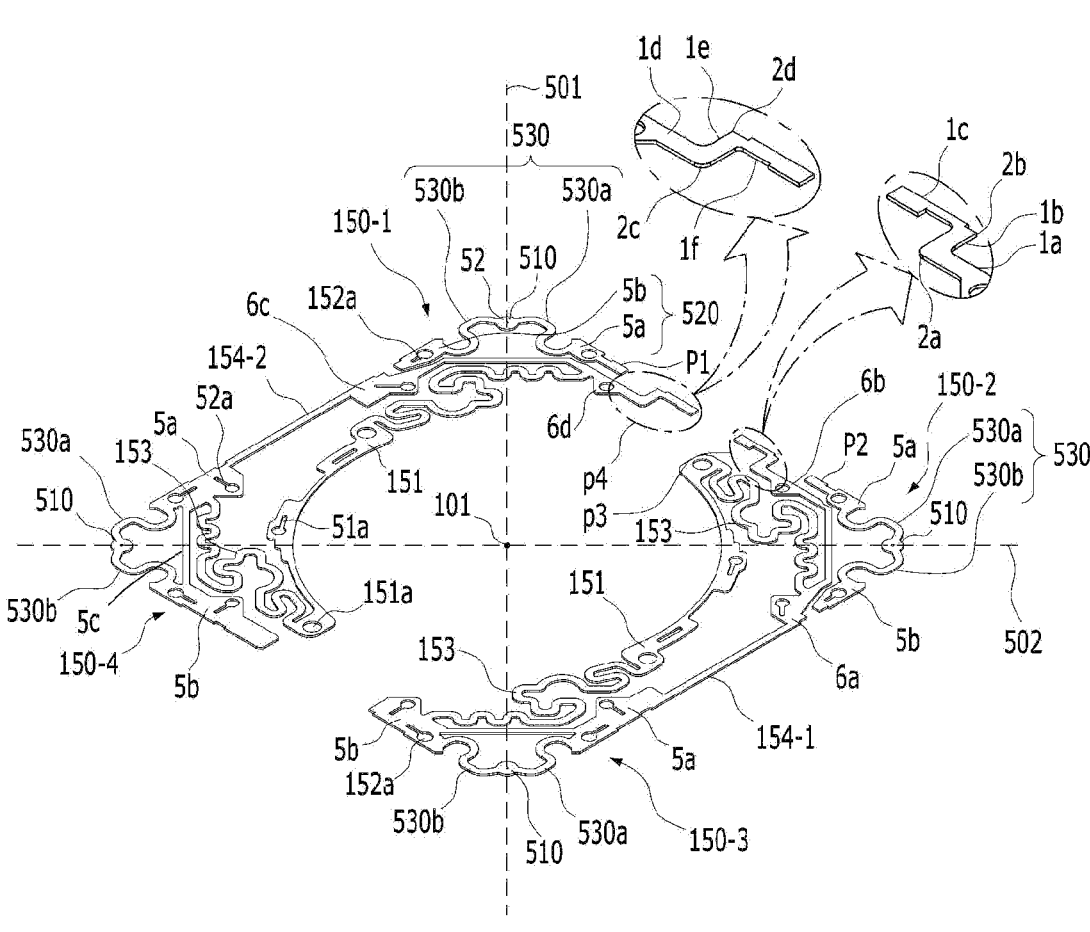
FIG. 8 is a view showing the upper elastic member shown in FIG. 1.
Figure 9:
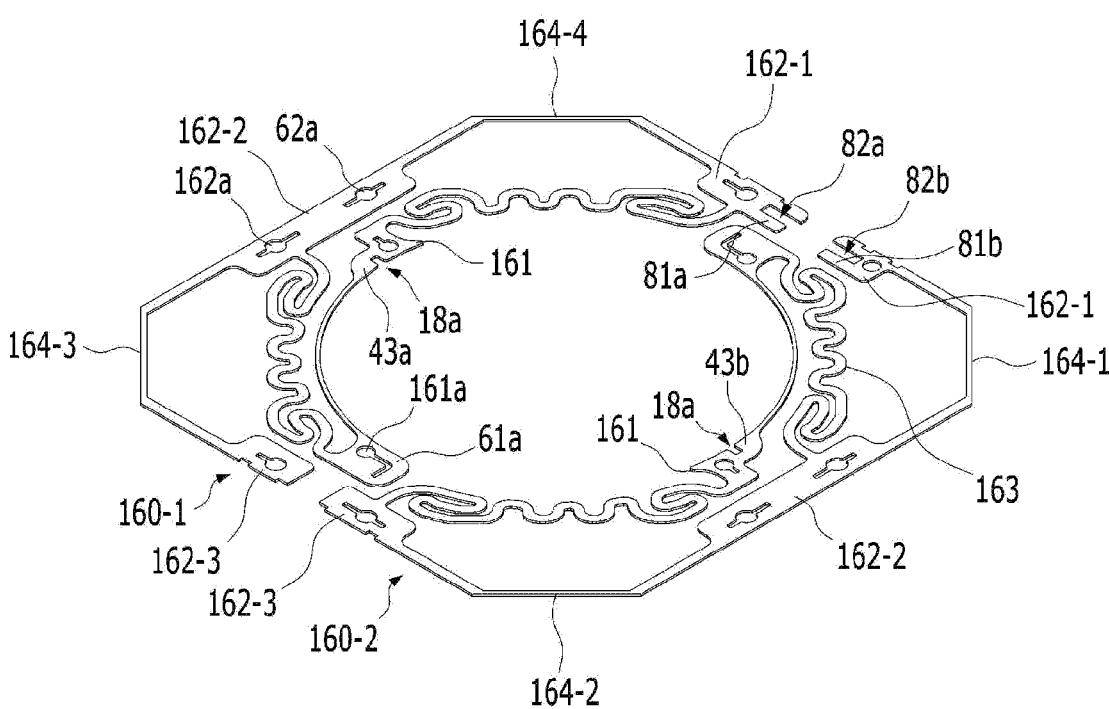
FIG. 9 is a view showing the lower elastic member shown in FIG. 1.
Figure 10:
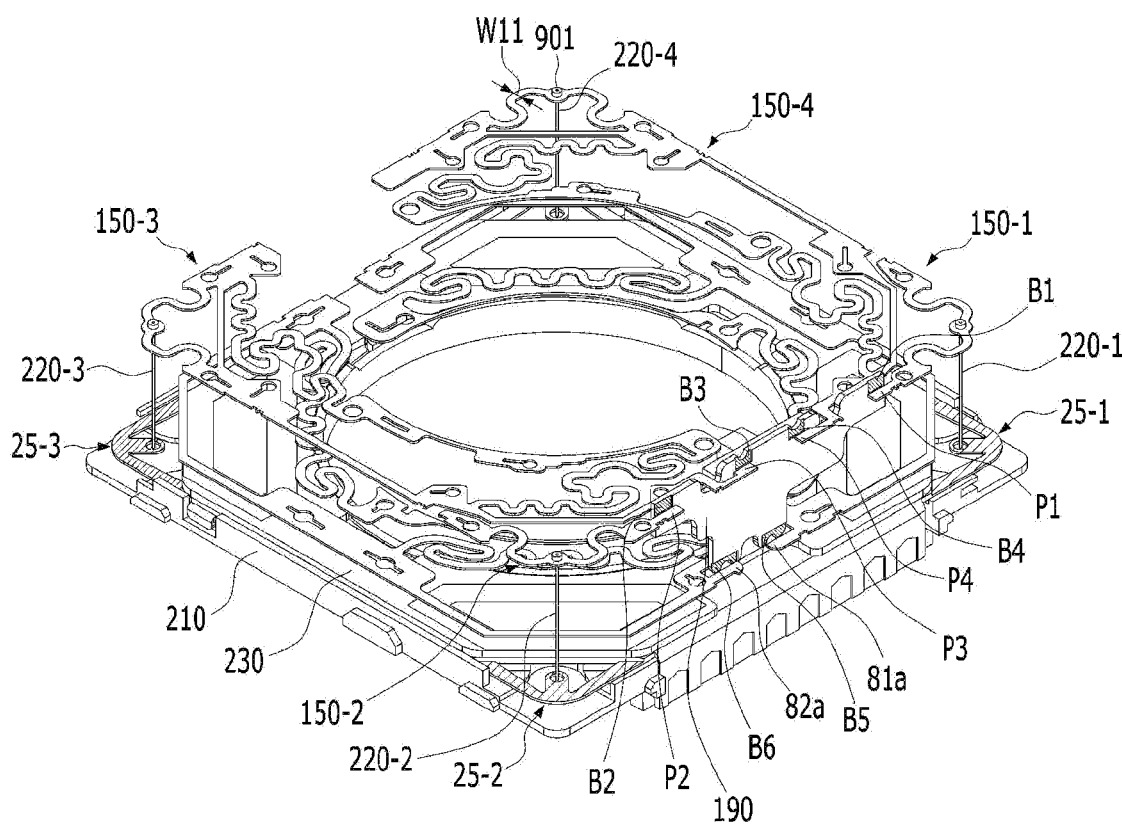
FIG. 10 is an assembled perspective view of the upper elastic member, the lower elastic member, a base, a support member, a second coil, and the circuit board.
Figure 11:
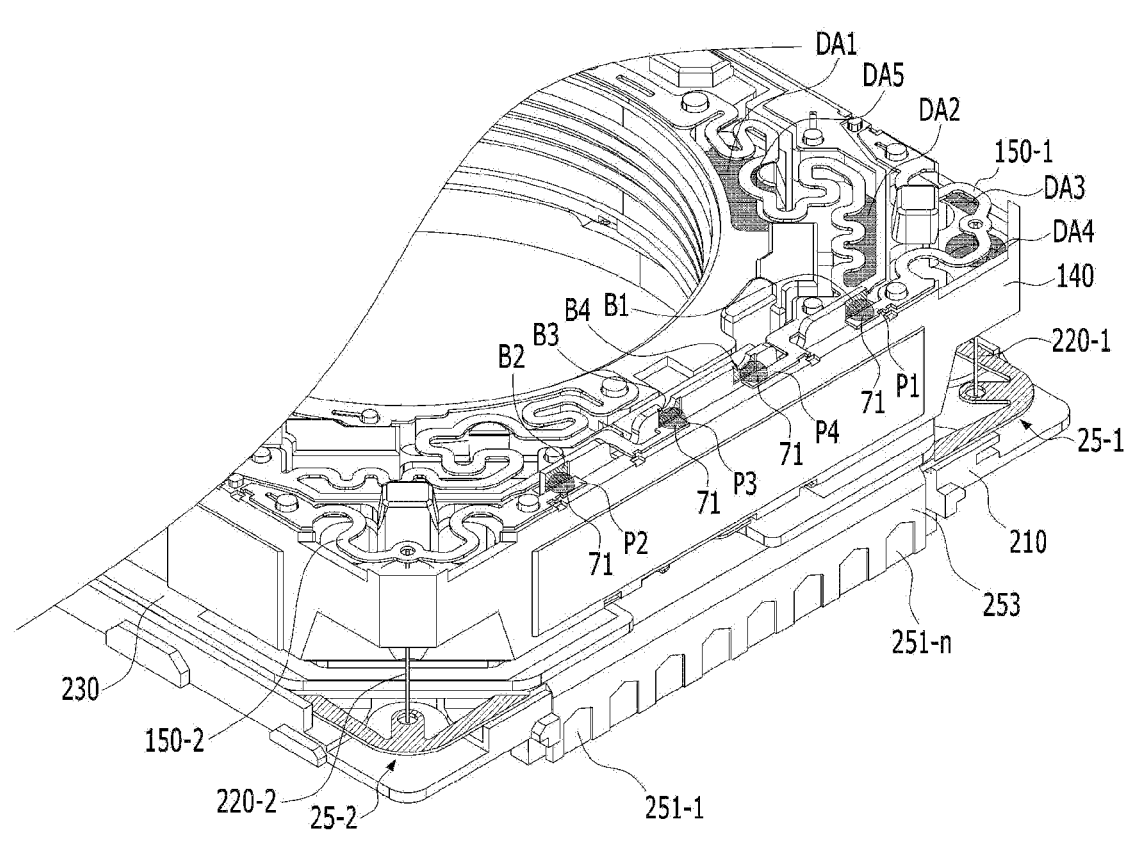
FIG. 11 is a view showing coupling between first to fourth terminals of the circuit board and upper elastic units.
Figure 12:
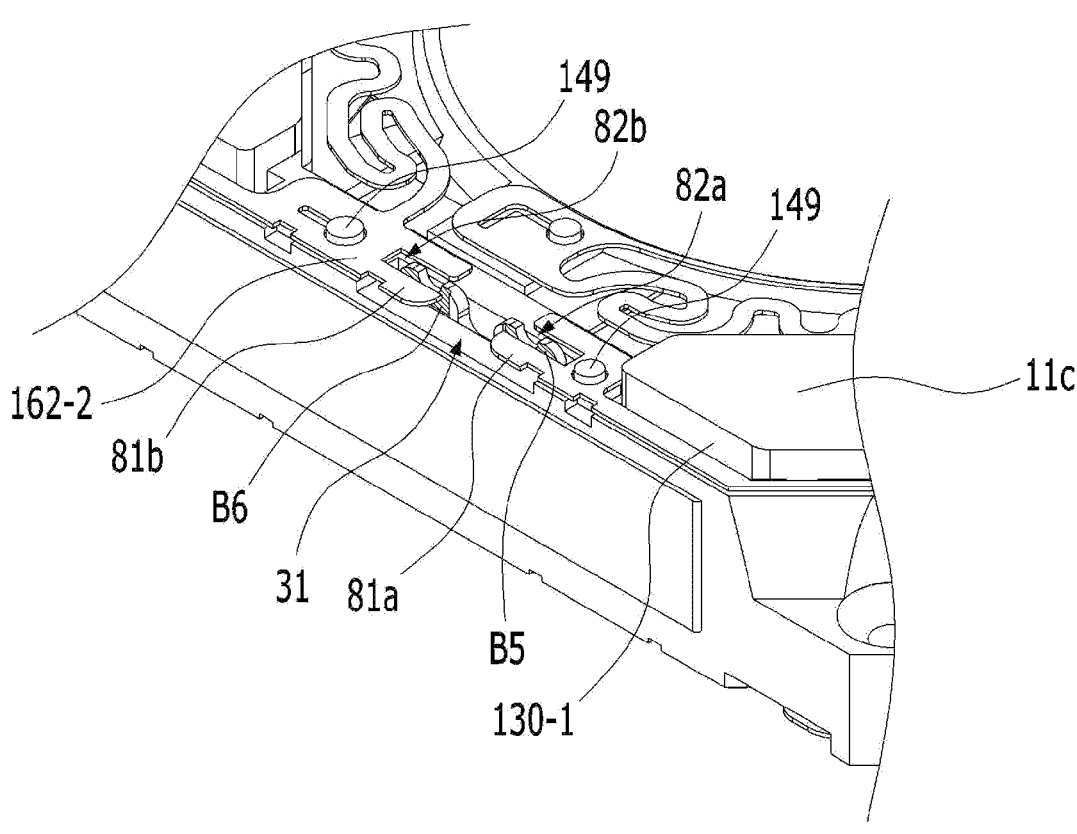
FIG. 12 is a view showing coupling between fifth and sixth terminals of the circuit board and lower elastic units.
Figure 13A:
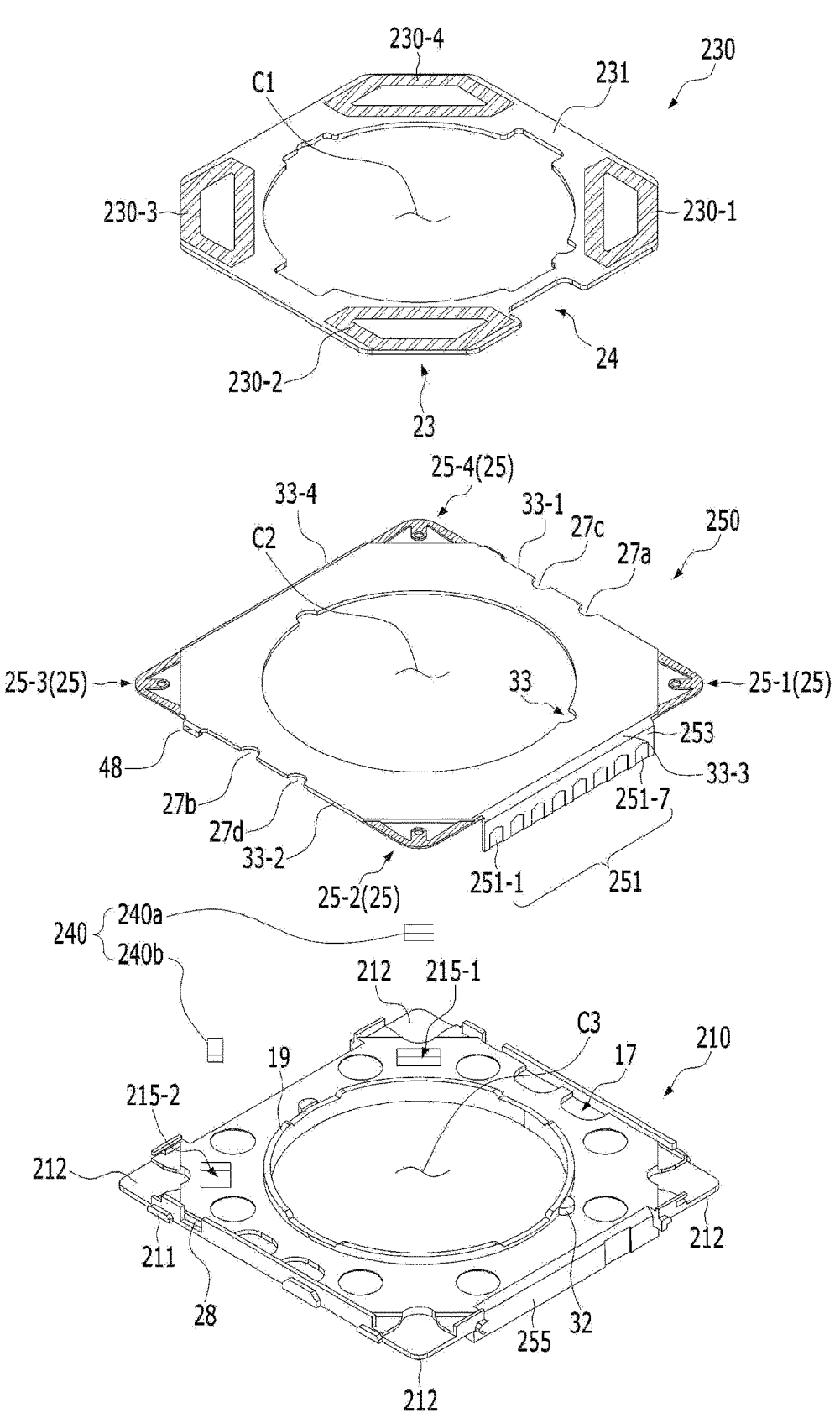
FIG. 13A is an exploded perspective view of the second coil, the circuit board, the base, and a second position sensor.
Figure 13B:
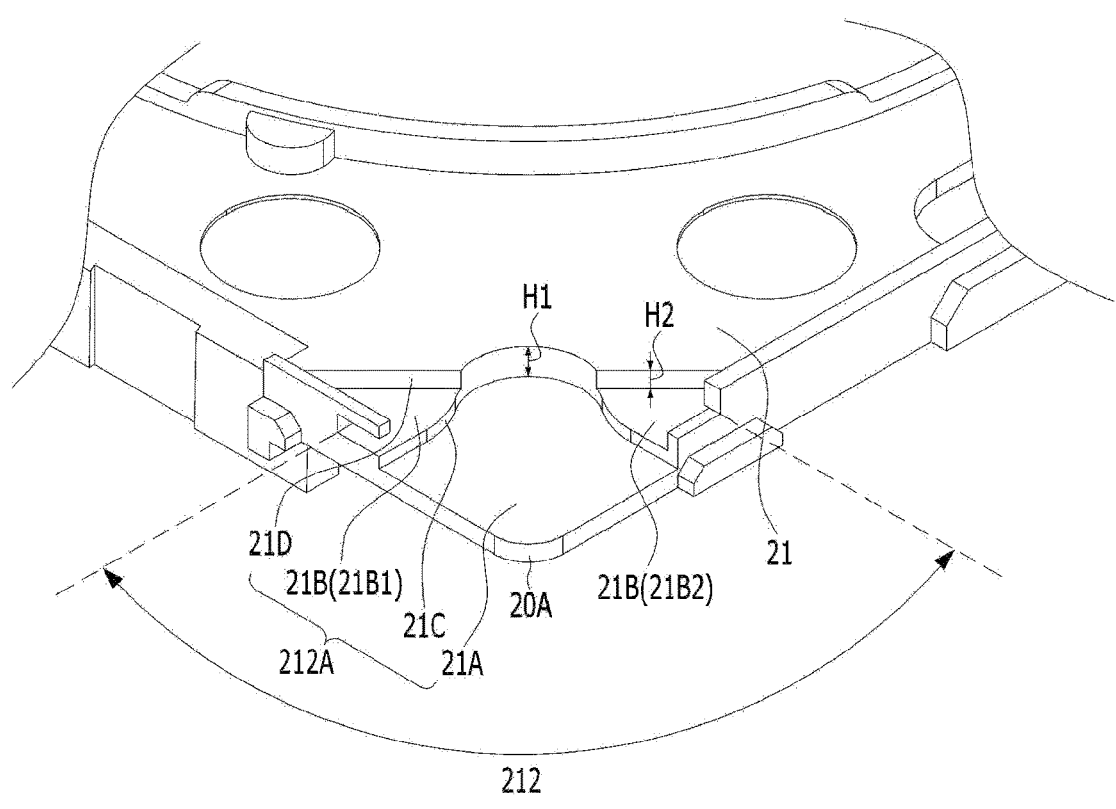
FIG. 13B is an enlarged view of a portion of the base shown in FIG. 13A.
Figure 14:
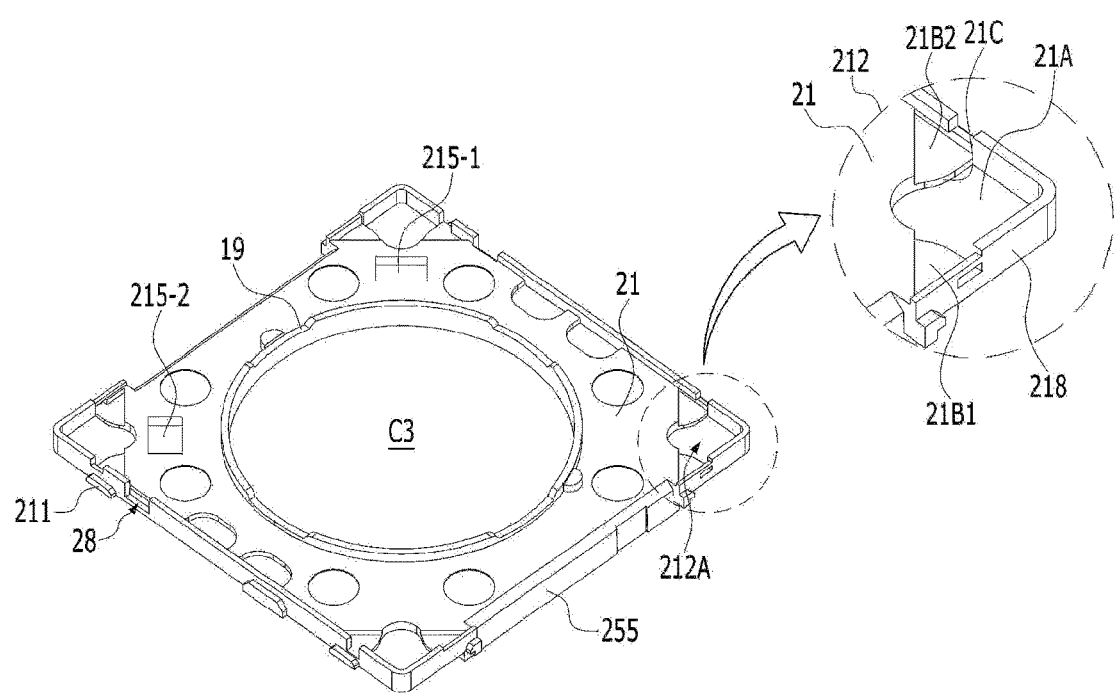
FIG. 14 is a perspective view of a base according to another embodiment.
Figure 15:
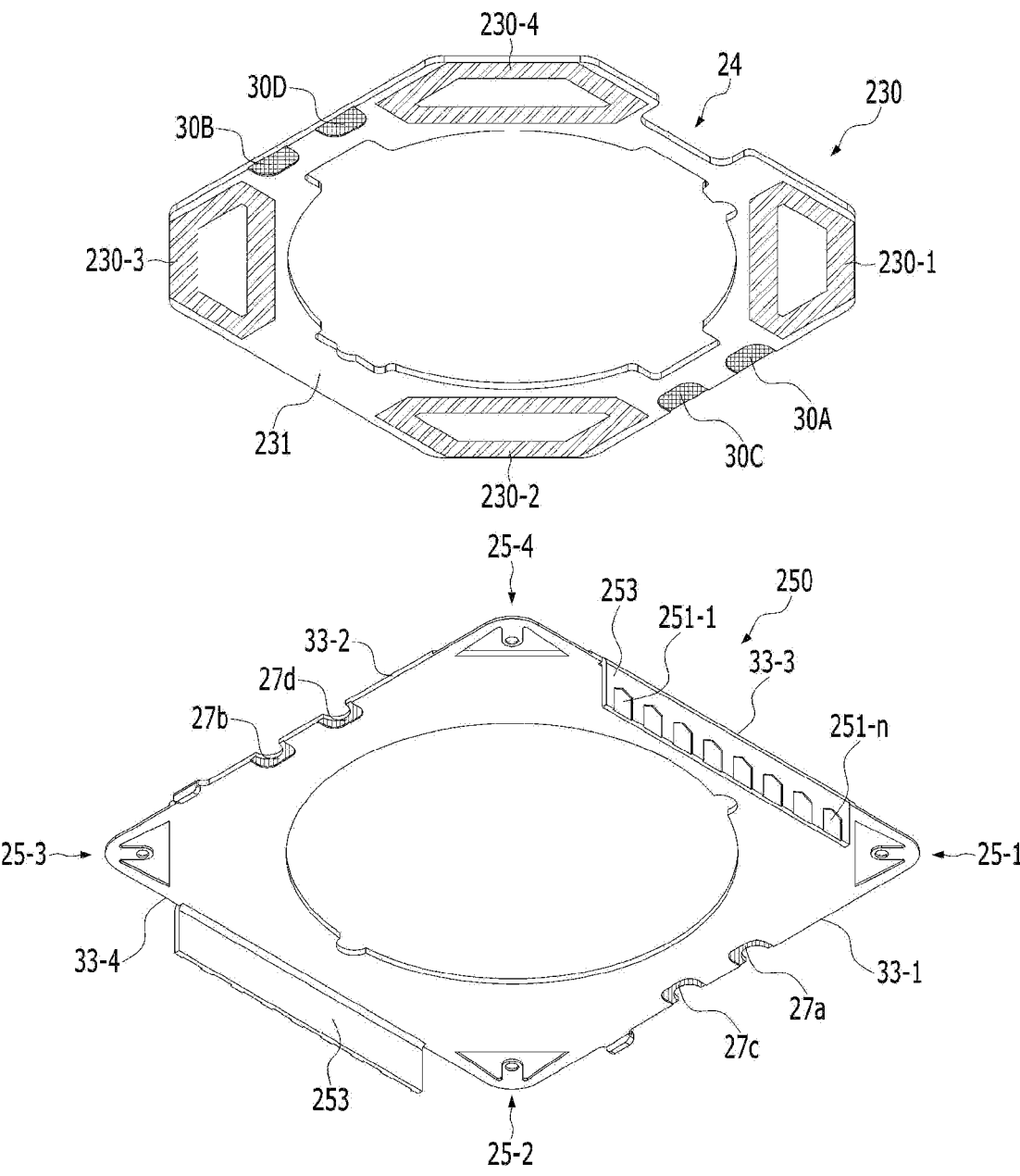
FIG. 15 is a bottom view of the second coil and the circuit board.
Figure 16:
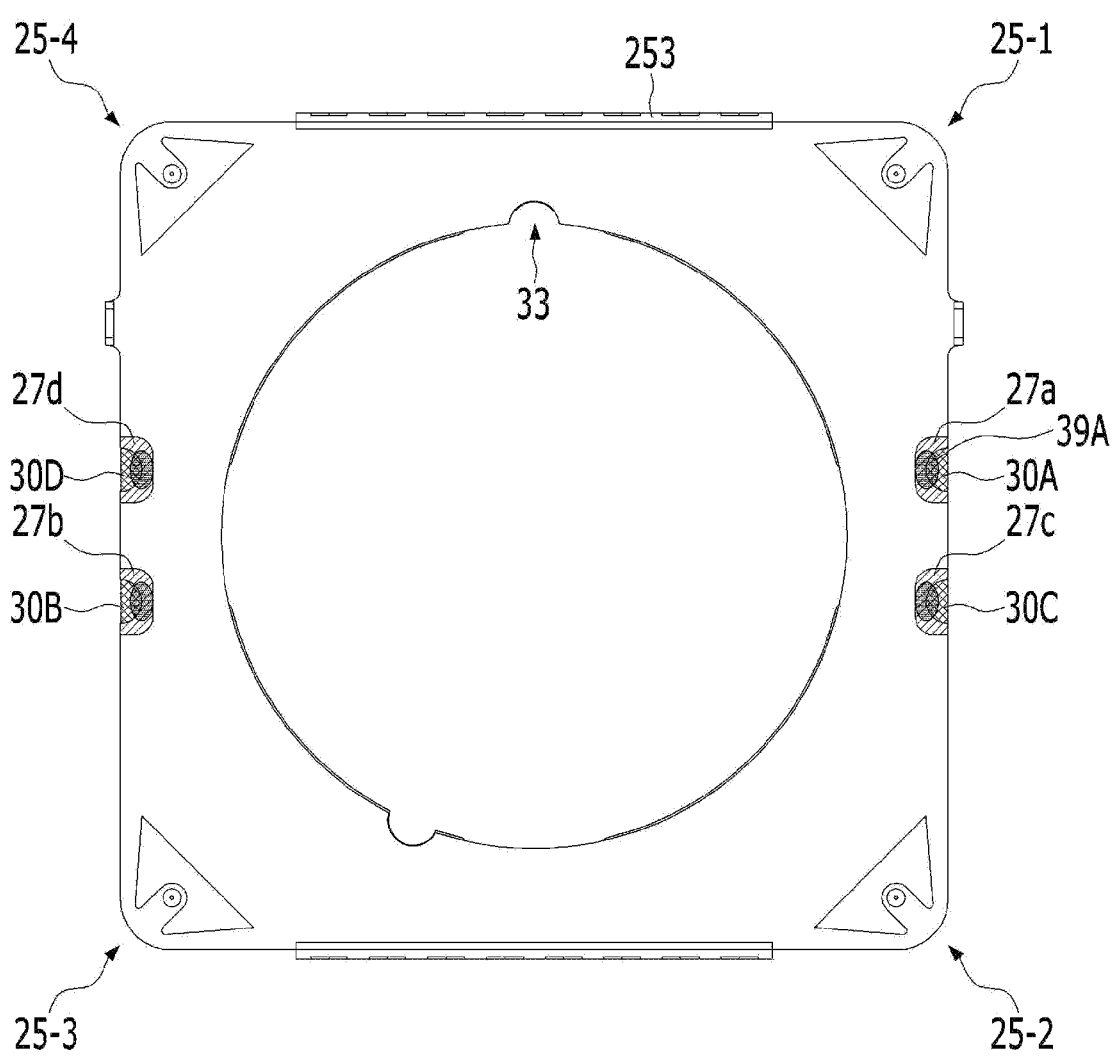
FIG. 16 is a bottom view of the second coil, the circuit board, and solder.
Figure 17:
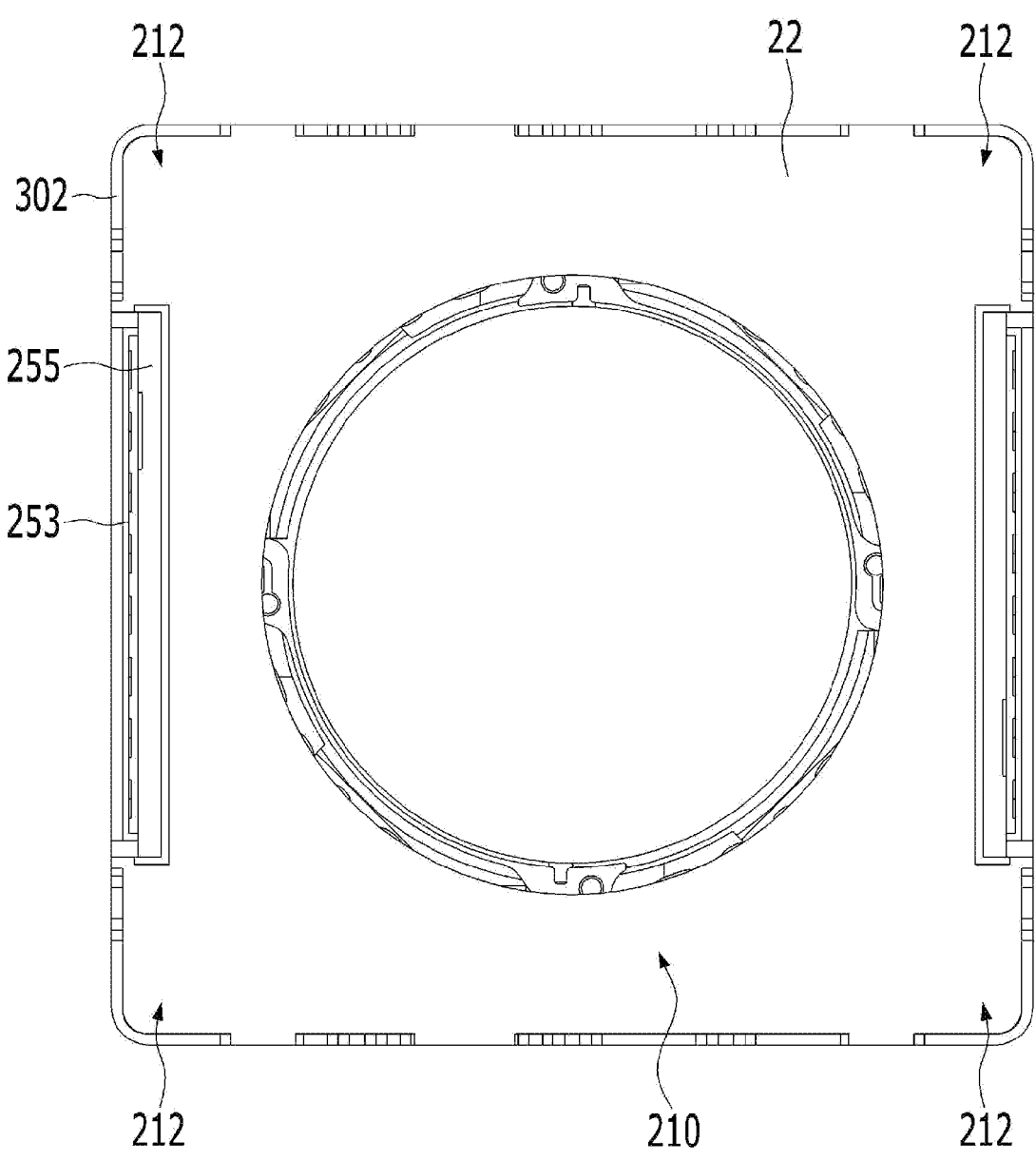
FIG. 17 is a bottom view of the lens moving apparatus shown in FIG. 1.

FIG. 8 is a view showing the upper elastic member 150 shown in FIG. 1, FIG. 9 is a view showing the lower elastic member 160 shown in FIG. 1, FIG. 10 is an assembled perspective view of the upper elastic member 150, the lower elastic member 160, the base 210, the support member 220, the second coil 230, and the circuit board 250, FIG. 11 is a view showing coupling between the first to fourth terminals B1 to B4 of the circuit board 190 and the upper elastic units 150-1 to 150-4, FIG. 12 is a view showing coupling between the fifth and sixth terminals B5 and B6 of the circuit board 190 and the lower elastic units 160-1 and 160-2, FIG. 13A is an exploded perspective view of the second coil 230, the circuit board 250, the base 210, and the second position sensor 240, FIG. 13B is an enlarged view of a portion of the base 210 shown in FIG. 13A, FIG. 14 is a perspective view of a base 210-1 according to another embodiment, FIG. 15 is a bottom view of the second coil 230 and the circuit board 190, FIG. 16 is a bottom view of the second coil 230, the circuit board 250, and the solder 39A, and FIG. 17 is a bottom view of the lens moving apparatus 100 shown in FIG. 1.

Referring to FIGS. 8 to 17, the upper elastic member 150 may be coupled to the upper portion, the upper end, or the upper surface of the bobbin 110, and the lower elastic member 160 may be coupled to the lower portion, the lower end, or the lower surface of the bobbin 110.

In an example, the upper elastic member 150 may be coupled to the upper portion, the upper end, or the upper surface of the bobbin 110 and to the upper portion, the upper end, or the upper surface of the housing 140, and the lower elastic member 160 may be coupled to the lower portion, the lower end, or the lower surface of the bobbin 110 and to the lower portion, the lower end, or the lower surface of the housing 140.

The upper elastic member 150 and the lower elastic member 160 may elastically support the bobbin 110 with respect to the housing 140.

The support member 220 may support the housing 140 so that the housing 140 is movable relative to the base 210 in a direction perpendicular to the optical axis, and may conductively connect at least one of the upper or lower elastic member 150 or 160 to the circuit board 250.

Referring to FIG. 8, the upper elastic member 150 may include a plurality of upper elastic units 150-1 to 150-4, which are conductively isolated from each other. Although four upper elastic units, which are conductively isolated from each other, are illustrated in FIG. 10, the number of upper elastic units is not limited to four. In another embodiment, the number of upper elastic units may be three or more.

Each of the first to fourth upper elastic units 150-1 to 150-4 may be directly coupled to a corresponding one of the first to fourth terminals B1 to B4 of the circuit board 190 so as to be conductively connected thereto.

A portion of each of the plurality of upper elastic units may be disposed on the first side portion 141-1 of the housing 140, on which the circuit board 190 is disposed, and at least one upper elastic unit may be disposed on each of the remaining second to fourth side portions 141-2 to 141-4, other than the first side portion 141-1 of the housing 140.

Each of the first to fourth upper elastic units 150-1 to 150-4 may include a first outer frame 152, which is coupled to the housing 140.

In an example, each of the first to fourth upper elastic units 150-1 to 150-4 may be disposed on a corresponding one of the corner portions of the housing 140, and may include a first outer frame 152, which is coupled to a corresponding one of the corner portions of the housing 140.

At least one of the first to fourth upper elastic units 150-1 to 150-4 may further include a first inner frame 151, which is coupled to the bobbin 110, and a first frame connection portion 153, which interconnects the first inner frame 151 and the first outer frame 152.

In the embodiment shown in FIG. 8, each of the first and second upper elastic units 150-1 and 150-2 may include only the first outer frame, without including the first inner frame or the first frame connection portion, and each of the first and second upper elastic units 150-1 and 150-2 may be spaced apart from the bobbin 110.

Each of the third and fourth upper elastic units 150-3 and 150-4 may include the first inner frame 151, the first outer frame, and the first frame connection portion 153, but the disclosure is not limited thereto.

In an example, the first inner frame 151 of each of the third and fourth upper elastic units 150-3 and 150-4 may have a hole 151a formed therein for coupling to the first coupling portion 113 of the bobbin 110, but the disclosure is not limited thereto. In an example, the hole 152a in the first inner frame 151 may have at least one slit 51a formed between the first coupling portion 113 of the bobbin 110 and the hole 151a, which an adhesive member enters.

The first outer frame 152 of each of the first to fourth upper elastic members 150-1 to 150-4 may have a hole 152a formed therein for coupling to the first coupling portion 143 of the housing 140.

The first outer frame 151 of each of the first to fourth upper elastic units 150-1 to 150-4 may include a body portion, which is coupled to the housing 140, and connection terminals P1 to P4, which are connected to corresponding ones of the first to fourth terminals B1 to B4 of the circuit board 190. Here, the connection terminals P1 to P4 may be referred to as "extension portions". In an example, the support member 220 may be coupled to the body portion of the first outer frame 151.

The first outer frame 151 of each of the first to fourth upper elastic units 150-1 to 150-4 may include a first coupling portion 520, which is coupled to the housing 140, a second coupling portion 510, which is coupled to a corresponding one of the support members 220-1 to 220-4, a connection portion 530, which interconnects the first coupling portion 520 and the second coupling portion 510, and extension portions P1 to P4, which are connected to the first coupling portion 520 and extend to the first side portion 141-1 of the housing 140.

In an example, the body portion of each of the first to fourth upper elastic units 150-1 to 150-4 may be the first coupling portion 520, or may include the first coupling portion 520. In addition, in an example, the body portion of each of the first to fourth upper elastic units 150-1 to 150-4 may further include at least one of the second coupling portion 510 or the connection portion 530.

In an example, using solder or a conductive adhesive member, one end of the first support member 220-1 may be coupled to the second coupling portion 510 of the first upper elastic unit 150-1, one end of the second support member 220-2 may be coupled to the second coupling portion 510 of the second upper elastic unit 150-1, one end of the third support member 220-3 may be coupled to the second coupling portion 510 of the third upper elastic unit 150-3, and one end of the fourth support member 220-4 may be coupled to the second coupling portion 510 of the fourth upper elastic unit 150-4.

The second coupling portion 510 may have a hole 52 formed therein to allow a corresponding one of the support members 220-1 to 220-4 to pass therethrough. One end of a corresponding one of the support members 220-1 to 220-4, which has passed through the hole 52, may be directly coupled to the second coupling portion 510 by means of a conductive adhesive member or solder 910 (refer to FIG. 10), and the second coupling portion 510 and a corresponding one of the support members 220-1 to 220-4 may be conductively connected to each other.

In an example, the second coupling portion 510 may include a hole 52 and a region around the hole 52, where the solder 901 is disposed for coupling to a corresponding one of the support members 220-1 to 220-4.

The first coupling portion 520 may include at least one coupling region (e.g. 5a or 5b), which is coupled to the housing 140 (e.g. the corner portions 142-1 to 142-4).

In an example, the coupling region (e.g. 5a or 5b) of the first coupling portion 520 may have at least one hole 152a formed therein for coupling to the first coupling portion 143 of the housing 140.

In an example, each of the coupling regions 5a and 5b may have one or more holes formed therein, and each of the corner portions 142-1 to 142-4 of the housing 140 may be provided with one or more first coupling portions, which correspond to the holes.

In an example, in order to support the housing 140 in an equilibrium state, the coupling regions 5a and 5b of the first coupling portions 520 of the first to fourth upper elastic units 150-1 to 150-4 may be symmetrically formed based on reference lines (e.g. 501 and 502), but the disclosure is not limited thereto.

In addition, the first coupling portions 143 of the housing 140 may be symmetrically disposed based on the reference lines (e.g. 501 and 502). Two of the first coupling portions 143 may be located on each side of each of the reference lines, but the disclosure is not limited thereto.

Each of the reference lines 501 and 502 may be a line that extends between a center point 101 and one of the corners of the corner portions 142-1 to 142-4 of the housing 140. In an example, each of the reference lines 501 and 502 may be a line that extends through the center point 101 and two corners, which face each other in the diagonal direction of the housing 140, among the corners of the corner portions 142-1 to 142-4 of the housing 140.

Here, the center point 101 may be the center of the housing 140, the center of the bobbin 110, or the center of the upper elastic member 150. The center point 101 may be the spatial center of the above component 140, 110, or 150.

In addition, in an example, the corner of each of the corner portions of the housing 140 may be a corner that is aligned with or corresponds to the center of a corresponding one of the corner portions of the housing 140.

In the embodiment shown in FIG. 8, each of the coupling regions 5a and 5b of the first coupling portions 520 of the first outer frame 152 is embodied as having the hole 152a therein, but the disclosure is not limited thereto. In another embodiment, each of the coupling regions may be formed in any of various shapes suitable for coupling to the housing 140, such as a recess shape.

In an example, the hole 152a in the first coupling portion 520 may have at least one slit 52a formed between the first coupling portion 143 of the housing 140 and the hole 152a, which an adhesive member enters.

The connection portion 530 may interconnect the second coupling portion 510 and the first coupling portion 520.

In an example, the connection portion 530 may interconnect the second coupling portion 510 and the coupling regions 5a and 5b of the first coupling portion 520.

In an example, the connection portion 530 may include a first connection portion 530a, which interconnects the first coupling region 5a of the first coupling portion 520 of each of the first to fourth upper elastic units 150-1 to 150-4 and the second coupling portion 510, and a second connection portion 530b, which interconnects the second coupling region 5b of the first coupling portion 520 and the second coupling portion 510.

In an example, the first outer frame 151 may include a connection region 5c, which directly interconnects the first coupling region 5a and the second coupling region 5b, but the disclosure is not limited thereto.

Each of the first and second connection portions 530a and 530b may include a bent portion, which is bent at least once, or a curved portion, which is curved at least once, but the disclosure is not limited thereto. In another embodiment, each of the first and second connection portions may be linear.

The width of the connection portion 530 may be less than the width of the first coupling portion 520. Furthermore, the width of the connection portion 530 may be less than the width (or the diameter) of the first coupling portion. In another embodiment, the width of the connection portion 530 may be equal to the width of the first coupling portion 520, and may be equal to the width (or the diameter) of the first coupling portion.

In an example, the first coupling portions 520 may be in contact with the upper surfaces of the corner portions 142-1 to 142-4 of the housing 140, and may be supported by the corner portions 142-1 to 142-4 of the housing 140. In an example, the connection portion 530 may not be supported by the upper surface of the housing 140, and may be spaced apart from the housing 140. In addition, in order to inhibit oscillation caused by vibration, the space between the connection portion 530 and the housing 140 may be filled with a damper (refer to DA3 in FIG. 11).

The width of each of the first and second connection portions 530a and 530b may be less than the width of the first coupling portion 520, whereby the connection portion 530 may be easily moved in the first direction. Consequently, it is possible to distribute the stress applied to the upper elastic units 150-1 to 150-4 and the stress applied to the support members 220-1 to 220-4.

Each of the first and second extension portions P1 and P2 of the first outer frames of the first and second upper elastic units 150-1 and 150-2 may extend toward a corresponding one of the first and second terminals B1 and B2 of the circuit board 190, which are located at the first side portion 141-1 of the housing 140, from the first coupling portion 520 (e.g. the first coupling region 5a).

The first coupling portion 520 of the third upper elastic unit 150-3 may further include at least one coupling region 6a or 6b, which is connected to at least one of the fourth side portion 141-4 or the second corner portion 142-2 of the housing 140.

In addition, the first coupling portion 520 of the fourth upper elastic unit 150-4 may further include at least one coupling region 6c or 6d, which is connected to at least one of the third side portion 141-3 or the first corner portion 142-1 of the housing 140.

Each of the third and fourth extension portions P3 and P4 of the first outer frames of the third and fourth upper elastic units 150-3 and 150-4 may extend toward a corresponding one of the third and fourth terminals B3 and B4 of the circuit board 190, which are located at the first side portion 141-1 of the housing 140, from the first coupling portion 520 (e.g. the coupling region 6b or 6d).

One end of each of the first to fourth extension portions P1 to P4 may be coupled to a corresponding one of the first to fourth terminals B1 to B4 of the circuit board 190 by means of solder or a conductive adhesive member.

Each of the first and second extension portions P1 and P2 may have a linear shape, but the disclosure is not limited thereto. In another embodiment, each of the first and second extension portions may include a bent portion or a curved portion.

In order to facilitate coupling to a corresponding one of the third and fourth terminals B3 and B4 of the circuit board 190, each of the third and fourth extension portions P3 and P4 may include a bent portion or a curved portion.

The first outer frame of the third upper elastic unit 150-3 may further include a first extension frame 154-1, which is connected both to the first coupling portion 520 and to the extension portion P3 and is located at the fourth side portion 141-4 and the second corner portion 142-2 of the housing 140.

In order to increase the coupling force between the first extension frame 154-1 and the housing 140 to thus inhibit the third upper elastic unit 150-3 from lifting, the first extension frame 154-1 may include at least one coupling region 6a or 6b, which is coupled to the housing 140, and each of the coupling regions 6a and 6b may have a hole formed therein for coupling to the first coupling portion 143 of the housing 140.

The first outer frame of the fourth upper elastic unit 150-4 may further include a second extension frame 154-2, which is connected both to the first coupling portion 520 and to the extension portion P4 and is located at the third side portion 141-3 and the first corner portion 142-1 of the housing 140.

In order to increase the coupling force between the second extension frame 154-2 and the housing 140 to thus inhibit the fourth upper elastic unit 150-4 from lifting, the second extension frame 154-2 may include at least one coupling region 6c or 6d, which is coupled to the housing 140, and each of the coupling regions 6c and 6d may have a hole formed therein for coupling to the first coupling portion 143 of the housing 140.

Although each of the third upper elastic unit 150-3 and the fourth upper elastic unit 150-4 is illustrated in FIG. 8 as including two first frame connection portions, the disclosure is not limited thereto. The number of first frame connection portions may be one, or three or more.

As described above, each of the first to fourth upper elastic units may include the extension portions P1 to P4, which are disposed on the first side portion 141-1 of the housing 140. By virtue of the extension portions P1 to P4, the upper elastic units 150-1 to 150-4 may be easily coupled to the first to fourth terminals B1 to B4, which are provided at the body portion S1 of the circuit board 190.

Because the four terminals B1 to B4 provided at the body portion S1 of the circuit board 190, which is disposed on the first side portion 141-1 of the housing 140, are directly and conductively connected to the first to fourth upper elastic units 150-1 to 150-4, a portion of the first outer frame 151 of each of the first to fourth upper elastic units 150-1 to 150-4 may be disposed on the first side portion 141-1 of the housing 140.

Each of the upper elastic units 150-1 to 150-4 may be disposed on or coupled to a corresponding one of the corner portions 142-1 to 142-4 of the housing 140, and may include the extension portions P1 to P4 extending to the first side portion 141-1 of the housing 140.

Referring to FIG. 11, each of the extension portions P1 to P4 of the upper elastic units 150-1 to 150-4 may be directly coupled to a corresponding one of the four terminals B1 to B4 provided at the body portion S1 of the circuit board 190 by means of a conductive adhesive member 71, such as solder or conductive epoxy.

The first outer frame 151 of the first upper elastic unit 150-1 may be disposed on the first corner portion 142-1 of the housing 140, the first outer frame 151 of the second upper elastic unit 150-2 may be disposed on the second corner portion 142-2 of the housing 140, the first outer frame 151 of the third upper elastic unit 150-3 may be disposed on the third corner portion 142-3 of the housing 140, and the first outer frame 151 of the fourth upper elastic unit 150-4 may be disposed on the fourth corner portion 142-4 of the housing 140.

A portion of the third upper elastic unit 150-3 may be disposed in the first recess 90a in the first circuit board 190, and the end of the portion of the third upper elastic unit 150-3 may be coupled to the third terminal B3 of the circuit board 190.

A portion of the fourth upper elastic unit 150-4 may be disposed in the second recess 90b in the first circuit board 190, and the end of the portion of the fourth upper elastic unit 150-4 may be coupled to the fourth terminal B4 of the circuit board 190.

The third extension portion P3 of the third upper elastic unit 150-3 may extend toward the third terminal B3 of the circuit board 190 through the first recess 90a in the circuit board 190, and may be bent at least twice.

In addition, the fourth extension portion P4 of the fourth upper elastic unit 150-4 may extend toward the fourth terminal B4 of the circuit board 190 through the second recess 90b in the circuit board 190, and may be bent at least twice.

The third extension portion (or "third connection terminal") P3 of the third upper elastic unit 150-3 may include at least two bent regions 2a and 2b.

In an example, the third extension portion P3 of the third upper elastic unit 150-3 may include a first portion 1a, which extends from the first coupling portion 520 (e.g. the coupling region 6b) of the third upper elastic unit 150-3, a first bent region (or "first bent portion") 2a, which is bent at the first portion 1a, a second portion 1b, which extends from the first bent region 2a, a second bent region (or "second bent portion") 2b, which is bent at the second portion 1b, and a third portion 1c, which extends toward the third terminal B3 from the second bent region 2b.

In an example, the second portion 1*b* of the third extension portion (or the third connection terminal) P3 may be bent at the first portion 1*a*, and the third portion 1*c* may be bent at the second portion 1*b*.

The second portion 1*b* of the third extension portion P3 may be disposed between the first bent region 2*a* and the second bent region 2*b*, and may connect the first and second bent regions 2*a* and 2*b* to each other.

In an example, each of the first portion 1*a* and the third portion 1*c* of the third extension portion P3 may extend toward the first corner portion 141-1 of the housing 140 from the second corner portion 142-2 thereof. In an example, the second portion 1*b* of the third extension portion P3 may extend toward the outer surface of the housing 140 from the inner surface thereof.

A portion (e.g. the second portion 1*b*) of the third extension portion P3 of the third upper elastic unit 150-3 may be located in the first recess 90*a* in the circuit board 190, or may extend through the first recess 90*a*.

The fourth extension portion (or "fourth connection terminal") P4 of the fourth upper elastic unit 150-4 may include at least two bent regions 2*c* and 2*d*.

In an example, the fourth extension portion P4 of the fourth upper elastic unit 150-4 may include a fourth portion 1*d*, which extends from the first coupling portion 520 (e.g. the coupling region 6*d*) of the fourth upper elastic unit 150-4, a third bent region (or "third bent portion") 2*c*, which is bent at the fourth portion 1*d*, a fifth portion 1*e*, which extends from the third bent region 2*c*, a fourth bent region (or "fourth bent portion") 2*d*, which is bent at the fifth portion 1*e*, and a sixth portion 1*f*, which extends toward the fourth terminal B4 from the fourth bent region 2*d*.

In an example, the fifth portion 1*e* of the fourth extension portion (or the fourth connection terminal) P4 may be bent at the fourth portion 1*d*, and the sixth portion 1*f* may be bent at the fifth portion 1*e*.

The fifth portion 1*e* of the fourth extension portion P4 may be disposed between the third bent region 2*c* and the fourth bent region 2*d*, and may connect the third and fourth bent regions 2*c* and 2*d* to each other.

In an example, each of the fourth portion 1*d* and the sixth portion if of the fourth extension portion P4 may extend toward the second corner portion 141-2 of the housing 140 from the first corner portion 142-1 thereof. In an example, the fifth portion 1*e* of the fourth extension portion P4 may extend toward the outer surface of the housing 140 from the inner surface thereof.

A portion (e.g. the fifth portion 1*e*) of the fourth extension portion P4 of the fourth upper elastic unit 150-4 may be located in the second recess 90*b* in the circuit board 190, or may extend through the second recess 90*b*.

Referring to FIG. 9, the lower elastic member 160 may include a plurality of lower elastic units 160-1 and 160-2.

In an example, each of the first and second lower elastic units 160-1 and 160-2 may include a second inner frame 161, which is coupled or fixed to the lower portion, the lower surface, or the lower end of the bobbin 110, second outer frames 162-1 to 162-3, which are coupled or fixed to the lower portion, the lower surface, or the lower end of the housing 140, and a second frame connection portion 163, which connects the second inner frame 161 to the second outer frames 162-1 to 162-3.

The second inner frame 161 may have a hole 161*a* formed therein for coupling to the second coupling portion 117 of the bobbin 110, and the second outer frames 162-1 to 162-3 may have holes 162*a* formed therein for coupling to the second coupling portion 149 of the housing 140.

In an example, each of the first and second lower elastic units 160-1 and 160-2 may include three second outer frames 162-1 to 162-3 and two second frame connection portions 163, which are coupled to the housing 140, but the disclosure is not limited thereto. In another embodiment, each of the first and second lower elastic units may include at least one second outer frame and at least one second frame connection portion.

Each of the first and second lower elastic units 160-1 and 160-2 may include connection frames 164-1 to 164-4, which connect the second outer frames 162-1 to 162-3 to each other.

The width of each of the connection frames 164-1 to 164-4 may be less than the width of each of the second outer frames 162-1 to 162-3, but the disclosure is not limited thereto.

In order to avoid spatial interference with the second coil 230 and the first magnet 130, the connection frames 164-1 to 164-4 may be located outside the coil units 230-1 to 230-4 and the magnets 130-1 to 130-4. Here, the outside of the coil units 230-1 to 230-4 and the magnets 130-1 to 130-4 may be the side opposite the region in which the center of the bobbin 110 or the center of the housing 140 is located with respect to the coil units 230-1 to 230-4 and the magnets 130-1 to 130-4.

In addition, in an example, the connection frames 164-1 to 164-4 may be located so as not to overlap the coil units 230-1 to 230-4 and/or the magnets 130-1 to 130-4 in the optical-axis direction, but the disclosure is not limited thereto. In another embodiment, at least portions of the connection frames 164-1 to 164-4 may be aligned with or overlap the coil units 230-1 to 230-4 and/or the magnets 130-1 to 130-4 in the optical-axis direction.

Each of the upper elastic units 150-1 to 150-4 and the lower elastic units 160-1 and 160-2 may be embodied as a leaf spring, but the disclosure is not limited thereto. Each of the upper elastic units and the lower elastic units may be embodied as a coil spring or the like. The above-mentioned elastic unit (e.g. 150 or 160) may be referred to as a "spring", the outer frame (e.g. 152 or 162) may be referred to as an "outer portion", the inner frame (e.g. 151 or 161) may be referred to as an "inner portion", and the support member (e.g. 220) may be referred to as a wire.

Next, the support members 220-1 to 220-4 will be described.

The support members 220-1 to 220-4 may be disposed on the corner portions 142-1 to 142-4 of the housing 140, and may connect the upper elastic units 150-1 to 150-4 to the circuit board 250.

Each of the support members 220-1 to 220-4 may be coupled to a corresponding one of first to fourth upper elastic units 150-1 to 150-4, and may conductively connect the corresponding one of the first to fourth upper elastic units 150-1 to 150-4 to a corresponding one of the terminals 251-1 to 251-*n* (e.g. n=4) of the circuit board 250.

The support members 220-1 to 220-4 may be spaced apart from the housing 140, rather than being fixed to the housing 140. One end of each of the support members 220-1 to 220-4 may be directly connected or coupled to the second coupling portion 510 of a corresponding one of the upper elastic units 150-1 to 150-4, and the other end of each of the support members 220-1 to 220-4 may be directly connected or coupled to the circuit board 250.

In an example, the support members 220-1 to 220-4 may pass through the holes 147 formed in the corner portions 142-1 to 142-4 of the housing 140, but the disclosure is not limited thereto. In another embodiment, the support members may be disposed adjacent to the boundary line between the side portions 141-1 to 141-4 and the corner portions 142-1 to 142-4 of the housing 140, and may not pass through the corner portions 142-1 to 142-4 of the housing 140.

The first coil 120 may be conductively connected to the first and second lower elastic units 160-1 and 160-2.

In an example, the first coil 120 may be directly connected or coupled to the second inner frames of the first and second lower elastic units 160-1 and 160-2. In an example, the second inner frame 161 of the first lower elastic unit 160-1 may include a first bonding portion 43a, which is coupled to one end of the first coil 120, and the second inner frame 161 of the second lower elastic unit 160-2 may include a second bonding portion 43b, which is coupled to the other end of the first coil 120. Each of the first and second bonding portions 43a may have a recess 18a formed therein to guide the coil 120.

The first support member 220-1 may be disposed on the first corner portion 142-1 of the housing 140, and may be coupled to the second coupling portion 510 of the first upper elastic unit 150-1. The second support member 220-2 may be disposed on the second corner portion 142-2 of the housing 140, and may be coupled to the second coupling portion 510 of the second upper elastic unit 150-2. The third support member 220-3 may be disposed on the third corner portion 142-3 of the housing 140, and may be coupled to the second coupling portion 510 of the third upper elastic unit 150-3. The fourth support member 220-4 may be disposed on the fourth corner portion 142-4 of the housing 140, and may be coupled to the second coupling portion 510 of the fourth upper elastic unit 150-4.

The first terminal B1 of the circuit board 190 may be conductively connected to the first support member 220-1 via the first upper elastic unit 150-1, the second terminal B2 of the circuit board 190 may be conductively connected to the second support member 220-2 via the second upper elastic unit 150-2, the third terminal B3 of the circuit board 190 may be conductively connected to the third support member 220-3 via the third upper elastic unit 150-3, and the fourth terminal B4 of the circuit board 190 may be conductively connected to the fourth support member 220-4 via the fourth upper elastic unit 150-4.

Each of the first to fourth support members 220-1 to 220-4 may be conductively connected to a corresponding one of the first to fourth terminals 251-1 to 251-n (e.g. n=4) of the circuit board 250.

In an example, the power signals VDD and GND may be supplied to the first and second support members 220-1 and 220-2 through the first and second terminals (e.g. 251-1 and 251-2) of the circuit board 250.

In an example, the power signals VDD and GND may be supplied to the first and second terminals B1 and B2 of the circuit board 190 through the first and second support members 220-1 and 220-2 and the first and second upper elastic units 150-1 and 150-2. The first position sensor 170 may receive the power signals VDD and GND through the first and second terminals B1 and B2 of the circuit board 190.

In an example, the first terminal B1 of the circuit board 190 may be one of a VDD terminal and a GND terminal, and the second terminal B2 of the circuit board 190 may be the other of the VDD terminal and the GND terminal.

In addition, the clock signal SCL and the data signal SDA may be supplied to the third and fourth support members 220-3 and 220-4 through the third and fourth terminals (e.g. 251-3 and 251-4) of the circuit board 250.

The clock signal SCL and the data signal SDA may be supplied to the third and fourth terminals B3 and B4 of the circuit board 190 through the third and fourth support members 220-3 and 220-4 and the third and fourth upper elastic units 150-3 and 150-4. The first position sensor 170 may receive the clock signal SCL and the data signal SDA through the third and fourth terminals B3 and B4 of the circuit board 190.

In an example, the power signal VDD may be supplied to the first position sensor 170 through the first terminal 251-1 of the circuit board 250, the first support member 220-1, the first upper elastic unit 150-1, and the first terminal B1 of the circuit board 190. The power signal GND may be supplied to the first position sensor 170 through the second terminal 251-2 of the circuit board 250, the second support member 220-2, the second upper elastic unit 150-2, and the second terminal B2 of the circuit board 190.

In addition, in an example, the clock signal SCL may be supplied to the first position sensor 170 through the third terminal 251-3 of the circuit board 250, the third support member 220-3, the third upper elastic unit 150-3, and the third terminal B3 of the circuit board 190. The data signal SDA may be supplied to the first position sensor 170 through the fourth terminal 251-4 of the circuit board 250, the fourth support member 220-4, the fourth upper elastic unit 150-4, and the fourth terminal B4 of the circuit board 190.

Each of the fifth and sixth terminals B5 and B6 of the circuit board 190 may be connected or coupled to the second outer frame 162-1 of a corresponding one of the first and second lower elastic units 160-1 and 160-2.

The second outer frame 162-1 of the first lower elastic unit 160-1 may include a first bonding portion 81a, to which the fifth terminal B5 of the circuit board 190 is coupled by means of solder or a conductive adhesive member. In addition, the second outer frame 162-1 of the second lower elastic unit 160-2 may include a second bonding portion 81b, to which the sixth terminal B5 of the circuit board 190 is coupled by means of solder or a conductive adhesive member.

In an example, the second outer frame 162-1 of the first lower elastic unit 160-1 may include a first hole (or a first recess) 82a, in which the fifth terminal B5 of the circuit board 190 is inserted or disposed, and the second outer frame 162-1 of the second lower elastic unit 160-2 may include a second hole (or a second recess) 82b, in which the sixth terminal B6 of the circuit board 190 is inserted or disposed.

In an example, the first hole 82a may be formed in the first bonding portion 81a of the first lower elastic unit 160-1, and the second hole 82b may be formed in the second bonding portion 81b of the second lower elastic unit 160-2.

In an example, each of the first and second holes 82a and 82b may be formed through the second outer frame 161-1, and may have an opening, which is open to one side of the second outer frame 161-1, but the disclosure is not limited thereto. In another embodiment, an opening that is open to one side of the second outer frame 161-1 may not be formed.

In the state in which the fifth terminal B5 (or the sixth terminal B6) of the circuit board 190 is inserted into the first recess 82a (or the second recess 82b) in the second outer frame 162-1 of the first lower elastic unit 160-1, the fifth terminal B5 (or the sixth terminal B6) is coupled to the first bonding portion 81a (or the second bonding portion 81b), in which the first recess 82a (or the second recess 82b) is formed, by means of solder or a conductive adhesive member. Accordingly, it is possible to increase the coupling area and thus to increase the coupling force and improve soldering efficiency between the terminal and the bonding portion.

Referring to FIG. 12, one end (for example, the lower end or the lower surface) of each of the fifth and sixth terminals B5 and B6 may be located at a lower position than the lower end or the lower surface of the second outer frame 162-1 of the first and second lower elastic units 160-1 and 160-2. In the bottom view shown in FIG. 12, the lower surface of each of the fifth and sixth terminals B5 and B6 appears to be located at a lower position than the lower end or the lower surface of the second outer frame 162-1. The reason for this is to improve soldering efficiency between one end of each of the fifth and sixth terminals B5 and B6 and the first and second bonding portions 81a and 81b of the first and second lower elastic units 160-1 and 160-2.

In addition, referring to FIG. 12, the housing 140 may have a recess 31, which is recessed from the lower surface of the first side portion 141-1. In an example, the bottom surface of the recess 31 in the housing 140 may have a height difference with respect to the lower surface of the housing 140 in the optical-axis direction. In an example, the bottom surface of the recess 31 in the housing 140 may be located at a higher position than the lower surface of the housing 140.

The recess 31 in the housing 140 may overlap the first and second bonding portions 81a and 81b of the first and second lower elastic units 160-1 and 160-2 in the optical-axis direction.

Furthermore, the recess 31 in the housing 140 may overlap the holes 82a and 82b in the second outer frames 162-1 of the first and second lower elastic units 160-1 and 160-2 in the optical-axis direction, but the disclosure is not limited thereto. In another embodiment, the recess may not overlap the holes.

By virtue of the recess 31 in the housing 140, it is possible to increase the exposure areas of the fifth and sixth terminals B5 and B6 of the circuit board 190, which are exposed from the housing 140, and to secure a space in which to dispose solder or a conductive adhesive member, thereby improving soldering efficiency and reducing the length that the solder projects downwards from the lower surface of the second outer frame 162-1. Accordingly, it is possible to minimize or inhibit spatial interference with the second coil 230, the circuit board 250, or the base 210, which is disposed under the lower elastic unit.

Furthermore, the lower surface 11c of the first magnet 130, which is disposed on the seating portion 141a of the housing 140, may be located at a lower position than the lower surfaces of the second outer frames 162-1 to 162-3 of the first and second lower elastic units 160-1 and 160-2. The reason for this is to reduce the spacing distance between the second coil 230 and the first magnet 130 and thus to increase electromagnetic force for OIS operation.

In another embodiment, the lower surface of the first magnet 130 may be located at a higher position than or the same height as the lower surfaces of the second outer frames 162-1 to 162-3 or the lower surface of the housing 140.

In order to space the first magnet 130 apart from the second coil 230 and the circuit board 250, the other end of the support member 220 may be coupled to the circuit board 250 (or the circuit member 231) at a lower position than the lower surface 11c of the first magnet 130.

Each of the upper elastic member 150, the lower elastic member 160, and the support member 220 may be embodied as a member that is conductive and offers elastic support.

In an example, each of the upper and lower elastic members 150 and 160 may be embodied as a leaf spring, and the support member 220 may be embodied as a suspension wire, a leaf spring, or a coil spring. In another embodiment, the support member 220 may be integrally formed with the upper elastic member 150.

In order to absorb and dampen the vibration of the bobbin 110, the lens moving apparatus 100 may include a damper, which is disposed between the upper elastic member 150 (or the lower elastic member 160) and the bobbin 110 and/or between the upper elastic member 150 (or the lower elastic member 160) and the housing 140.

In an example, the damper DA1 (refer to FIG. 11) may be disposed in the space between the frame connection portion 153 or 163 of the upper elastic member 150 (or the lower elastic member 160) and the bobbin 110. In another example, the damper DA2 may be disposed in the space between the frame connection portion 153 or 163 of the upper elastic member 150 (or the lower elastic member 160) and the housing 140.

In addition, in an example, the damper DA3 may be disposed between the connection portion 530 of the outer frame 152 of the upper elastic member 150 and the housing 140.

In addition, in an example, the damper may be disposed on one end of each of the support members 220-1 to 220-4. In an example, the damper DA4 may be disposed in the hole 147 in the housing 140.

FIG. 11 shows some of the dampers disposed on the upper elastic member 150-1, the bobbin 110, the housing 140, and the support member 220-1. The other dampers may be identically applied to the other upper elastic members 150-2 to 150-4, the bobbin 110, the housing 140, and the other support members 220-2 to 220-4.

Alternatively, the embodiment may include at least one of the dampers DA1 to DA5 shown in FIG. 11.

Next, the base 210, the circuit board 250, and the second coil 230 will be described.

Referring to FIG. 13A, the base 210 may have a bore C3 corresponding to the bore in the bobbin 110 and/or the bore in the housing 140, and may have a shape coinciding with or corresponding to the shape of the cover member 300, for example, a rectangular shape. In an example, the bore C3 in the base 210 may be a through-hole, which is formed through the base 210 in the optical-axis direction.

The base 210 may include a step 211, to which an adhesive is applied in order to adhere the cover member 300 to the base 210. In this case, the step 211 may guide the side plate 302 of the cover member 300, which is coupled to the upper side of the base, and the lower end of the side plate 302 of the cover member 300 may be in contact with the step 211. The step 211 of the base 210 may be bonded and fixed to the lower end of the side plate 302 of the cover member 300 by means of an adhesive or the like.

A support portion (or a holding portion) 255 may be provided in the region of the base 210 that faces the terminal member 253, at which the terminals 251-1 to 251-n of the circuit board 250 are provided. The support portion 255 may support the terminal member 253 of the circuit board 250. In an example, the support portion 255 may be formed in the shape of a recess that is recessed from the outer surface of the base 210, but the disclosure is not limited thereto. In another embodiment, the support portion may be formed in the shape of a flat surface that is coplanar with the outer surface of the base 210, or may be formed in the shape of a protrusion.

A protruding portion 48 or a protrusion, which extends or protrudes toward the outer surface of the base 210, may be formed on the side surface of the circuit board 250. The protruding portion 250 may protrude from the outer surface of the circuit board 250 toward the outer surface of the base 210. A recess 28 or a coupling recess, which has a shape corresponding to the shape of the protruding portion 48 of the circuit board 250, may be formed in the outer surface of the base 210 at a position corresponding to the position of the protruding portion 48 of the circuit board 250. The protruding portion 48 of the circuit board 250 may be disposed, coupled, or seated in the recess 28 in the base 210.

Referring to FIGS. 13A and 13B, the base 210 may include a corner region (or an "edge region") 212 corresponding to the corner of the cover member 300. In an example, the base 210 may include four corner regions 212.

The base 210 may include a corner region 212, which has a first surface 21A having a first height difference H1 in the optical-axis direction from the upper surface 21 of the base 210.

The corner region 212 of the base 210 may be provided with a stepped portion 212A in order to avoid spatial interference with an elastic connection portion 25 (25-1 to 25-4) of the circuit board 250.

A uniform gap may be present between each of the elastic connection portions 25-1 to 25-4 and the base 210 due to the stepped portion 212A, thereby enabling OIS operation.

In an example, the corner region 212 may be a region of the base 210 that includes a corner 20A of the base 210 and is adjacent to the corner 20A.

The stepped portion 212A may include a first surface 21A, which has a first height difference H1 in the direction of the optical axis OA from the upper surface 21 of the base 210. In an example, the upper surface 21 of the base 210 may be a surface that faces the lower surface of the circuit board 250 and is in contact or close contact therewith.

In an example, the distance from the lower surface 22 (refer to FIG. 17) of the base 210 to the first surface 21A of the base 210 may be shorter than the distance from the lower surface 22 of the base 210 to the upper surface 21 of the base 210.

In addition, the stepped portion 212A may further include a second surface 21B, which has a second height difference H2 in the direction of the optical axis OA from the upper surface 21 of the base 210.

The distance from the lower surface 22 of the base 210 to the second surface 21B of the base 210 may be shorter than the distance from the lower surface 22 of the base 210 to the upper surface 21 of the base 210.

Furthermore, the distance from the lower surface 22 of the base 210 to the second surface 21B of the base 210 may be longer than the distance from the lower surface 22 of the base 210 to the first surface 21A of the base 210.

In an example, the first height difference H1 may be greater than the second height difference H2 (H1>H2).

In an example, each of the first surface 21A and the second surface 21B may be parallel to the upper surface 21 or the lower surface 22 of the base 210, but the disclosure is not limited thereto. In another embodiment, each of the first surface 21A and the second surface 21B may not be parallel to the upper surface 21 or to the lower surface 22 of the base 210. Each of the first surface 21A and the second surface 21B may be a flat surface, but the disclosure is not limited thereto. In another embodiment, at least one of the first surface or the second surface may be a curved surface, or may include a curved surface.

In addition, the stepped portion 212A may further include a third surface 21C, which interconnects the first surface 21A and the second surface 21B of the base 210. In addition, the stepped portion 212A may further include a fourth surface 21D, which interconnects the second surface 21B of the base 210 and the upper surface 21 of the base 210.

In an example, each of the third surface 21C and the fourth surface 21D of the base 210 may be perpendicular to the upper surface 21 of the base 210, but the disclosure is not limited thereto. In another embodiment, each of the third surface and the fourth surface of the base 210 may be an inclined surface that is inclined at a predetermined angle relative to the upper surface 21 of the base 210.

As shown in FIG. 13B, the first surface 21A may be disposed in the middle of the corner region 212, and the second surface 21B may be disposed on each side of the first surface 21A. In an example, the stepped portion 212A may include one first surface 21A and second surfaces 2B, which include a 2-1$^{st}$ surface 21B1 located on one side of the first surface 21A and a 2-2$^{nd}$ surface 21B2 located on the other side of the first surface 21A.

In another embodiment, the corner region 212 of the base 210 may be provided with at least one first surface and at least one second surface.

The stepped portion 212A may overlap each of the elastic connection portions 25-1 to 25-4 of the circuit board 250 in the optical-axis direction, which will be described later.

The stepped portion 212A may serve to inhibit or avoid spatial interference between the support members 220-1 to 220-4, the elastic connection portions 25-1 to 25-4, an adhesive member (or solder 902) for coupling the support members 220-1 to 220-4 to the elastic connection portions 25-1 to 25-4, and the base 210.

In addition, a damper may be disposed between the stepped portion 212A and each of the elastic connection portions 25-1 to 25-4, and the stepped portion 212A may serve to accommodate or support the damper.

Furthermore, as shown in FIG. 17, because the corner region 212 of the base 210 does not have an open structure, it is possible to inhibit foreign substances, which are generated in the course of soldering the circuit board 250 to the support member 220, from collecting by virtue of the stepped portion 212A and to inhibit the performance and reliability of the image sensor of the camera module from being deteriorated by the foreign substances.

Furthermore, in the case of a lens moving apparatus in which the corner portion of the base 210 has an open structure, an additional process for blocking or sealing the open structure may be needed, which may increase manufacturing costs. However, the embodiment may avoid an increase in manufacturing costs resulting from such an additional process.

In another embodiment, in place of the stepped portion 212A, a recess, which is recessed from the upper surface 21 of the base 210, may be formed in the corner region 212 of the base 210.

FIG. 14 shows a base 210-1 according to another embodiment. The corner region 212 of the base 210-1 may include a stepped portion 212A and a guide portion 218, which protrudes from a first surface 21A of the stepped portion 212A in the upward direction or the optical-axis direction to surround the corner region 212.

The corner region 212 may be located inside the guide portion 218.

The upper surface or the upper end of the guide portion 218 may be located at a higher position than a second surface 21B of the stepped portion 212A. In an example, the upper surface or the upper end of the guide portion 218 may be located at a higher position than the upper surface of the base 210-1. In an example, the upper surface or the upper end of the guide portion 218 may be located at a higher position than the upper surface of each of the elastic connection portions 25-1 to 25-4.

The guide portion 218 may guide seating or disposition of a second damper 310A, which will be described later. Each of the elastic connection portions 25-1 to 26-4 may be disposed inside the guide portion 218.

In addition, the base 210 may have seating recesses 215-1 and 215-2 formed in the upper surface thereof to allow the second position sensors 240 to be disposed therein.

In an example, the first seating recess 215-1 in the base 210 may be formed adjacent to an escape portion 212-3 provided at one of the corners of the base 210, and the second seating recess 215-2 in the base 210 may be formed adjacent to another escape portion 212-4 provided at another of the corners of the base 210.

In an example, the first seating recess 215-1 in the base 210 may be formed in the upper surface of the base 210 so as to be located between the escape portion 212-3 and the protruding portion 19, and the second seating recess 215-2 may be formed in the upper surface of the base 210 so as to be located between the other escape portion 212-4 and the protruding portion 19.

In addition, in an example, the base 210 may have a seating portion (not shown) formed in the lower surface thereof to allow a filter 610 of the camera module 200 to be mounted therein.

In addition, the base 210 may be provided on the upper surface thereof with a protruding portion 19, which is located around the bore C3 for coupling to the bore C2 in the circuit board 250 and the bore C1 in the circuit member 231.

The protruding portion 19 of the base 210 may have the same shape as the bore C3, for example, a circular shape, but the disclosure is not limited thereto. In an example, the protruding portion 19 may be formed in a single circular shape, but the disclosure is not limited thereto. The protruding portion may include a plurality of parts, which are spaced apart from each other.

The base 210 may include a protrusion 32, which protrudes from the upper surface thereof so as to be coupled into the coupling recess 33 in the circuit board 250.

In an example, the coupling recess 33 in the circuit board 250 may be formed in the inner surface of the circuit board 250, which is defined by the bore C2, so as to be recessed from the inner surface of the circuit board 250. In addition, the protrusion 32 of the base 210 may correspond to or face the coupling recess 33 in the circuit board 250 in the optical-axis direction. The protrusion 32 may have a shape corresponding to or coinciding with the shape of the coupling recess 33 in the circuit board 250. In an example, the protrusion 32 may be contiguous with the outer surface of the protruding portion 19 of the base 210.

The second coil 230 may be disposed on the circuit board 250, and OIS position sensors 240a and 240b may be disposed in the seating recesses 215-1 and 215-2 in the base 210, which are located under the circuit board 250.

The second position sensor 240 may include first and second OIS position sensors 240a and 240b. The OIS position sensors 240a and 240b may detect displacement of the OIS operation unit in a direction perpendicular to the optical axis. Here, the OIS operation unit may include an AF operation unit and components mounted to the housing 140.

In an example, the OIS operation unit may include the AF operation unit and the housing 140. In some embodiments, the OIS operation unit may include the first magnet 130.

The circuit board 250 may be disposed on the upper surface 21 of the base 210, and may have formed therein a bore C2 corresponding to the bore in the bobbin 110, the bore in the housing 140, and/or the bore C3 in the base 210. The bore C2 in the circuit board 250 may be a through-hole.

The circuit board 250 may include a body 252, which is disposed on the upper surface 21 of the base 210 and in which the bore C2 is formed, and at least one terminal portion 253, which is bent and extends from the body 252.

The body 252 may have a shape coinciding with or corresponding to the shape of the upper surface of the base 210, for example, a rectangular shape.

The terminal portion 253 may be bent and extend from the upper surface of the body 252 toward the outer surface of the base 210. The terminal portion 253 may include a plurality of terminals 251-1 to 251-n (n being a natural number greater than 1 (n>1)) or pins, which receive electrical signals from the outside.

In an example, referring to FIG. 15, the circuit board 250 may include two terminal portions 253, which face each other or are located opposite each other. However, the disclosure is not limited thereto, and the number of terminal portions 253 may be 1 or more.

The second coil 230 may be disposed under the bobbin 110.

In an example, the second coil 230 may be disposed under the housing 140. Furthermore, in an example, the second coil 230 may be disposed under the lower elastic member 160. The second coil 230 may be disposed on the circuit board 250.

The second coil 230 may include coil units, which correspond to or face the magnets 130-1 to 130-4 disposed in the housing 140. In an example, the coil units 230-1 to 230-4 may be disposed on the circuit board 250.

In an example, the second coil units 230-1 to 230-4 may face or overlap the magnets 130-1 to 130-4, which are disposed on the corner portions 142-1 to 142-4 of the housing 140, in the optical-axis direction.

In an example, the second coil 230 may include a circuit member 231 and a plurality of coil units 230-1 to 230-4 formed on the circuit member 231. Here, the circuit member 231 may be referred to as a "board", a "circuit board", or a "coil board". In another embodiment, the circuit member 231 may be eliminated, and the second coil 230 may include the coil units 230-1 to 230-4.

The circuit member 231 may have a shape coinciding with or corresponding to the shape of the upper surface of the base 210 (or the circuit board 250), for example, a rectangular shape.

In an example, the four coil units 230-1 to 230-4 may be disposed or formed at the corners or the corner regions of the circuit member 231, which has a polygonal shape (e.g. a rectangular shape). Each of the coil units 230-1 to 230-4 may have a shape corresponding to or coinciding with the shape of a corresponding one of the magnets 130-1 to 130-4 in the optical-axis direction.

In an example, each of the coil units 230-1 to 230-4 may have the shape of a closed curve, e.g. a ring, which rotates about the optical axis when viewed from above.

Each of the coil units 230-1 to 230-4 may be embodied as a coil block composed of fine pattern (FP) coils, but the disclosure is not limited thereto.

In the embodiment in which the magnets are disposed on the side portions of the housing 140, the coil units of the second coil may be disposed parallel to the sides of the circuit member 231, and may have a shape corresponding to or coinciding with the shape of the magnets disposed on the side portions of the housing.

In an example, the second coil 230 may include two coil units 230-1 and 230-3 for the second direction and two coil units 230-2 and 230-4 for the third direction, but the disclosure is not limited thereto.

In an example, two coil units 230-1 and 230-3 may be disposed in two of the corner regions of the circuit member 231 that face each other in a first diagonal direction of the circuit member 231, and the two remaining coil units 230-2 and 230-4 may be disposed in the two remaining corner regions of the circuit member 231 that face each other in a second diagonal direction of the circuit member 231.

The first diagonal direction and the second diagonal direction may be perpendicular to each other. In an example, the first diagonal direction may be the X-axis direction, and the second diagonal direction may be the Y-axis direction.

In an example, the coil units 230-1 and 230-3 for the second direction may generate electromagnetic force in the same direction due to interaction with the magnets 130-1 and 130-3 corresponding thereto in the optical-axis direction. In addition, the coil units 230-2 and 230-4 for the third direction may generate electromagnetic force in the same direction due to interaction with the magnets 130-2 and 130-4 corresponding thereto in the optical-axis direction.

In another embodiment, the second coil 230 may include one coil unit for the second direction and one coil unit for the third direction, or may include four or more coil units.

The second coil 230 may be conductively connected to the circuit board 250. In an example, the second coil 230 may be conductively connected to the terminals 251 of the circuit board 250.

Power or a drive signal may be supplied to the second coil 230 from the circuit board 250. The power or the drive signal supplied to the second coil 230 may be a DC signal, an AC signal, or a signal containing both DC and AC components, and may be of a current type or a voltage type.

The housing 140 may be moved in the second direction and/or the third direction, for example, in the X-axis direction and/or the Y-axis direction, due to interaction between the magnets 130-1 to 130-4 and the second coils 230-1 to 230-4 to which the drive signal is supplied, whereby handshake correction may be performed.

Referring to FIGS. 15 and 16, the second coil 230 may include terminals 30A to 30D to receive a drive signal from the circuit board 250.

In an example, the circuit member 231 may include four terminals 30A to 30D. In an example, the four terminals 30A to 30D may be disposed or provided on the lower surface of the circuit member 231. Here, the lower surface of the circuit member 231 may be a surface that faces the upper surface of the circuit board 250.

In an example, the four terminals 30A to 30D may be formed adjacent to at least one side surface of the circuit member 231. In an example, two terminals 30B and 30D of the circuit member 231 may be disposed on a portion of the lower surface of the circuit member 231 that is adjacent to a first side surface of the circuit member 231, and may be located between the third coil unit 230-1 and the fourth coil unit 230-4.

The two remaining terminals 30A and 30C of the circuit member 231 may be disposed on a portion of the lower surface of the circuit member 231 that is adjacent to a second side surface of the circuit member 231, and may be located between the first coil unit 230-2 and the second coil unit 230-2. In an example, the first side surface and the second side surface of the circuit member 231 may face each other, or may be located opposite each other.

In an example, the first coil unit 230-1 and the third coil unit 230-4 may be connected in series to each other, and the second coil unit 230-2 and the fourth coil unit 230-4 may be connected in series to each other.

In an example, one end of the first coil unit 230-1 may be conductively connected to the first terminal 30A of the circuit member 231, one end of the third coil unit 230-3 may be conductively connected to the second terminal 30B of the circuit member 231, and the other end of the first coil unit 230-1 and the other end of the third coil unit 230-3 may be conductively connected to each other. In an example, the other end of the first coil unit 230-1 and the other end of the third coil unit 230-3 may be conductively connected to each other via a first conductive pattern or a first wire formed in the circuit member 231.

In addition, in an example, one end of the second coil unit 230-1 may be conductively connected to the third terminal 30C of the circuit member 231, one end of the fourth coil unit 230-4 may be conductively connected to the fourth terminal 30D of the circuit member 231, and the other end of the third coil unit 230-3 and the other end of the fourth coil unit 230-4 may be conductively connected to each other. In an example, the other end of the third coil unit 230-3 and the other end of the fourth coil unit 230-4 may be conductively connected to each other via a second conductive pattern or a second wire formed in the circuit member 231.

The circuit board 250 may include pads 27a to 27d to be conductively connected to the coil units 230-1 to 230-4. Here, the pads 27a to 28d may be referred to as "terminals" or "bonding portions".

The circuit board 250 may include pads 27a to 27d, which correspond to or face the first to fourth terminals 30A to 30D of the circuit member 231 in the optical-axis direction.

In an example, the pads 27a to 27d of the circuit board 250 may be disposed or provided on the lower surface of the circuit board 250, but the disclosure is not limited thereto. In another embodiment, the pads may be formed on at least one of the upper surface or the lower surface of the circuit board 250.

Each of the pads 27a to 27d of the circuit board 250 may have a recess formed therein to expose a portion of a corresponding one of the terminals 30A to 30D of the circuit member 231. Each of the pads 27a to 27d of the circuit board 250 may be coupled and conductively connected to a corresponding one of the terminals 30A to 30D of the circuit member 231 by means of a conductive adhesive member or the solder 39A.

In an example, the pads 27a to 27d of the circuit board 250 may be disposed or formed on a portion of the lower surface of the circuit board 250 that is adjacent to at least one side surface of the circuit board 250 on which the terminal portion 253 is not formed.

In an example, two pads 27a and 27c may be disposed on a portion of the lower surface of the circuit board 250 that is adjacent to the first outer surface 33-1 of the circuit board 250, the two remaining pads 27b and 27d may be disposed on a portion of the lower surface of the circuit board 250 that is adjacent to the second outer surface 33-2 of the circuit board 250, and the first outer surface 33-1 and the second outer surface 33-2 may be located opposite each other. In addition, the terminal portion 253 may be disposed on each of the third and fourth outer surfaces 33-3 and 33-4 of the circuit board 250, and the third outer surface 33-3 and the fourth outer surface 33-4 may be located opposite each other.

In an example, two coil units 230-1 and 230-3 for the second direction may be connected in series to each other. One end of each of the coil units 230-1 and 230-3 connected in series to each other may be conductively connected to the first pad 27a of the circuit board 250, and the other end of each of the coil units 230-1 and 230-3 connected in series to each other may be conductively connected to the second pad 27b of the circuit board 250.

In addition, in an example, two coil units 230-2 and 230-4 for the third direction may be connected in series to each other. One end of each of the coil units 230-2 and 230-4 connected in series to each other may be conductively connected to the third pad 27c of the circuit board 250, and the other end of each of the coil units 230-2 and 230-4 connected in series to each other may be conductively connected to the fourth pad 27d of the circuit board 250.

The first and second pads 27a and 27b of the circuit board 250 may be conductively connected to two corresponding ones of the terminals 251-1 to 251-n of the circuit board 250, and a first drive signal may be supplied to the coil units 230-1 and 230-3, which are connected in series to each other, through the two corresponding terminals of the circuit board 250.

The third and fourth pads 27c and 27d of the circuit board 250 may be conductively connected to two corresponding ones of the terminals 251-1 to 251-n of the circuit board 250, and a second drive signal may be supplied to the coil units 230-2 and 230-4, which are connected in series to each other, through the two corresponding terminals of the circuit board 250.

In another embodiment, the terminals of the circuit member 231 may be formed on the inner circumferential surface of the circuit member 231, which is defined by the bore C1, and/or a portion of the lower surface of the circuit member 231 that is adjacent to the inner circumferential surface. In addition, the pads of the circuit board 250 may be formed on the inner circumferential surface of the body 252 of the circuit board 250, which is defined by the bore C2, and/or a portion of the lower surface of the body 252 of the circuit board 250 that is adjacent to the inner circumferential surface.

Although each of the coil units 230-1 to 230-4 is illustrated in FIG. 13A as being formed as a circuit pattern, for example, an FP coil, which is formed at the circuit member 231, which is provided separately from the circuit board 250, the disclosure is not limited thereto.

In another embodiment, the circuit member 231 may be eliminated, and the coil units 230-1 to 230-4 may be embodied in the form of ring-shaped coil blocks.

In still another embodiment, the coil units 230-1 to 230-4 may be embodied in the form of a circuit pattern, for example, an FP coil, which is directly formed on the circuit board 250. In this case, the circuit board 250 may be referred to as a "circuit member" or a "board". In this case, the other end of each of the support members may be coupled to the circuit member (e.g. the lower surface of the circuit member), and the circuit member may include a board portion (or a body), at which the coil units 230-1 to 230-4 are formed, and a terminal portion, at which terminals are formed. The description of the circuit board 250 may apply to the board portion, and the description of the terminal portion 253 of the circuit board 250 may apply to the terminal portion.

In addition, as described above, at least one of the circuit member 231 or the circuit board 250 may have a hole or an escape recess formed therein to avoid spatial interference with the support member 220.

In order to avoid spatial interference with the support member 220, an escape portion 23 may be formed at the corner of the circuit member 231. The escape portion 23 may be formed by chamfering the corner of the circuit member 231.

In an example, since the escape portion 23 serves to avoid spatial interference with the elastic connection portions 25-1 to 25-4 to be described later, the circuit member 231 may not overlap the elastic connection portions 25-1 to 25-4 in the optical-axis direction by virtue of the escape portion 23.

In another embodiment, the escape portion of the circuit member may be formed in the shape of an escape recess.

The circuit member 231 may have an escape recess 24 formed therein to avoid spatial interference with the fifth and sixth terminals B5 and B6 of the circuit board 190. In an example, the escape recess 24 may be formed in one side of the circuit member 231 so as to correspond to, face, or overlap the fifth and sixth terminals B5 and B6 of the circuit board 190 in the optical-axis direction. In an example, the escape recess 24 may be disposed between the first coil unit 230-1 and the fourth coil unit 230-4.

Each of the OIS position sensors 240a and 240b may be a Hall sensor. Any of various types of sensors may be used, so long as the same is capable of detecting the intensity of a magnetic field. In an example, each of the OIS position sensors 240a and 240b may be embodied as a single position detection sensor, such as a Hall sensor, or may be embodied in the form of a driver including a Hall sensor. In the case in which each of the OIS position sensors 240a and 240b is embodied in the form of a driver including a Hall sensor, the description made with reference to FIG. 7B may apply thereto.

Each of the OIS position sensors 240a and 240b may detect the intensity of the magnetic fields of the magnets 130-1 to 130-4 during movement of the OIS operation unit in a direction perpendicular to the optical axis, and may output an output signal corresponding to the result of the detection. The displacement of the OIS operation unit may be detected using the output signal from each of the OIS position sensors 240a and 240b, and the controller 830 or 780 may perform OIS feedback handshake correction using the output signals from the OIS position sensors 240a and 240b.

In an example, the first OIS position sensor 240a may overlap a first line that extends from the first corner of the circuit board 250 to the center of the bore C2 in the circuit board 250. The second OIS position sensor 240b may overlap a second line that extends from the second corner of the circuit board 250 to the center of the bore C2 in the circuit board 250.

In an example, the center of the first OIS position sensor 240a may be aligned with or overlap the first line, and the center of the second OIS position sensor 240b may be aligned with or overlap the second line. The first line and the second line may be perpendicular to each other.

The terminal portion 253 of the circuit board 250 may be provided with terminals 251-1 to 251-n.

The plurality of terminals 251-1 to 251-n mounted to the terminal portion 253 of the circuit board 250 may transmit or receive signals SCL, SDA, VDD, and GND for data communication to or from the first position sensor 190, may supply a drive signal to the OIS position sensors 240a and 240b, and may receive signals output from the OIS position sensors 240a and 240b and output the signals to the outside.

In the embodiment, the circuit board 250 may be embodied as a flexible printed circuit board (FPCB). It is also possible to form the terminals of the circuit board 250 directly on the surface of the base 210 using a surface electrode method or the like.

Since the embodiment is configured such that the drive signal is directly supplied to the first coil 120 from the first position sensor 170, it is possible to reduce the number of support members and to simplify the conductive connection structure compared to the case in which the drive signal is directly supplied to the first coil 120 through the circuit board 250.

In addition, since the first position sensor 170 is capable of being embodied as a driver IC capable of measuring temperature, the output from the Hall sensor may be compensated so that a change in output according to a change in temperature is minimized or so that the output has a constant slope with respect to a change in temperature, thereby making it possible to improve the accuracy of the AF operation regardless of changes in temperature.

The bobbin 110, the first coil 120, the first magnet 130, the housing 140, the upper elastic member 150, the lower elastic member 160, the first position sensor 170, the second magnet 180, the circuit board 190, the support member 220, the second coil 230, the second position sensor 240, and the circuit board 250 are accommodated in the accommodation space formed by the cover member 300 and the base 210.

The cover member 300 may be formed in the shape of a box that has an open lower portion and includes an upper plate 301 and side plates 302. The lower portion of the cover member 300 (e.g. the lower portions of the side plates 302) may be coupled to the base 210 (e.g. the step 211 and/or the escape portions 212-1 to 212-4). The upper plate 301 of the cover member 300 may have a circular shape or a polygonal shape, for example, a rectangular or octagonal shape, but the disclosure is not limited thereto.

The cover member 300 may have a bore 303 formed in the upper plate 301 thereof to expose a lens (not shown), which is coupled to the bobbin 110, to external light. The cover member 300 may be made of a non-magnetic material, such as SUS, in order to be inhibited from being attracted to the first magnet 130. Alternatively, the cover member 300 may be made of a magnetic material in order to function as a yoke for increasing the electromagnetic force between the first coil 120 and the first magnet 130.

In order to reduce the length of a path along which the power signals GND and VDD are transmitted to the first position sensor 170, the following configuration may be provided.

First, the first and second terminals B1 and B2 of the circuit board 190, to which the power signals GND and VDD are supplied, are conductively connected to the first and second support members 220-1 and 220-1, which are disposed on the two corner portions 142-1 and 142-2 adjacent to the first side portion 141-1 of the housing 140, on which the first position sensor 170 is disposed, thereby shortening the path.

In addition, the first and second terminals B1 and B2 of the circuit board 190 are disposed on the body portion S1 of the circuit board 190, thereby shortening the path.

In addition, the first terminal B1 of the circuit board 190 is disposed on one end of the circuit board 190 such that the first terminal B1 overlaps the first corner portion 142-1 of the housing 140 in the optical-axis direction, and the second terminal B2 of the circuit board 190 is disposed on the other end of the circuit board 190 such that the second terminal B2 overlaps the second corner portion 142-2 of the housing 140 in the optical-axis direction, thereby shortening the path.

In addition, the spacing distance (e.g. the shortest spacing distance) between the first terminal B1 of the circuit board 190 and the first support member 220-1 is shorter than the spacing distance (e.g. the shortest spacing distance) between the third terminal B3 of the circuit board 190 and the first support member 220-1 and the spacing distance (e.g. the shortest spacing distance) between the fourth terminal B4 of the circuit board 190 and the first support member 220-1.

In addition, the spacing distance (e.g. the shortest spacing distance) between the second terminal B2 of the circuit board 190 and the second support member 220-2 is shorter than the spacing distance (e.g. the shortest spacing distance) between the third terminal B3 of the circuit board 190 and the second support member 220-2 and the spacing distance (e.g. the shortest spacing distance) between the fourth terminal B4 of the circuit board 190 and the second support member 220-1.

Since the path is shortened due to the above-described configuration, the length of each of the first and second extension portions P1 and P2 may be reduced, and accordingly, the resistance of the path (e.g. the resistance of the first and second upper elastic units 150-1 and 150-2) may be reduced.

In addition, each of the first upper elastic unit 150-1, which is connected to the first terminal B1 of the circuit board 190, and the second upper elastic unit 150-2, which is connected to the second terminal B2, includes the first outer frame coupled to the housing 140, but does not include the first inner frame 151 or the first frame connection portion, whereby the resistance thereof may be reduced compared to the second and fourth upper elastic units 150-3 and 150-4.

In the embodiment having the above-described configuration, since the length of the path along which the power signals GND and VDD are transmitted to the first position sensor 170 is reduced, it is possible to reduce the resistance of the path (e.g. the resistance of the first and second upper elastic units 150-1 and 150-2), thereby inhibiting the power signals GND and VDD from being attenuated, reducing power consumption, and lowering the drive voltage of the driver IC of the first position sensor 170.

In the embodiment, in order to facilitate soldering for conductive coupling of the upper elastic units 150-1 to 150-4 to the first to fourth extension portions P1 to P4 to thus improve soldering efficiency, the first to sixth terminals P1 to P6 may be disposed on the second surface 19a of the circuit board 190.

If the first to sixth terminals B1 to B6 are disposed on the first surface 19b of the circuit board 190, it may be difficult to perform soldering, thus deteriorating soldering efficiency. In addition, foreign substances (e.g. contaminants) generated by soldering may be introduced into the lens moving apparatus 100, leading to malfunction of the lens moving apparatus.

Since the third and fourth terminals B3 and B4 are disposed between the first terminal B1 and the second terminal B2 and the circuit board 190 extends or protrudes to the first corner portion 142-1 and the second corner portion 142-2 of the housing 140 in order to shorten the path, a portion of each of the third upper elastic unit 150-3 and the fourth upper elastic unit 150-3 (e.g. each of the third extension portion P3 and the fourth extension portion P4) may be coupled to a corresponding one of the third and fourth terminals B3 and B4 through the circuit board 190.

The fifth and sixth terminals B5 and B6 of the circuit board 190 may be disposed on the extension portion S2 of the circuit board 190 in order to facilitate coupling to the lower elastic units 160-1 and 160-2.

In the embodiment, since magnetic field interference between the first and second magnets 180 and 185 and the first magnet 130 is alleviated, it is possible to inhibit the AF driving force from being reduced by magnetic field interference, thus making it possible to obtain desired AF driving force without needing a separate yoke.

As described above, the embodiment may reduce the number of support members, and accordingly, the size of the lens moving apparatus may be reduced.

In addition, since the number of support members is reduced, the resistance of the support members may be reduced, whereby power consumption may be reduced, and the sensitivity of OIS operation may be improved.

In addition, although the number of support members is reduced, the thicknesses of the support members may be increased in order to realize a predetermined elastic force. Due to the increase in the thickness of the support members, the influence of external impact on the OIS operation unit may be reduced.

Figure 18A:
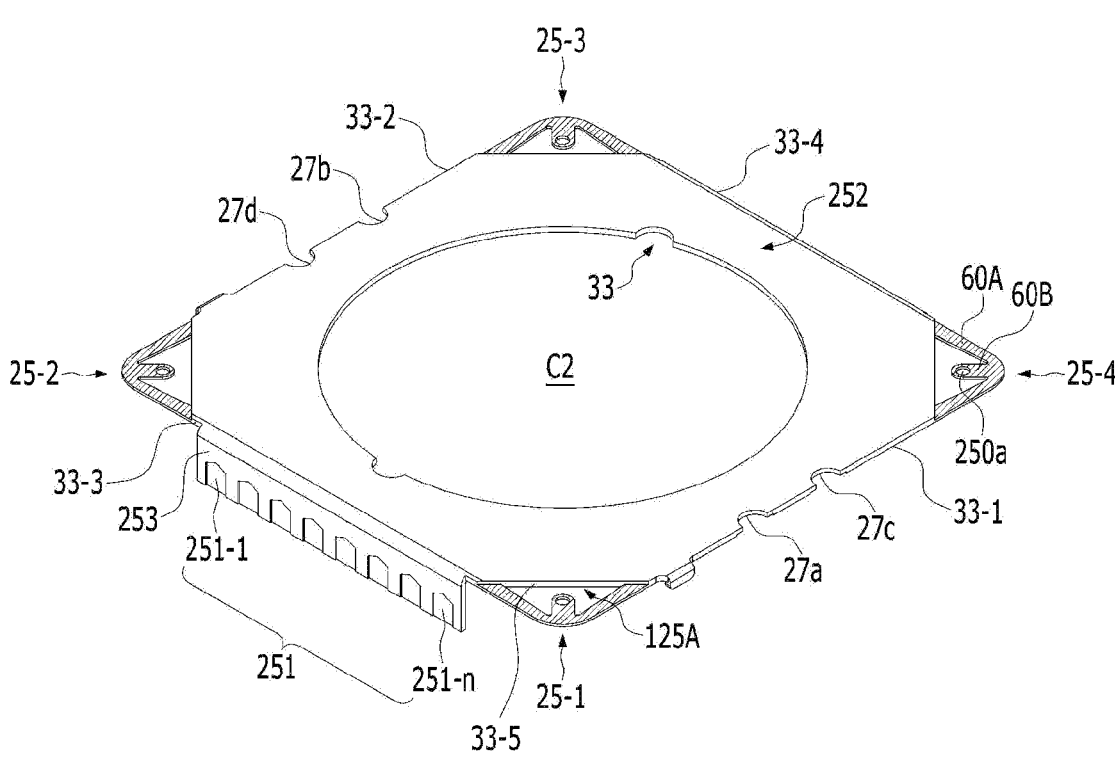
FIG. 18A is a perspective view of the circuit board shown in FIG. 13A.
Figure 18B:
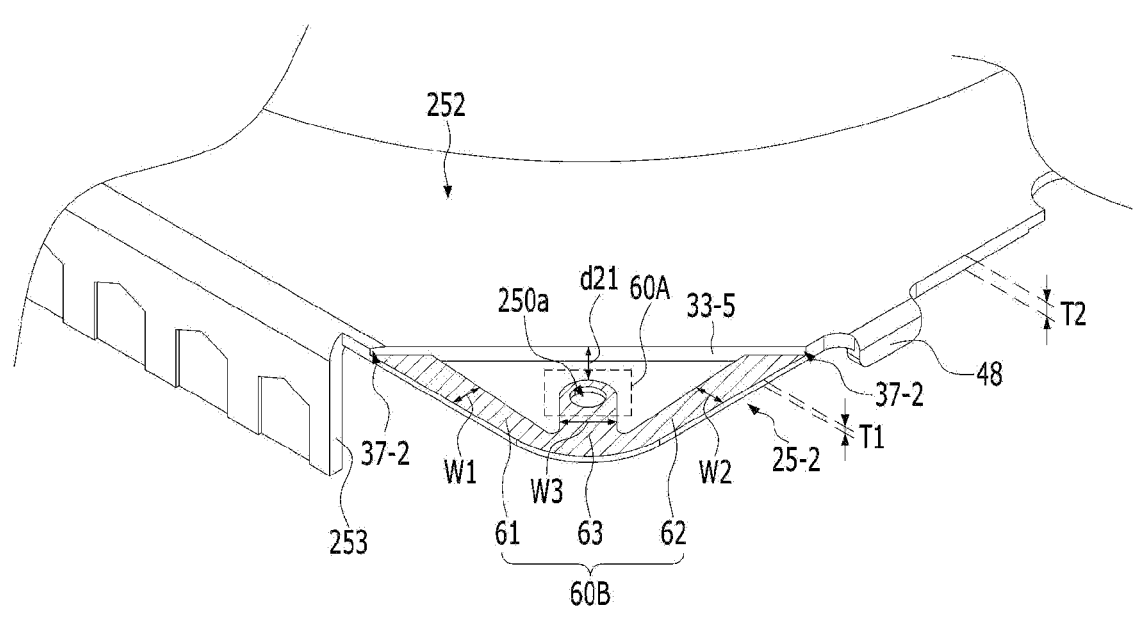
FIG. 18B is an enlarged view of elastic connection portions of the circuit board shown in FIG. 18A.

FIG. 18A is a perspective view of the circuit board 250 shown in FIG. 13A, and FIG. 18B is an enlarged view of the elastic connection portions 25-1 to 25-4 of the circuit board 250 shown in FIG. 18A.

Referring to FIGS. 18A and 18B, the circuit board 250 may include elastic connection portions 25-1 to 25-4, which are coupled to the support members 220. The elastic connection portions 25-1 to 25-4 may extend from the corner regions of the circuit board 250, and the other ends of the support members 220-1 to 220-4 may be coupled thereto.

The elastic connection portions 25-1 to 25-4 may be referred to as "buffering portions", "elastic portions", or "spring portions".

The elastic connection portions 25-1 to 25-4 may be disposed on the corners or the corner regions of the body 252 of the circuit board 250.

The elastic connection portions 25-1 to 25-4 may extend from the body 252 of the circuit board 250 to the support members 220-1 to 220-4, and may be coupled to the other ends of the support members 220-1 to 220-4 by means of the solder 902 or a conductive adhesive member.

The circuit board 250 may include escape portions 125A formed at the corners or the corner regions of the body 252 in order to avoid spatial interference with the support members 220. In an example, the escape portions 125A may be formed by chamfering the corners or the corner regions of the body 252, but the disclosure is not limited thereto. The escape portions of the circuit board 250 may be formed in any of various shapes capable of avoiding interference with the support members 220.

The circuit board 250 may be provided at the corners or the corner regions of the body 252 thereof with outer connection surfaces (or fifth outer surfaces) 33-5 for interconnecting two adjacent ones 33-1 and 33-3, 33-2 and 33-3, 33-2 and 33-4, and 33-4 and 33-1 of the outer surfaces of the circuit board 250.

The elastic connection portions 25-1 to 25-4 may extend and protrude from the outer connection surfaces 33-5.

In an example, each of the elastic connection portions 25-1 to 25-4 may include a coupling portion 60A, to which the other end of a corresponding one of the support members 220-1 to 220-4 is coupled, and a connection portion 60B, which connects the first coupling portion 60A to the body 252 of the circuit board 250. The connection portion 60B may extend from the body 252 so as to be connected to the coupling portion 60A, and may be referred to as an "extension portion".

The coupling portion 60A may be referred to as a "first portion", and the connection portion 60B may be referred to as a "second portion".

The elastic connection portions 25-1 to 25-4 may be elastic members. In an example, the elastic connection portions 25-1 to 25-4 may be embodied as leaf springs, like the upper elastic member 150 and the lower elastic member 160, but the disclosure is not limited thereto.

The elastic connection portions 25-1 to 25-4 may include a conductive material, and may conductively connect the support members 220-1 to 220-4 to the terminals 251 of the circuit board 250.

Each of the elastic connection portions 25-1 to 25-4 may have a hole 250a formed therein to allow a corresponding one of the support members 220-1 to 220-5 to pass therethrough. In an example, the hole 250a, through which a corresponding one of the support members 220-1 to 220-5 passes, may be formed in the coupling portion 60A. The hole 250a may be a through-hole formed through the coupling portion 60A.

In an example, the coupling portion 60A may include the hole 250a. In addition, in an example, the coupling portion 60A may include a region of part of a corresponding one of the elastic connection portions 25-1 to 25-4 that is adjacent to the hole 250a, in which solder or a conductive adhesive member is disposed.

The connection portion 60B may be formed so as to be curved or bent at least once. The connection portion 60B may include a zigzag-shaped section, at least one curved section, or at least one bent section.

In an example, the connection portion 60B may include a first connection portion 61 (or a "first extension portion"), which extends or protrudes from one region of the corner of the body 252, a second connection portion (or a "second extension portion"), which extends or protrudes from another region of the corner of the body 252 and is connected to the first connection portion 61, and a third connection portion 63 (or a "third extension portion"), which is connected to at least one of the first connection portion 61 or the second connection portion 62 and is connected to the coupling portion 60A.

In an example, the first connection portion 61 may extend from a first region 37-1 of the outer connection surface 33-5, which is adjacent to one (e.g. 33-3) of two adjacent ones (e.g. 33-1 and 33-3) of the outer surfaces of the body 252.

In an example, the first connection portion 61 may be a line shape, for example, a straight line shape. In another embodiment, the first connection portion may be a curved line shape that is curved at least once. In an example, the first connection portion may include a zigzag-shaped section, at least one curved section, or at least one bent section. In still another embodiment, the first connection portion may be a line shape including a curved section and a linear section.

In addition, in an example, the second connection portion 62 may extend from a second region 37-2 of the outer connection surface 33-5, which is adjacent to the other (e.g. 33-1) of two adjacent ones (e.g. 33-1 and 33-3) of the outer surfaces of the body 252, and may be connected to the first connection portion 61.

In an example, the second connection portion 62 may be a line shape, for example, a straight line shape. In another embodiment, the second connection portion may be a curved line shape that is curved at least once. In an example, the second connection portion may include a zigzag-shaped section, at least one curved section, or at least one bent section. In still another embodiment, the second connection portion may be a line shape including a curved section and a linear section.

In an example, the third connection portion 63 may connect a portion where the first connection portion 61 and the second connection portion 62 meet to the coupling portion 60A.

In an example, the third connection portion 63 may be a line shape, for example, a straight line shape. In another embodiment, the third connection portion may be a curved line shape that is curved at least once. In an example, the third connection portion may include a zigzag-shaped section, at least one curved section, or at least one bent section. In still another embodiment, the third connection portion may be a line shape including a curved section and a linear section.

In an example, a single contact may be formed between the coupling portion 60A and the connection portion 60B by the third connection portion 63.

In an example, the other end of each of the support members 220-1 to 220-4, which is coupled to the coupling portion 60A, may be located between the connection portion 60B and the corner or the corner region of the body 252. In another example, the other end of each of the support members 220-1 to 220-4, which is coupled to the coupling portion 60A, may be located inside the connection portion 60B.

In an example, each of the elastic connection portions 25-1 to 25-4 may include a portion that increases and then decreases in width from one end of the connection portion 60B to the coupling portion 60A. One end of the connection portion 60B may be a portion where the connection portion 60B and the body 252 meet.

The connection portion 60B may include a portion that gradually decreases in width from the corner or the corner region of the body 252 toward a corresponding one of the support members 220-1 to 220-4.

In an example, the width W1 of the first connection portion 61 may be equal to the width W2 of the second connection portion 62. The reason for this is to enable the elastic connection portions 25-1 to 25-4 to support the OIS operation unit in an equilibrium state. In an example, the first connection portion 61 and the second connection portion 62 may be formed so as to be symmetrical to each other with respect to the third connection portion 63. In an example, the width of the first connection portion 61 and the width of the second connection portion 62 may be symmetrical to each other with respect to the third connection portion 63.

In another embodiment, the width W1 of the first connection portion 37-1 may be different from the width W2 of the second connection portion 37-2. In an example, the width W1 of the first connection portion 37-1 may be smaller than the width W2 of the second connection portion 37-2. In another embodiment, the width W1 of the first connection portion 37-1 may be greater than the width W2 of the second connection portion 37-2.

The first connection portion 61 may include a portion that decreases in width from one end of the first connection portion 61 (or the corner of the body 252) toward the support member 220. In addition, the second connection portion 62 may include a portion that decreases in width from one end of the second connection portion 62 (or the corner of the body 252) toward the support member 220.

The width W1 of the first connection portion 61 may gradually decrease from one end of the first connection portion 61 toward the other end of the first connection portion 61.

One end of the first connection portion 61 may be a portion that is connected to the body 252 of the circuit board 250, and the other end of the first connection portion 61 may be a portion that is connected to the second connection portion 62 (and/or the third connection portion 64).

In an example, the width of one end of the first connection portion 61 may be greater than the width of the other end of the first connection portion 61, but the disclosure is not limited thereto. In another embodiment, the two widths may be equal to each other.

The width W2 of the second connection portion 62 may gradually decrease from one end of the second connection portion 62 toward the other end of the second connection portion 62.

One end of the second connection portion 62 may be a portion that is connected to the body 252 of the circuit board 250, and the other end of the second connection portion 62 may be a portion that is connected to the first connection portion 61 (and/or the third connection portion 64).

In an example, the width of one end of the second connection portion 62 may be greater than the width of the other end of the second connection portion 62, but the disclosure is not limited thereto. In another embodiment, the two widths may be equal to each other.

In addition, in an example, the width of one end of the first connection portion 61 may be greater than the width of the other end of the first connection portion 61, and the width of one end of the second connection portion 62 may be greater than the width of the other end of the second connection portion 62. The reason why the width of one end of each of the first and second connection portions 61 and 62 is set to be greater than the width of the other end of each of the first and second connection portions 61 and 62 is to enable the elastic connection portions 25-1 to 25-4 to be stably supported by the body 252 of the circuit board 250, to increase the elastic force of the elastic connection portions in the optical-axis direction, and to reduce the elastic force of the elastic connection portions in a direction perpendicular to the optical axis, thereby stably supporting a large-diameter lens.

In an example, the width W3 of the third connection portion 63 may be greater than the width W1 of the first connection portion 61 and the width W2 of the second connection portion 62 (W3>W1 and W3>W2). As will be described later, the first damper 310 may be disposed between the third connection portion 63 and the body 252 (e.g. the escape portion 125A) to interconnect the second connection portion 63 and the body 252. Since the width W3 is greater than the width W1 and the width W2 (W3>W1 and W3>W2), it is possible to increase the contact area between the third connection portion 63, the body 252, and the first damper 310, thereby lowering a quality factor (Q) for determining the resonance frequency of the frequency response characteristics according to OIS operation. Because the quality factor is lowered, the gain value of the frequency response characteristics at a primary resonance frequency may decrease, and a secondary resonance frequency and a tertiary resonance frequency may have high values, whereby the oscillation phenomenon of the OIS operation unit may be reduced, the accuracy of OIS feedback operation may be improved, and consequently, the image quality of the camera module may be improved.

In another embodiment, the width W3 of the third connection portion 63, the width W1 of the first connection portion 61, and the width W2 of the second connection portion 62 may be equal to each other. In still another embodiment, the width W3 of the third connection portion 63 may be smaller than at least one of the width W1 of the first connection portion 61 or the width W2 of the second connection portion 62.

Here, the width of each of the first to third connection portions 61 to 63 may be the length of each of the first to third connection portions 61 to 63 in a direction perpendicular to the longitudinal direction (or the extending direction) thereof.

The width of the coupling portion 60A may be equal to the width W3 of the third connection portion 63. In an example, the width of the coupling portion 60A may be greater than the width W1 of the first connection portion 61 and the width W2 of the second connection portion 62. The reason for this is that the coupling portion 60A has therein the hole 250a, which is coupled to the other end of a corresponding one of the support members 220-1 to 220-4, and needs to have a sufficient area to be coupled to a corresponding one of the support members 220-1 to 220-4 by means of the solder 902 or a conductive adhesive member. In addition, the reason for this is to secure a contact area between the coupling portion 60A and the first damper 310.

In another embodiment, the width of the coupling portion 60A may be greater than the width of the third connection portion 64. In still another embodiment, the width of the coupling portion 60A may be smaller than the width of the third connection portion 64.

In an example, the widths W1, W2, and W3 of the elastic connection portion 25-1 may be greater than the width W11 of the connection portion 530 of the outer frame 152 of the upper elastic member 150 (refer to FIG. 10).

The thickness T1 of each of the elastic connection portions 25-1 to 25-4 may be smaller than the thickness T2 of the body 252 of the circuit board 250 (T1<T2).

The thickness T1 of each of the elastic connection portions 25-1 to 25-4 may be the length of each of the elastic connection portions 25-1 to 25-4 in the optical-axis direction, and the thickness of the body 252 may be length of the body 252 in the optical-axis direction.

In an example, the spring constant of each of the elastic connection portions 25-1 to 25-4 may be greater than the spring constant of the upper elastic member 150.

In an example, the spring constant of each of the elastic connection portions 25-1 to 25-4 in a direction perpendicular to the optical-axis direction (e.g. the X-axis direction or the Y-axis direction) may be greater than the spring constant of the upper elastic member 150 in a direction perpendicular to the optical-axis direction.

In another example, the spring constant of each of the elastic connection portions 25-1 to 25-4 in the optical-axis direction (e.g. the Z-axis direction) may be greater than the spring constant of the upper elastic member 150 in the optical-axis direction.

The elastic connection portions 25-1 to 25-4, the coupling portion 60A, the connection portion 60B, the first connection portion 61, the second connection portion 62, or the third connection portion 63 may be referred to as a "buffering portion", an "elastic portion", a "spring portion", or a "suspension portion".

In a general lens moving apparatus in which the support member is directly coupled to the body of the circuit board, the circuit member of the second coil, or the base, a large stress and fatigue load may be applied to the support members due to a large-diameter lens. Furthermore, in this case, because one end of the support member is coupled to the upper elastic member and the other end of the support member is secured to the body of the circuit board, the circuit member of the second coil, or the base, which is a fixing portion, the stress may concentrate on the other end of the support member, leading to deformation of the support member.

It may be possible to reduce the stress applied to the support member by reducing the spring constant of the upper elastic member. However, this may increase the posture difference of the OIS operation unit, which is caused by gravity.

Furthermore, when the spring constant of the upper elastic member is reduced in order to reduce stress, the degree of freedom of the shape of the upper elastic member may be reduced, which may cause deterioration in the frequency response characteristics of OIS operation and oscillation of the OIS operation unit.

However, in the embodiment, by virtue of the elastic connection portions 25-1 to 25-4, each of which is an elastic member that is directly connected to the other end of a corresponding one of the support members 220, the stress applied to the support members due to the large-diameter lens may be dispersed, and accumulation of fatigue in the support members may be eliminated.

That is, since the coupling portion 60A of each of the elastic connection portions 25-1 to 25-4 is spaced apart from the body 252, each of the support members 220-1 to 220-4, which is coupled to the coupling portion 60A according to the embodiment, may easily move in the first direction. The support members 220-1 to 220-4 according to the embodiment may move more easily in the first direction than a general support member, which is secured to the body of the circuit board. Accordingly, the accuracy of handshake correction may be increased, stress may be dispersed with respect to drop and impact, and consequently, deformation and disconnection of the support members 220-1 to 220-4 may be inhibited.

In addition, since each of the elastic connection portions 25-1 to 25-4 has a shape that is bent at least once, the overall length of each of the elastic connection portions 25-1 to 25-4 may increase. Accordingly, the embodiment may disperse the stress applied to the upper elastic member 150 and/or the support members 220, and may inhibit the elastic connection portions from being broken by impact and the stress applied to the upper elastic member 150 and/or the support members 220.

In addition, in the embodiment, since the spring constant of each of the elastic connection portions 25-1 to 25-4 is greater than the spring constant of the upper elastic member, the strength of the elastic connection portions 25-1 to 25-4 may increase, and accordingly, the posture difference of the OIS operation unit, which is caused by gravity, may be reduced.

In addition, since a single contact is formed between the coupling portion 60A and the connection portion 60B due to the third connection portion 63, the elastic connection portions 25-1 to 25-4 may move more easily in the first direction, and the stress applied to the upper elastic member 150 and/or the support members 220 by impact may be dispersed more effectively.

In addition, as described above, because the strength of the elastic connection portions 25-1 to 25-4 increases, the embodiment may increase the secondary resonance frequency of the frequency response characteristics according to OIS operation, thereby inhibiting oscillation of the OIS operation unit during OIS operation. In an example, the frequency response characteristics according to OIS operation may be frequency response characteristics related to an output signal output from the second position sensor 240.

Figure 19A:
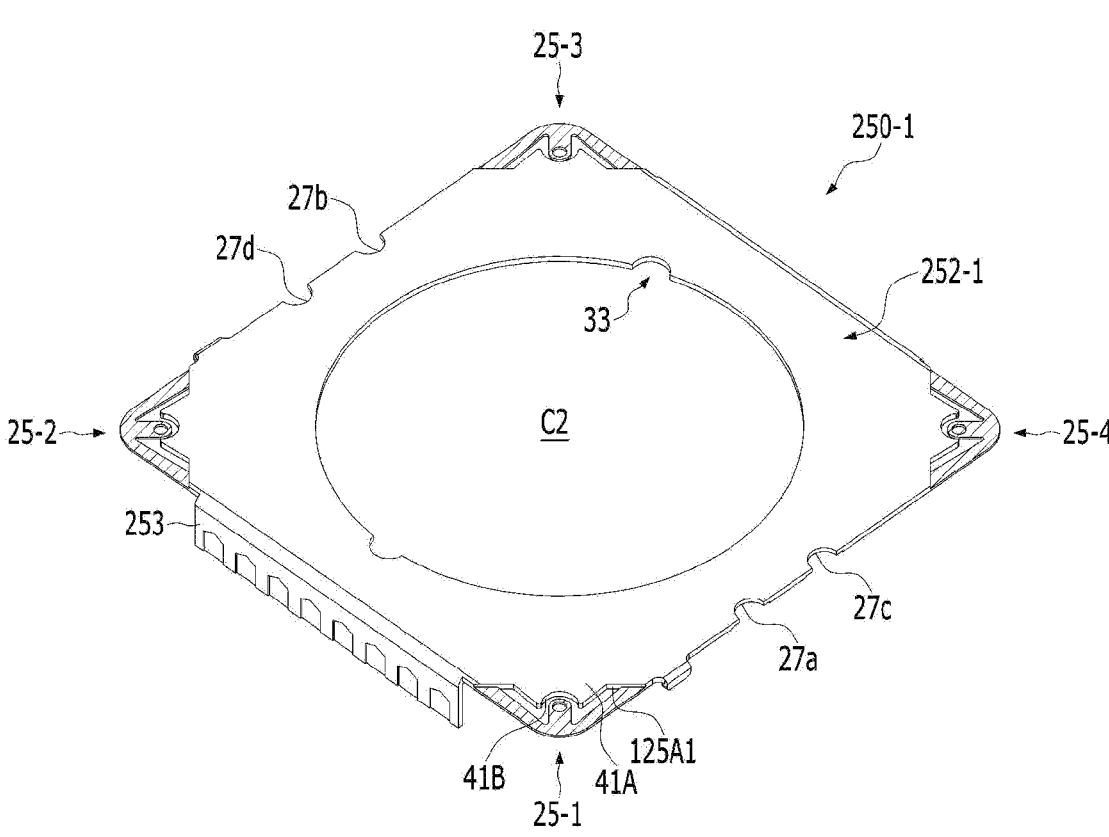
FIG. 19A is a perspective view of a body according to another embodiment of the circuit board shown in FIG. 18A.
Figure 19B:
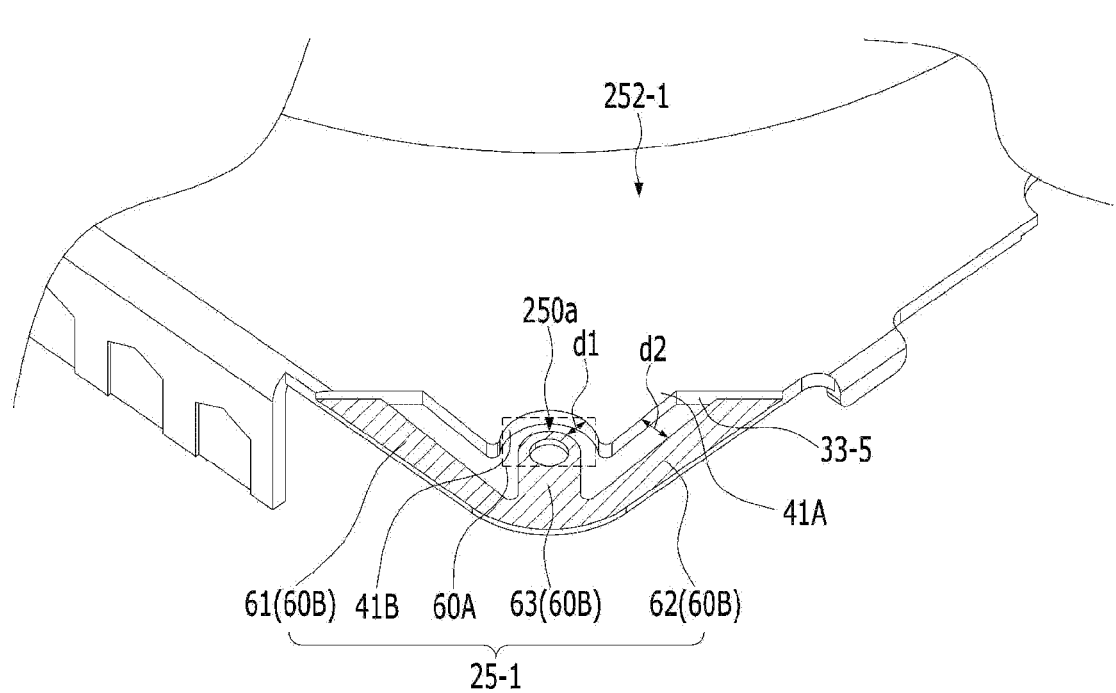
FIG. 19B is an enlarged view of an escape portion of the body shown in FIG. 19A.

FIG. 19A is a perspective view of a body 252-1 according to another embodiment of the circuit board 250 shown in FIG. 18A, and FIG. 19B is an enlarged view of an escape portion 125A1 of the body 252-1 shown in FIG. 19A. In FIGS. 19A and 19B, the same reference numerals as those in FIGS. 18A and 18B denote the same components, and description of the same components will be made briefly or omitted.

Referring to FIGS. 19A and 19B, the escape portion 125A1 of the body 252-1 of the circuit board 250 may be provided with an extension portion 41A, which extends toward each of the elastic connection portions 25-1 to 25-4.

The body 252-1 may include the extension portion 41A, which extends toward each of the elastic connection portions 25-1 to 25-4. In an example, at least part of the extension portion 41A may overlap the first surface 21A of the stepped portion 212A of the base 210 in the optical-axis direction. The first damper 310 may connect the extension portion 41A of the body 252-1 to each of the elastic connection portions 25-1 to 25-4.

The extension portion 41A may protrude from the outer connection surface 33-5 toward each of the elastic connection portions 25-1 to 25-4. In an example, the extension portion 41A may protrude from the outer connection surface 33-5 toward the coupling portion 60A of each of the elastic connection portions 25-1 to 25-4.

The extension portion 41A may be referred to as a "protruding portion" or a "damper guide portion".

The extension portion 41A may be spaced apart from each of the elastic connection portions 25-1 to 25-4.

The width W21 of the extension portion 41A may gradually decrease from the extension portion 41A (or the center of the bore C2 in the circuit board 250) toward the coupling portion 60B. The width W21 of the extension portion 41A may be the length of the extension portion 41A in a direction perpendicular to the direction from the extension portion 41A (or the center of the bore C2 in the circuit board 250) toward the coupling portion 60B.

The extension portion 41A may have a hole 41B or a recess formed in one end thereof in order to increase the area of contact with the first damper 310. In this case, one end of the extension portion 41A may be a portion that is adjacent to and spaced apart from the coupling portion 60A.

In an example, the hole 41B may be recessed from the coupling portion 60A toward the extension portion 41A. In addition, the hole 41B may have an opening that faces the coupling portion 60A, and may have a shape corresponding to a part of the coupling portion 60B.

In an example, at least a portion of the hole 41B may overlap the first surface 21A of the stepped portion 212A of the base 210 in the optical-axis direction.

At least a portion of each of the elastic connection portions 25-1 to 25-4 may be disposed in the hole 41B through the opening in the hole 41B.

In an example, at least part of the coupling portion 60B may be disposed in the hole 41B, and the outer surface of the extension portion 41A that is defined by the hole 41B may face at least part of the coupling portion.

In an example, the hole 41B may be a semicircular or semi-elliptical shape when viewed from above, but the disclosure is not limited thereto. In another embodiment, the hole may be a polygonal shape, such as a rectangular or triangular shape, when viewed from above.

In an example, compared to the configuration shown in FIGS. 18A and 18B, the spacing distance between the body 252-1 and each of the elastic connection portions 25-1 to 25-4 may be reduced due to the extension portion 41A, whereby the first damper 310 may be easily applied to the body 252-1 and each of the elastic connection portions 25-1 to 25-4.

In an example, the spacing distance d1 between the extension portion 41A and the coupling portion 60A may be shorter than the spacing distance d2 between the extension portion 41A and the connection portion 60B (d1<d2). In addition, in an example, the spacing distance d1 between the extension portion 41A and the coupling portion 60A may be less than the widths W1, W2, and W3 of the connection portion 60B. The reason for this is to facilitate application of the first damper 310 to the body 252-1 and each of the elastic connection portions 25-1 to 25-4. In an example, "d1" may be the maximum spacing distance between the extension portion 41A and the coupling portion 60A.

In another embodiment, the spacing distance between the extension portion 41A and the coupling portion 60A may be equal to or longer than the spacing distance between the extension portion 41A and the connection portion 60B. Alternatively, the spacing distance between the extension portion 41A and the coupling portion 60A may be equal to or greater than the width of the connection portion 60B.

Figure 20A:
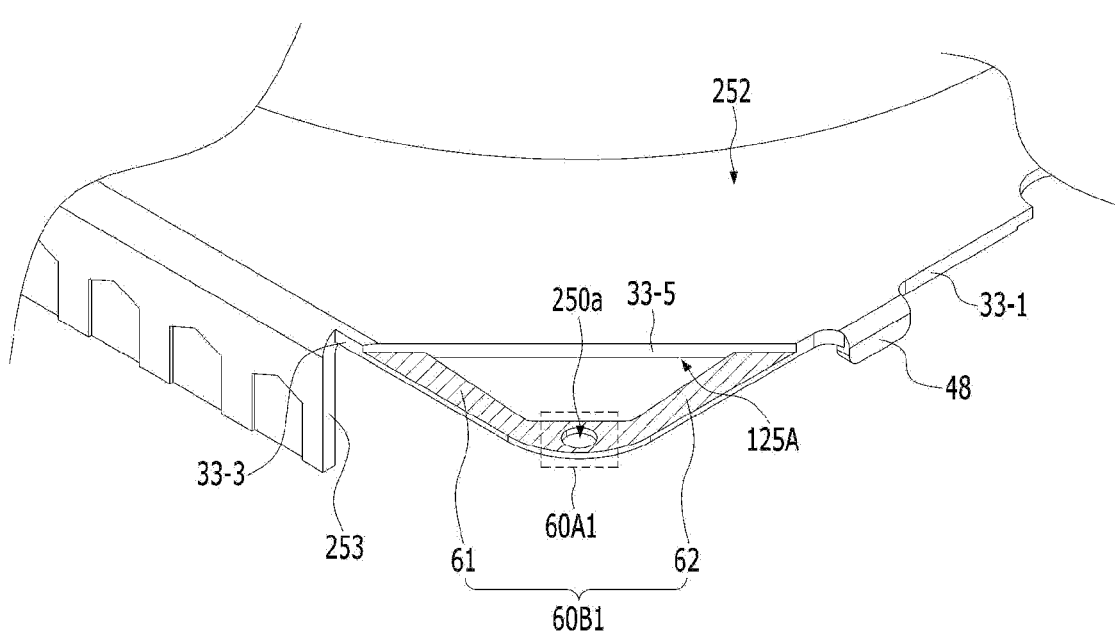
FIG. 20A illustrates a modification of the elastic connection portion shown in FIG. 18B.

FIG. 20A illustrates a modification 25-1A of the elastic connection portion 25-1 shown in FIG. 18B.

In FIG. 20A, the same reference numerals as those in FIGS. 18A and 18B denote the same components, and the description made with reference to FIGS. 18A and 18B may apply to the same components. Although FIG. 20A illustrates one elastic connection portion, the description thereof may identically apply to the three remaining elastic connection portions.

Referring to FIG. 20A, the elastic connection portion 25-1A may include a coupling portion 60A1 and a connection portion 60B1. Compared to the elastic connection portion 25-1 shown in FIG. 18B, the connection portion 60B1 of the elastic connection portion 25-1A shown in FIG. 20A may include first and second connection portions 61 and 62, and the third connection portion 653 may be eliminated. The coupling portion 60A1 may be provided at a portion where the first and second connection portions 61 and 62 meet. In an example, the hole 250a may be formed in a portion where the first and second connection portions 61 and 62 meet. The circuit board 250 may include the escape portion 125A shown in FIG. 18A, and the description of the escape portion 125A shown in FIG. 18A may apply to the escape portion 125A shown in FIG. 20A.

Figure 20B:
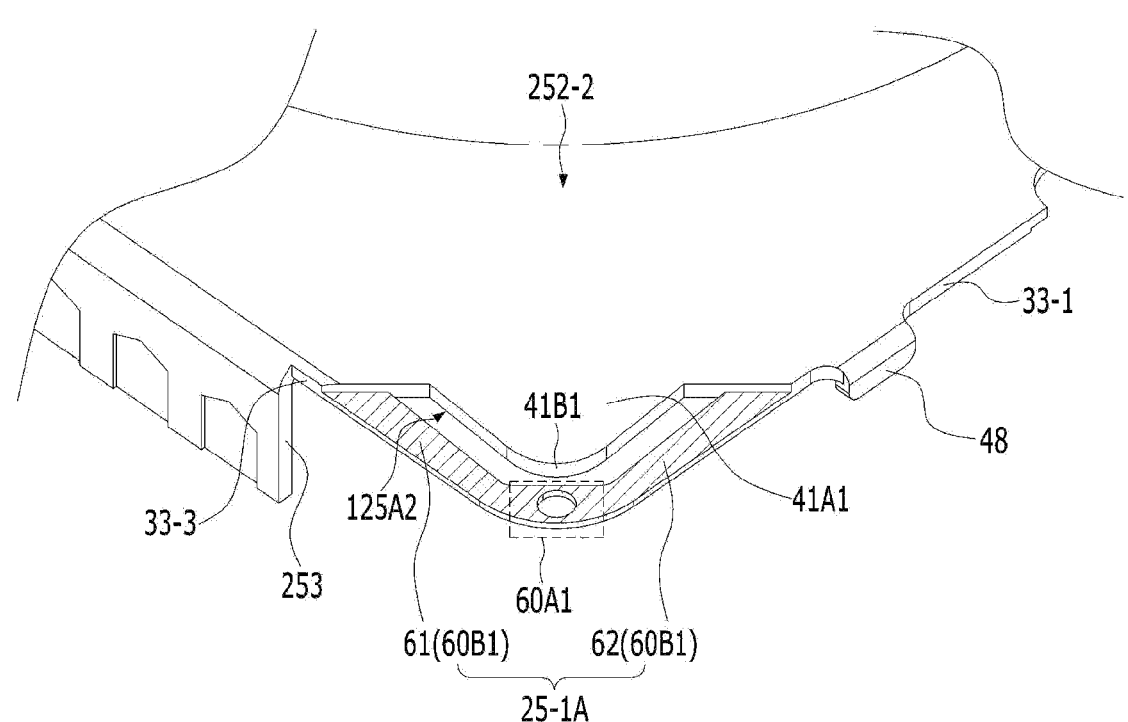
FIG. 20B illustrates a modification of the body of the circuit board shown in FIG. 20A.

FIG. 20B illustrates a modification 252-2 of the body 252 of the circuit board 250 shown in FIG. 20A.

Referring to FIG. 20B, the body 252-2 shown in FIG. 20B may include an extension portion 41A1, which extends toward the coupling portion 60A1.

The extension portion 41A1 may protrude from the outer connection surface 33-5 toward the elastic connection portion 25-1A. In an example, the extension portion 41A1 may extend or protrude from the outer connection surface 33-5 toward the coupling portion 60A1.

The hole shown in FIG. 19B may not be formed in one end of the extension portion 41A1, but the disclosure is not limited thereto. In another embodiment, the extension portion may have a recess or a hole formed in one end thereof in order to increase the area of contact with the damper.

The relationships between the width of the extension portion 41A1, d1, d2, W1, W2, and W3 described above with reference to FIG. 19B may apply to the embodiment shown in FIG. 20B.

Figure 20C:
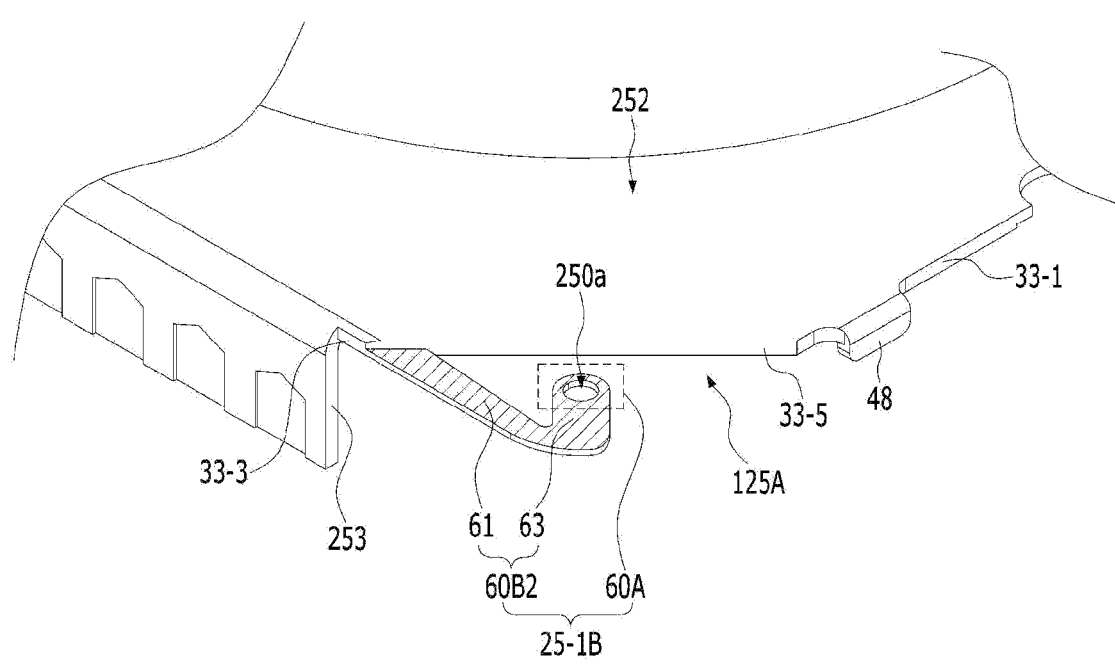
FIG. 20C illustrates a modification of the elastic connection portion shown in FIG. 18B.

FIG. 20C illustrates a modification 25-1B of the elastic connection portion 25-1 shown in FIG. 18B.

In FIG. 20C, the same reference numerals as those in FIGS. 18A and 18B denote the same components, and the description made with reference to FIGS. 18A and 18B may apply to the same components. Although FIG. 20C illustrates one elastic connection portion, the description thereof may identically apply to the three remaining elastic connection portions.

In the embodiment 25-1B shown in FIG. 20C, the second connection portion 62 may be eliminated from the elastic connection portion 25-1 shown in FIG. 18B. That is, the elastic connection portion 25-1*b* may include a coupling portion 60A and a connection portion 60B2, and the connection portion 60B2 may include a first connection portion 61 and a third connection portion 63.

In another modification, the first connection portion 62 shown in FIG. 18B may be eliminated. In still another modification, the elastic connection portion may include a coupling portion 60A, a second connection portion 62, and a third connection portion 63.

Figure 20D:
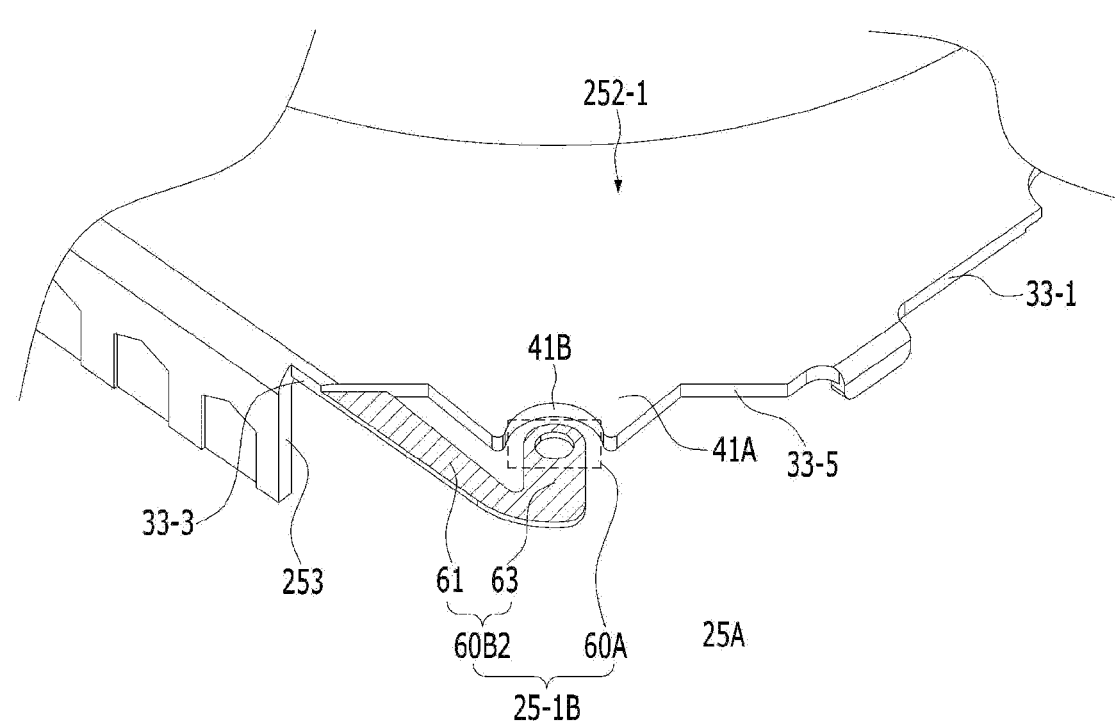
FIG. 20D illustrates a modification of the body shown in FIG. 20C.

FIG. 20D illustrates a modification of the body 252 shown in FIG. 20C.

The body 252-1 shown in FIG. 20D may include the extension portion 41A shown in FIG. 19B, and the extension portion 41A may have a hole 41B formed therein. The description of the extension portion 41A and the hole 41B shown in FIG. 19B may apply to the modification shown in FIG. 20D.

Figure 20E:
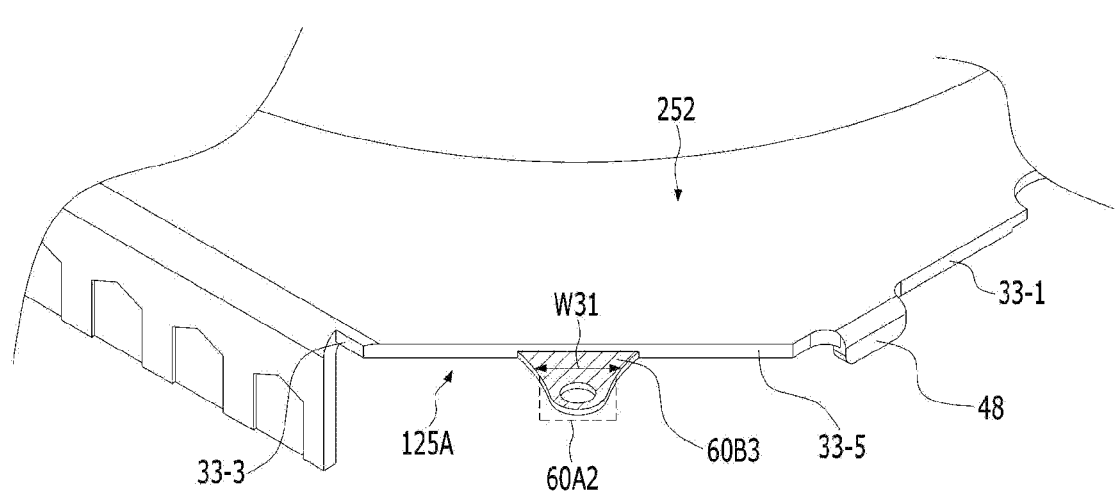
FIG. 20E illustrates an elastic connection portion according to another embodiment.

FIG. 20E illustrates an elastic connection portion 25-1C according to another embodiment.

Referring to FIG. 20E, the elastic connection portion 25-1C may include a coupling portion 60A2, which is coupled to each of the support members 220-1 to 220-4, and a connection portion 60B3, which extends from the body 252 and is connected to the coupling portion 60A2.

In an example, the connection portion 60B3 may extend or protrude from one region of the corner of the body 252. In an example, the connection portion 60B3 may extend from the central region of the corner of the body 252 toward the coupling portion 60A2.

In an example, the connection portion 60B3 may protrude from the outer connection surface 33-5.

In an example, the other end of each of the support members 220-1 to 220-4, which is coupled to the coupling portion 60A2, may be located outside the connection portion 60B3.

In an example, the width W31 of the connection portion 60B3 may gradually decrease from one end of the connection portion 60B3 toward the other end of the connection portion 60B3.

One end of the connection portion 60B3 may be a portion that is connected to the body 252 of the circuit board 250, and the other end of the connection portion 60B3 may be a portion that is connected to the coupling portion 60A2.

In addition, in an example, the width of one end of the connection portion 60B3 may be greater than the width of the other end of the connection portion 60B3. The reason why the width of one end of the connection portion 60B3 is set to be greater than the width of the other end of the connection portion 60B3 is to enable the elastic connection portion 25-1C to be stably supported by the body 252 of the circuit board 250, to increase the elastic force of the elastic connection portion 25-1C in the optical-axis direction, and to reduce the elastic force of the elastic connection portion 25-1C in a direction perpendicular to the optical axis, thereby stably supporting a large-diameter lens.

The elastic connection portions shown in FIGS. 18A to 20B may be disposed so as to be rotationally symmetrical to each other about the center of the body 252 or 252-1 of the circuit board 250. In an example, the center of the body 252 or 252-1 may be the center of the bore C2 in the circuit board 250, or may be the optical axis.

In an example, the elastic connection portions shown in FIGS. 18A to 20B may have a 90-degree rotational symmetry about the center of the body 252 or 252-1 of the circuit board 250.

Although the embodiments are illustrated in FIGS. 18A to 20E as being configured such that one elastic connection portion is provided at each of the corners of the body 252 or 252-1 of the circuit board 250, the disclosure is not limited thereto. In another embodiment, two or more elastic connection portions may be provided at each of the corners of the body 252 or 252-1 of the circuit board 250, and the description of the elastic connection portions shown in FIGS. 18A to 20E may apply thereto.

In an example, elastic connection portions, the number of which is equal to the number of support members disposed on each of the corners of the housing, may be provided at each of the corners of the body 252 or 252-1.

In an example, the embodiment may include two support members, which are disposed on each of the corners of the housing 140, and two elastic connection portions, which are provided at each of the corners of the body so as to correspond to the two support members. Each of the two elastic connection portions may be coupled to a corresponding one of the two support members.

Figure 21A:
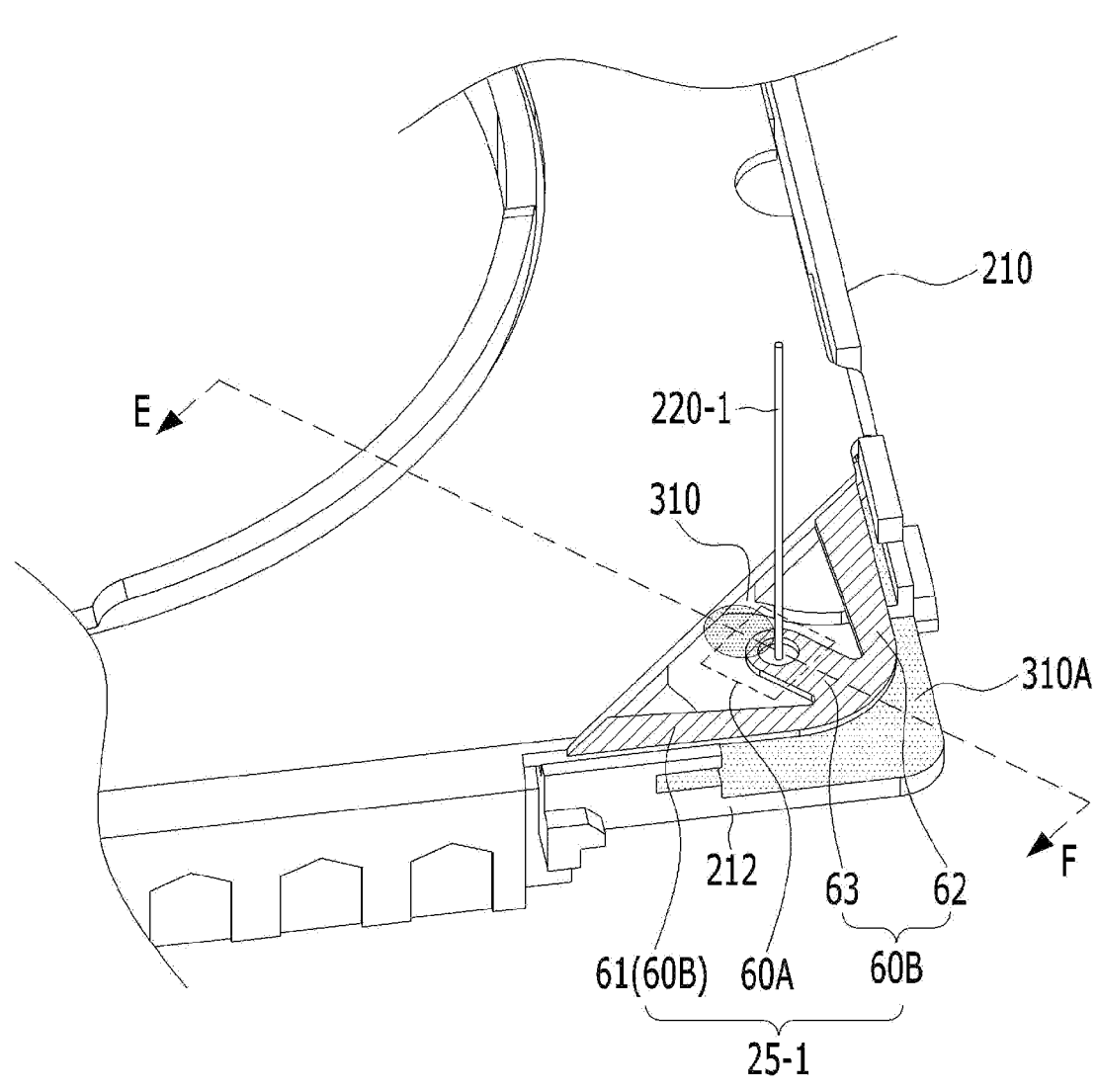
FIG. 21A is a partial perspective view of the elastic connection portion, the body of the circuit board, the base, a first damper, and a second damper according to the embodiment.
Figure 21B:
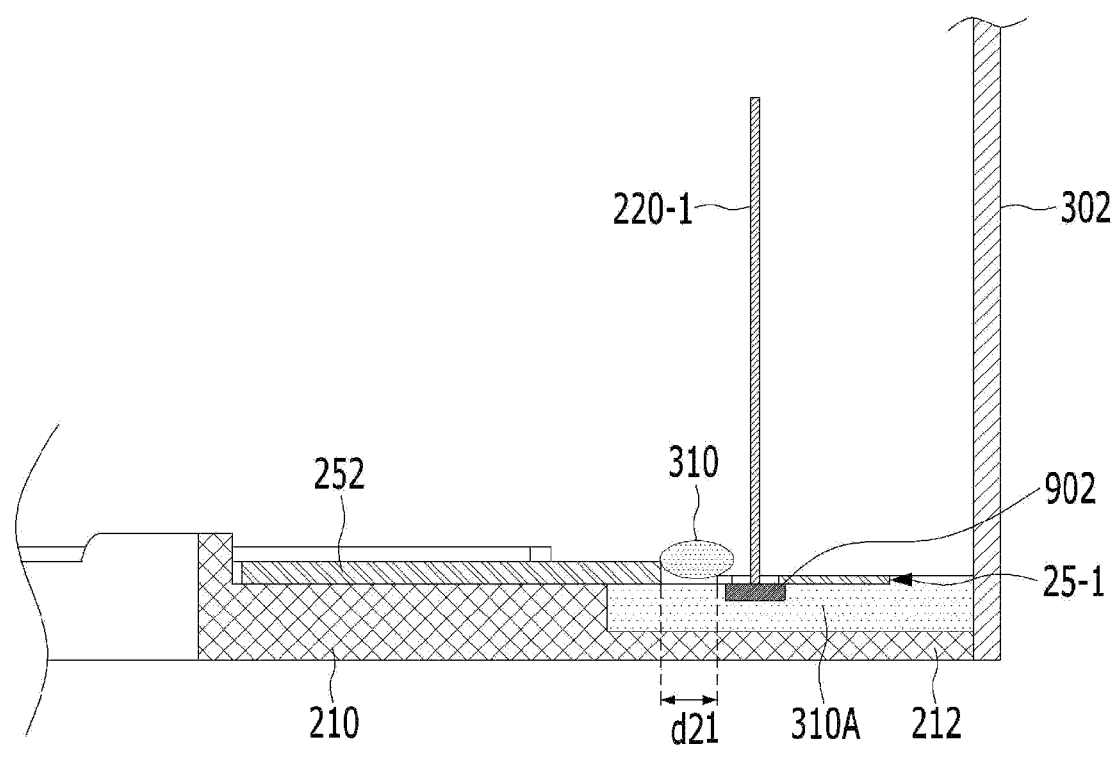
FIG. 21B is a cross-sectional view taken in the direction EF in FIG. 21A.

FIG. 21A is a partial perspective view of the elastic connection portion 25-1, the body 252 of the circuit board 250, the base 210, the first damper 310, and the second damper 310A according to the embodiment, and FIG. 21B is a cross-sectional view taken in the direction EF in FIG. 21A.

Referring to FIGS. 21A and 21B, the first damper 310 may be disposed between the body 252 (e.g. the escape portion 125A) of the circuit board 250 and the elastic connection portion 25-1 to interconnect the body and the elastic connection portion.

In an example, a portion of the first damper 310 may be disposed on, attached to, or coupled to the body 252 (e.g. the escape portion 125A) of the circuit board 250, and another portion of the first damper 310 may be disposed on, attached to, or coupled to the elastic connection portion 25-1.

In an example, another portion of the first damper 310 may be disposed on, attached to, or coupled to the third connection portion 63.

In addition, in an example, still another portion of the first damper 310 may be in contact with or attached to a portion of the support member 220-1 that is adjacent to the hole 250*a* in the elastic connection portion 25-1.

In addition, the second damper 310A may be disposed between the elastic connection portion 25-1 and the corner region 212 of the base 210 to interconnect the elastic connection portion and the corner region of the base.

The second damper 310A may be disposed between the elastic connection portion 25-1 and the stepped portion 212A of the base 210 to interconnect the elastic connection portion 25-1 and the stepped portion 212A.

In an example, the second damper 310A may be disposed between the elastic connection portion 25-1 and the first surface 21A of the stepped portion 212A of the base 210 to interconnect the elastic connection portion 25-1 and the first surface 21A.

In an example, the second damper 310A may be disposed on the stepped portion 212A of the base 210. In an example, the second damper 310A may be disposed on at least one of the first surface 21A or the second surface 21B of the stepped portion 212A.

In addition, in an example, the second damper 310A may be disposed on at least one of the third surface 21C or the fourth surface 21D of the stepped portion 212A.

In addition, the second damper 310A may be disposed on the inner surface of the corner region of the cover member 300 that corresponds to or faces the corner region 212 of the base 210. Alternatively, in the lens moving apparatus including the base 210-1 shown in FIG. 14, the second damper 310A may be disposed on the inner surface of the guide portion 218 of the base 210. In this case, the second damper 310A may be in contact with the inner surface of the guide portion 218 of the base 210.

In addition, at least one of the first damper 310 or the second damper 310A may be disposed in the hole 250a in the elastic connection portion 25-1. In addition, the second damper 310A may be disposed so as to be in contact with the solder 902.

Although only the elastic connection portion 25-1 is described with reference to FIG. 21A, the description of the first and second dampers 310 and 310A shown in FIGS. 21A and 221B may apply to elastic connection portions 25-1A, 25-1B, and 25-1C according to another embodiment or a modification.

Figure 22A:
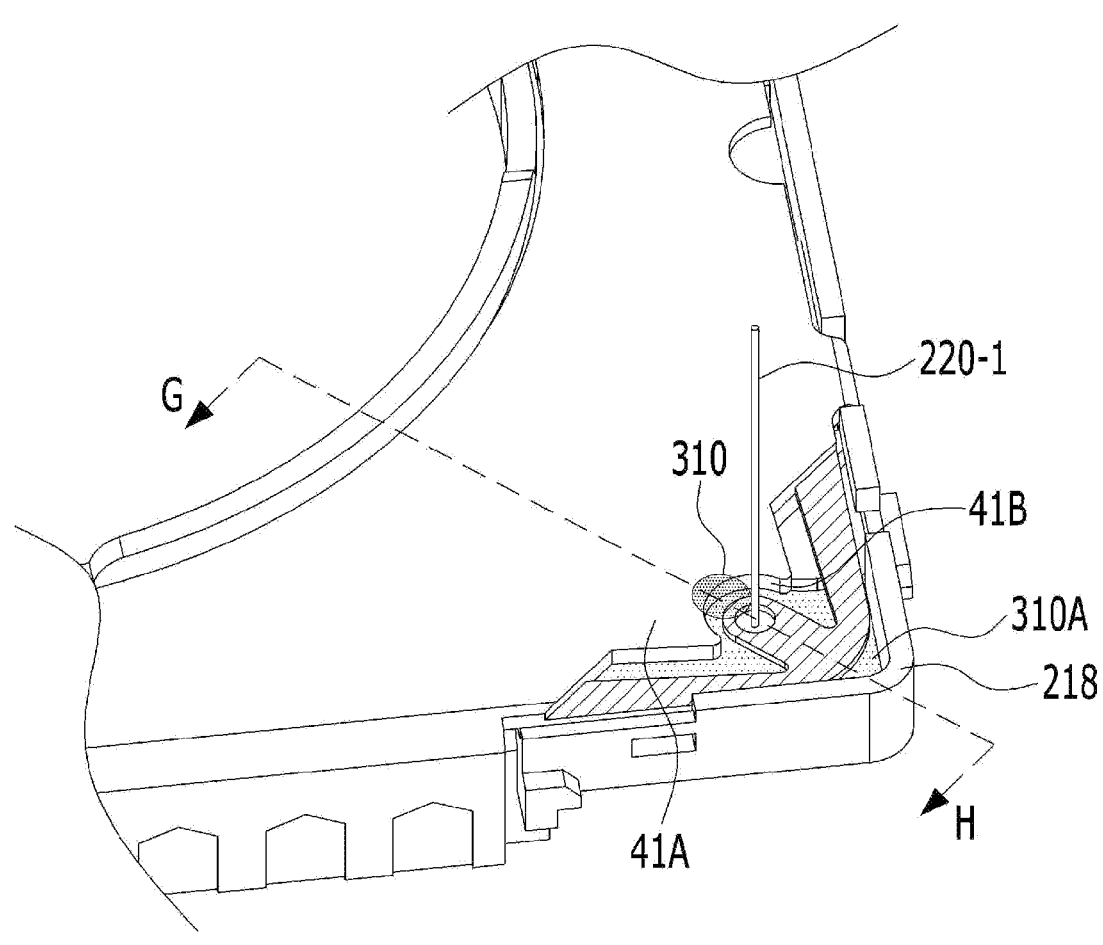
FIG. 22A is a partial perspective view of the elastic connection portion, the body of the circuit board, the base, the first damper, and the second damper according to the embodiment.
Figure 22B:
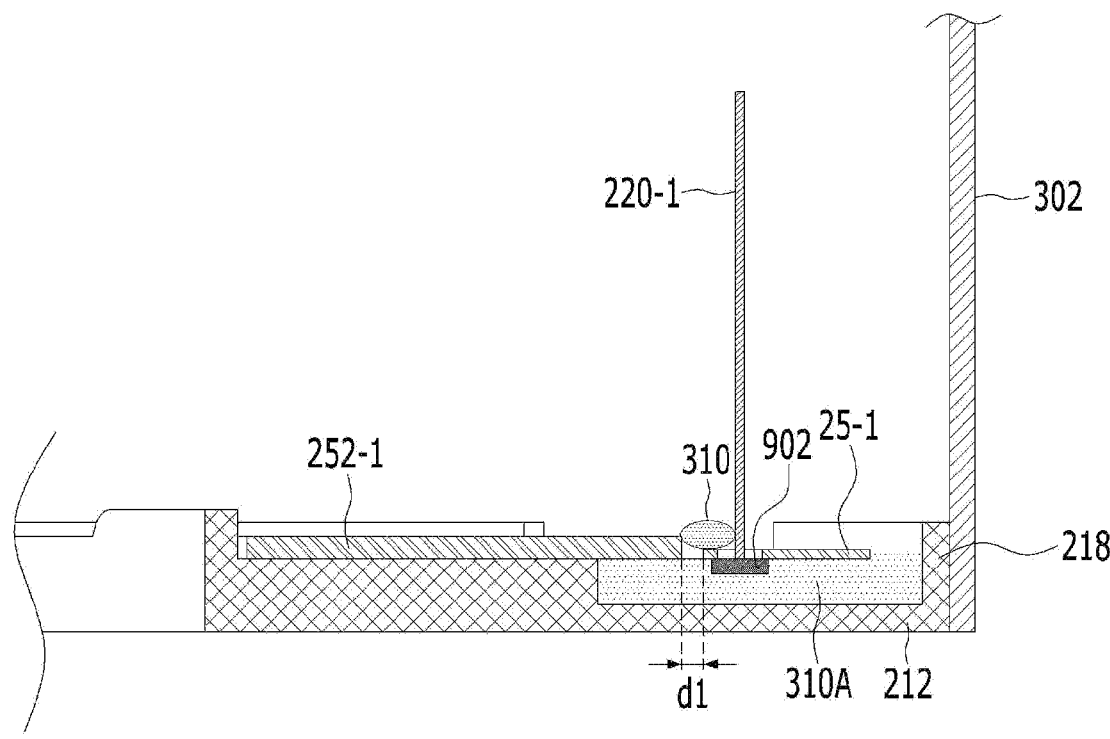
FIG. 22B is a cross-sectional view taken in the direction GH in FIG. 22A.

FIG. 22A is a partial perspective view of the elastic connection portion 25-1, the body 252-1 of the circuit board 250, the base 210-1, the first damper 310, and the second damper 310A according to the embodiment, and FIG. 22B is a cross-sectional view taken in the direction GH in FIG. 22A.

Referring to FIGS. 22A and 22B, the first damper 310 may be disposed between the extension portion 41A of the body 252-1 of the circuit board 250 and the elastic connection portion 25-1.

In an example, a portion of the first damper 310 may be disposed on, attached to, or coupled to the extension portion 41A of the body 252-1 of the circuit board 250, and another portion of the first damper 310 may be disposed on, attached to, or coupled to the elastic connection portion 25-1.

In an example, a portion of the first damper 310 may be disposed in, attached to, or coupled to the hole 41B in the extension portion 41A. The first damper 310 may be disposed on, attached to, or coupled to the side surface of the extension portion 41A that is defined by the hole 41B.

In an example, another portion of the first damper 310 shown in FIG. 22A may be disposed on, attached to, or coupled to the third connection portion 63. In addition, still another portion of the first damper 310 shown in FIG. 22A may be in contact with or attached to a portion of the support member 220-1 that is adjacent to the hole 250a in the elastic connection portion 25-1.

The description of the second damper 310 shown in FIGS. 21A and 21B may apply to the second damper 310 shown in FIGS. 22A and 22B. However, the second damper 310 shown in FIGS. 22A and 22B may be disposed between the extension portion 41A and the corner region 212 of the base 210. In an example, the second damper 310 shown in FIGS. 22A and 22B may be disposed between the extension portion 41A and the stepped portion 212A. In addition, in an example, the second damper 310 shown in FIGS. 22A and 22B may be disposed between at least one of the first surface 21A or the second surface 21B of the stepped portion 212A and the lower surface of the extension portion 41A.

Although only the elastic connection portion 25-1 is described with reference to FIG. 22A, the description of the first and second dampers 310 and 310A shown in FIGS. 22A and 22B may apply to elastic connection portions 25-1A, 25-1B, and 25-1C according to another embodiment or a modification.

The first and second dampers 310 and 310A may absorb vibration of the OIS operation unit during OIS operation, thereby inhibiting oscillation of the OIS operation unit.

In an example, the first and second dampers 310 and 310A may reduce gain at each of the primary resonance frequency and the secondary resonance frequency of the frequency response characteristics according to OIS operation, thereby inhibiting oscillation of the OIS operation unit.

In addition, the second damper 310A is disposed so as to be uniformly and evenly distributed between the elastic connection portion 25-1 and the corner region 212 of the base 210, thereby inhibiting oscillation due to OIS operation and increasing the response speed of OIS operation.

Figure 23:
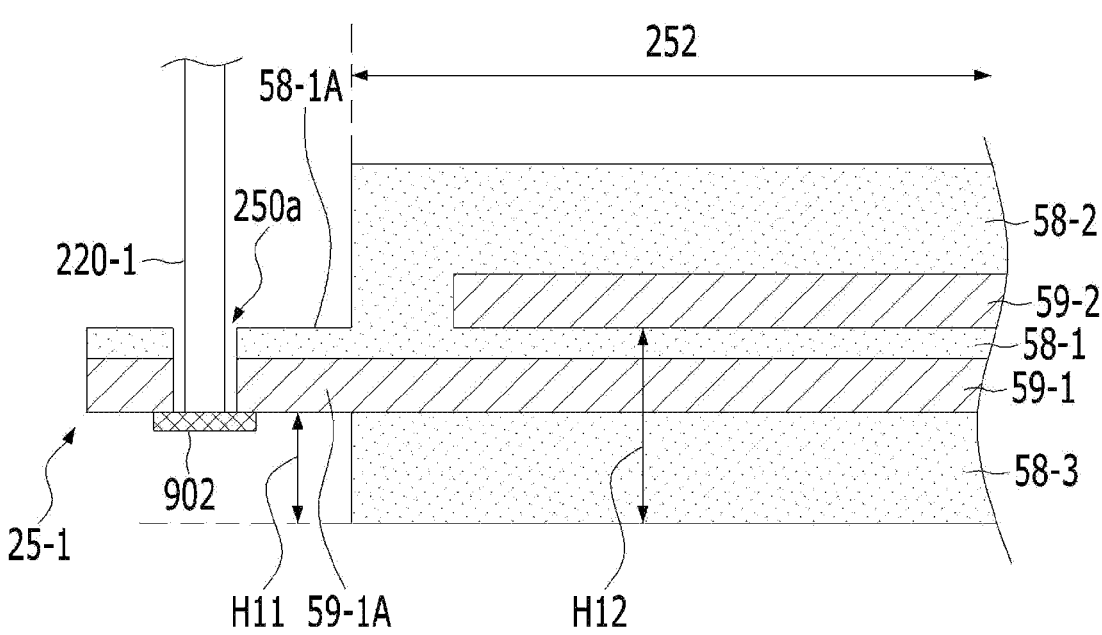
FIG. 23 is a cross-sectional view of a portion of the body of the circuit board and a portion of the elastic connection portion according to the embodiment.

FIG. 23 is a cross-sectional view of a portion of the body 252 of the circuit board 250 and a portion of the elastic connection portion 25-1 according to the embodiment.

The body 252 of the circuit board 250 may include a first conductive layer 59-1, which is disposed on the upper surface 21 of the base 210, and a second conductive layer 59-2, which is disposed on the first conductive layer 59-1.

In addition, the body 252 may include a first insulating layer 58-1, which is disposed between the first conductive layer 59-1 and the second conductive layer 59-2 and conductively isolates the first conductive layer 59-1 and the second conductive layer 59-2 from each other.

In addition, the body 252 may include a second insulating layer 58-2, which is disposed on the second conductive layer 59-2, and a third insulating layer 58-3, which is disposed under the first conductive layer 59-1.

The first conductive layer 59-1 may include a first metal, and the second conductive layer 59-2 may include a second metal. In an example, the first metal and the second metal may be different from each other.

In an example, the first metal may include at least one of copper (Cu), gold (Au), silver (Ag), or nickel (Ni). In an example, the second metal may be an alloy including at least one of the components of the first metal, for example, a copper alloy.

In another embodiment, the first metal and the second metal may be made of the same material as each other.

Each of the first to third insulating layers 58-1 to 58-3 may be made of an insulating material, such as polyimide, or may be formed as a coverlay.

In an example, the elastic connection portion 25-1 may be a portion of the first conductive layer 59-1 of the body 252, which extends or protrudes from the body 252.

In an example, the elastic connection portion 25-1 may include a 1-1$^{st}$ conductive layer 59-1A, and the 1-1$^{st}$ conductive layer 59-1A may be a portion of the first conductive layer 59-1 of the body 252, which extends or protrudes from the body 252.

In an example, the elastic connection portion 25-1 may include a 1-1$^{st}$ insulating layer 58-1A, which is disposed on the 1-1$^{st}$ conductive layer 59-1A. The 1-1$^{st}$ insulating layer 58-1A may be a portion of the first insulating layer 58-1, which extends or protrudes from the body 252.

Since a portion of the first conductive layer 59-1 serves as the elastic connection portion 25-1, the first conductive layer 59-1 may be made of an electrically conductive material that is capable of serving as an elastic member.

In an example, the first conductive layer 59-1 may be made of the same material as the upper elastic member 150 (and/or the lower elastic member 160).

In an example, the 1-1$^{st}$ conductive layer 59-1A may be made of the same material as the upper elastic member 150 (and/or the lower elastic member 150).

In an example, each of the lower surface and upper surface of the 1-1$^{st}$ conductive layer 59-1A may be located at a lower position than the lower surface of the second conductive layer 59-2 of the body 252.

In an example, the height H11 of the lower surface of the 1-1$^{st}$ conductive layer 59-1A from the lower surface of the body 252 may be lower than the height H12 of the lower surface of the second conductive layer 59-2 of the body 252 from the lower surface of the body 252 (H11<H12).

The circuit board 250 may have a hole 250a formed through the 1-1$^{st}$ conductive layer 59-1A and the 1-1$^{st}$ insulating layer 58-1A.

The other end of the support member (e.g. 220-1) may pass through the hole 250a and may be coupled to the 1-1$^{st}$ conductive layer 59-1A by means of the solder 902.

In an example, the other end of the support member (e.g. 220-1) may pass through the hole 250a and may be coupled to the lower surface of the 1-1$^{st}$ conductive layer 59-1A by means of the solder 902. In another embodiment, the 1-1$^{st}$ insulating layer 58-1A may be eliminated, the solder may be disposed on the upper surface of the 1-1$^{st}$ conductive layer 59-1A, and the 1-1$^{st}$ conductive layer 59-1A and the support member 220-1 may be coupled to each other by means of the solder. In this case, a portion of the third insulating layer 58-3 may be disposed under the 1-1$^{st}$ conductive layer 59-1A.

At least one of the first conductive layer 59-1 or the second conductive layer 59-2 of the body 252 may include a circuit pattern, a wire, or a conductive pattern.

Referring to FIG. 23, the 1-1$^{st}$ conductive layer 59-1A and the first conductive layer 59-1 of the body 252 may be conductively connected to each other. In addition, the first conductive layer 59-1 and the second conductive layer 59-2 of the body 252 may be conductively connected to each other through a via or a contact via. In an example, the via or the contact via may pass through the first insulating layer to conductively connect the first conductive layer 59-1 to the second conductive layer 59-2.

The extension portion 41A of the body 252-1 shown in FIG. 19B and the extension portion 41A1 of the body 252-2 shown in FIG. 20B may have the same configuration as the body 252 described above. In an example, each of the extension portions 41A and 41A1 may include first and second conductive layers 59-1 and 59-2. In addition, in an example, each of the extension portions 41A and 41A1 may include first to third insulating layers 58-1 to 58-3.

Although only the elastic connection portion 25-1 is described with reference to FIG. 23, the description made with reference to FIG. 23 may apply to elastic connection portions 25-1A, 25-1B, and 25-1C according to another embodiment or a modification.

In an example, the first damper 310 may be disposed on, attached to, or coupled to the 1-1$^{st}$ insulating layer 58-1A. In an example, the first damper 310 may be disposed on, attached to, or coupled to the upper surface of the 1-1$^{st}$ insulating layer 58-1A.

In an example, the second damper 310A may be disposed on, attached to, or coupled to the 1-1$^{st}$ conductive layer 59-1A. In an example, the second damper 310A may be disposed on, attached to, or coupled to the lower surface of the 1-1$^{st}$ conductive layer 59-1A. In another example, the second damper 310A may also be disposed on, attached to, or coupled to a portion of the third insulating layer 58-3.

Figure 24:
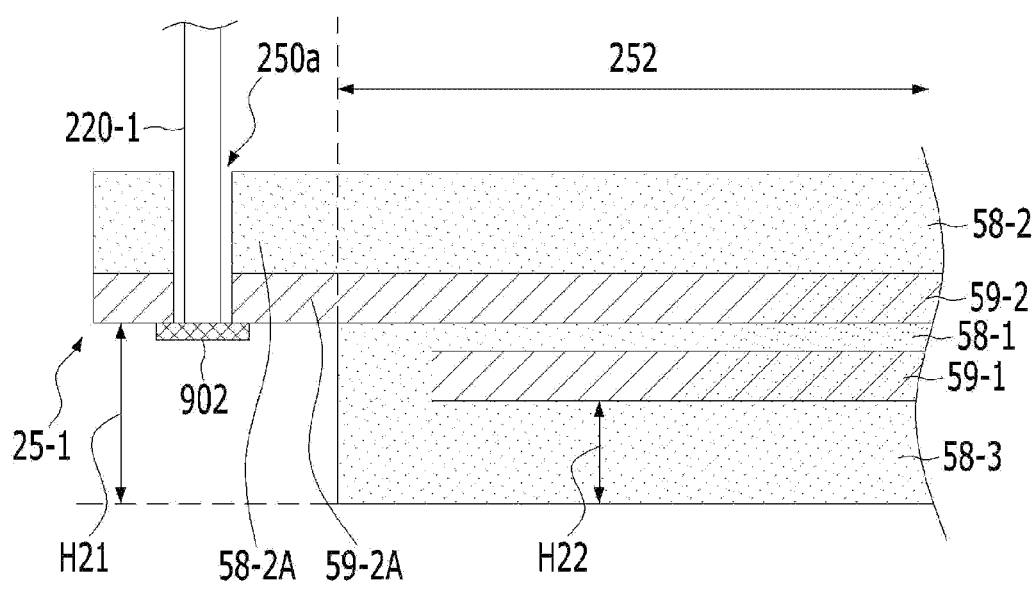
FIG. 24 is a cross-sectional view of a portion of the body of the circuit board and a portion of the elastic connection portion according to another embodiment.

FIG. 24 is a cross-sectional view of a portion of the body 252 of the circuit board 250 and a portion of the elastic connection portion 25-1 according to another embodiment.

The description made with reference to FIG. 23 may apply to the body 252 shown in FIG. 24.

The elastic connection portion 25-1 shown in FIG. 24 may be a portion of the second conductive layer 59-2 of the body 252, which extends or protrudes from the body 252.

In an example, the elastic connection portion 25-1 shown in FIG. 24 may include a 2-1$^{st}$ conductive layer 59-2A, and the 2-1$^{st}$ conductive layer 59-2A may be a portion of the second conductive layer 59-2 of the body 252, which extends or protrudes from the body 252.

In an example, the lower surface of the 2-1$^{st}$ conductive layer 59-2A may be located at a higher position than the upper surface of the first conductive layer 59-1 of the body 252. In an example, the height H21 of the lower surface of the 2-1$^{st}$ conductive layer 59-2A from the lower surface of the body 252 may be higher than the height H22 of the upper surface of the first conductive layer 59-1 of the body 252 from the lower surface of the body 252 (H21>H22).

In an example, the description of the material of the first conductive layer 59-1 shown in FIG. 23 may apply to the material of the second conductive layer 59-2 shown in FIG. 24, and the description of the material of the second conductive layer 59-2 shown in FIG. 23 may apply to the material of the first conductive layer 59-1 shown in FIG. 24.

In an example, the elastic connection portion 25-1 may include a 2-1$^{st}$ insulating layer 58-2A, which is disposed on the 2-1$^{st}$ conductive layer 59-2A. The 2-1$^{st}$ insulating layer 58-2A may be a portion of the second insulating layer 58-2, which extends or protrudes from the body 252.

The circuit board 250 may have a hole 250a formed through the 2-1$^{st}$ conductive layer 59-2A and the 2-1$^{st}$ insulating layer 58-2A.

The other end of the support member (e.g. 220-1) may pass through the hole 250a and may be coupled to the 2-1$^{st}$ conductive layer 59-2A by means of the solder 902.

In an example, the other end of the support member (e.g. 220-1) may pass through the hole 250a and may be coupled to the lower surface of the 2-1$^{st}$ conductive layer 59-2A by means of the solder 902. In another embodiment, the 2-1$^{st}$ insulating layer 58-2A may be eliminated, the solder may be disposed on the upper surface of the 2-1$^{st}$ conductive layer 59-2A, and the 2-1$^{st}$ conductive layer 59-2A and the support member 220-1 may be coupled to each other by means of the solder. In this case, at least one insulating layer may be disposed under the 2-1$^{st}$ conductive layer 59-2A.

In an example, the first damper 310 may be disposed on, attached to, or coupled to the 2-1$^{st}$ insulating layer 58-2A. In an example, the first damper 310 may be disposed on, attached to, or coupled to the upper surface of the 2-1$^{st}$ insulating layer 58-2A.

In an example, the second damper 310A may be disposed on, attached to, or coupled to the 2-1$^{st}$ conductive layer 59-2A. In an example, the second damper 310A may be disposed on, attached to, or coupled to the lower surface of the 2-1$^{st}$ conductive layer 59-2A.

As described above with reference to FIGS. 23 and 24, the elastic connection portion 25-1 may include a conductive metal material and an insulating layer, and the spring constant of the elastic connection portion 25-1 may be different from the spring constant of the upper elastic member 150. In an example, the spring constant of the elastic connection portion 25-1 may be greater than the spring constant of the upper elastic member 150. Accordingly, it is possible to lower gain of the primary resonance frequency of the frequency response characteristics according to OIS operation (or a "primary resonance point").

The embodiment has been described above as being configured such that the elastic connection portions 25-1 to 25-4 are connected to the body of the circuit board 250. However, in another embodiment, the elastic connection portions may be provided at the circuit member 231.

Figure 25:
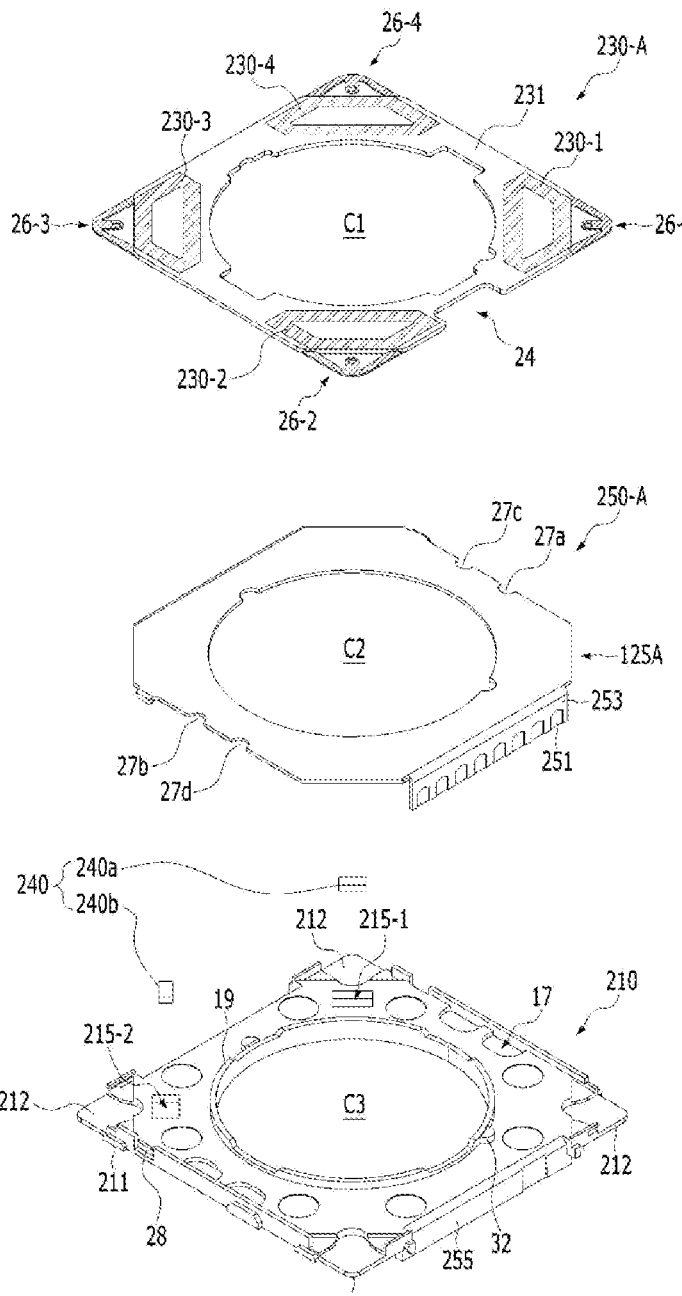
FIG. 25 is an exploded perspective view of a second coil, a circuit board, and a base according to another embodiment.

FIG. 25 is an exploded perspective view of a second coil 230-A, a circuit board 250-A, and a base 210 according to another embodiment.

Referring to FIGS. 13A and 25, the circuit board 250-A shown in FIG. 25 may have a structure in which the elastic connection portions 25-1 to 25-4 are eliminated from the circuit board 250 shown in FIG. 13A.

The second coil 230-A shown in FIG. 25 may include a circuit member 231 and elastic connection portions 26-1 to 26-4 connected to the circuit member 231. The elastic connection portions 26-1 to 26-4 may extend or protrude from an escape portion 23 of the circuit member 231.

The description of the elastic connection portions 25-1 to 25-4 may apply to the elastic connection portions 26-1 to 26-4 shown in FIG. 25.

The other ends of the support members 220-1 to 220-4 may be coupled to the elastic connection portions 26-1 to 26-4 by means of solder or a conductive adhesive member.

The circuit member 231 may include a body having a bore C1 formed therein, and the elastic connection portions 26-1 to 26-4 may extend or protrude from the body. The circuit member 231 may be provided at the corner thereof with an outer surface corresponding to the outer connection surface (or the fifth outer surface) 33-5 of the circuit board 250 shown in FIG. 18B.

The description made with reference to FIGS. 18A to 24 may apply to the circuit member 231 and the elastic connection portions 26-1 to 26-4.

Meanwhile, the lens moving apparatus according to the above-described embodiment may be used in various fields, for example, a camera module or an optical device.

Figure 26:
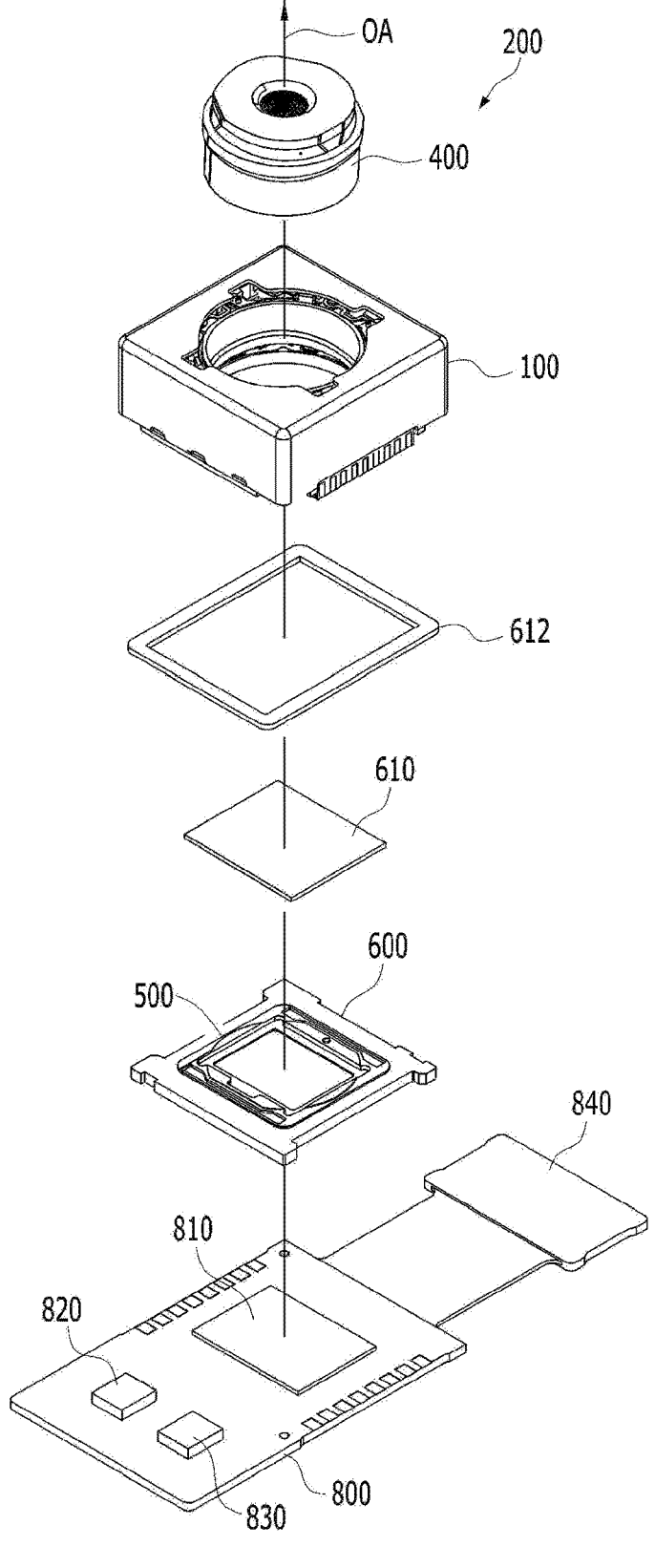
FIG. 26 is an exploded perspective view of a camera module according to an embodiment.

FIG. 26 is an exploded perspective view of a camera module 200 according to an embodiment.

Referring to FIG. 26, the camera module may include a lens barrel 400, the lens moving apparatus 100, an adhesive member 612, a filter 610, a first holder 600, a second holder 800, an image sensor 810, a motion sensor 820, a controller 830, and a connector 840. In another embodiment, at least one of the motion sensor 820 or the controller 830 may be omitted.

The lens barrel 400 may be mounted in the bobbin 110 of the lens moving apparatus 100.

The first holder 600 may be disposed under the base 210 of the lens moving apparatus 100. The filter 610 may be mounted on the first holder 600, and the first holder 600 may include a protruding portion 500 on which the filter 610 is seated.

The adhesive member 612 may couple or attach the base 210 of the lens moving apparatus 100 to the first holder 600. In addition to the attachment function described above, the adhesive member 710 may serve to inhibit foreign substances from entering the lens moving apparatus 100.

The adhesive member 612 may be, for example, epoxy, a thermosetting adhesive, an ultraviolet curable adhesive, or the like.

The filter 610 may serve to inhibit light within a specific frequency band, having passed through the lens barrel 400, from being introduced into the image sensor 810. The filter 610 may be an infrared cut filter, but the disclosure is not limited thereto. Here, the filter 610 may be disposed parallel to the X-Y plane.

The region of the first holder 600 in which the filter 610 is mounted may be provided with a bore to allow the light that has passed through the filter 610 to be introduced into the image sensor 810.

The second holder 800 may be disposed under the first holder 600, and the image sensor 810 may be mounted on the second holder 600. The image sensor 810 is a part into which the light that has passed through the filter 610 is introduced so as to form an image contained in the light.

The second holder 800 may include various circuits, elements, and a controller in order to convert the image, formed on the image sensor 810, into electrical signals and to transmit the electrical signals to an external device.

The second holder 800 may be embodied as a circuit board on which the image sensor is mounted, on which a circuit pattern is formed, and to which various elements are coupled. The first holder 600 may be referred to as a "holder" or a "sensor base", and the second holder 800 may be referred to as a "board" or a "circuit board".

The image sensor 810 may receive an image contained in the light introduced through the lens moving apparatus 100, and may convert the received image into electrical signals.

The filter 610 and the image sensor 810 may be disposed so as to be spaced apart from each other while facing each other in the first direction.

The motion sensor 820 may be mounted on the second holder 800, and may be conductively connected to the controller 830 through the circuit pattern formed on the second holder 800.

The motion sensor 820 outputs rotational angular speed information regarding the movement of the camera module 200. The motion sensor 820 may be embodied as a two-axis or three-axis gyro sensor or an angular speed sensor.

The controller 830 may be mounted on the second holder 800, and may be conductively connected to the second position sensor 240 and the second coil 230 of the lens moving apparatus 100.

In an example, the second holder 800 may be conductively connected to the circuit board 250 of the lens moving apparatus 100, and the controller 830 mounted on the second holder 800 may be conductively connected to the second position sensor 240 and the second coil 230 through the circuit board 250.

The controller 830 may transmit a clock signal SCL, a data signal SDA, and power signals VDD and GND for I2C communication with the first position sensor 120, and may receive a clock signal SCL and a data signal SDA from the first position sensor 170.

In addition, the controller 830 may control a drive signal for performing handshake correction for the OIS operation unit of the lens moving apparatus 100 based on output signals provided from the second position sensor 240 of the lens moving apparatus 100.

The connector 840 may be conductively connected to the second holder 800, and may have a port for conductive connection to an external device.

In addition, the lens moving apparatus 100 according to the embodiment may be included in an optical instrument for the purpose of forming an image of an object present in a space using reflection, refraction, absorption, interference, and diffraction, which are characteristics of light, for the purpose of increasing visibility, for the purpose of recording and reproduction of an image using a lens, or for the purpose of optical measurement or image propagation or transmission. In an example, the optical device according to the embodiment may be a cellular phone, a mobile phone, a smartphone, a portable smart device, a digital camera, a laptop computer, a digital broadcasting terminal, a personal digital assistant (PDA), a portable multimedia player (PMP), a navigation device, etc., without being limited thereto, and may also be any of devices for capturing images or pictures.

Figure 27:
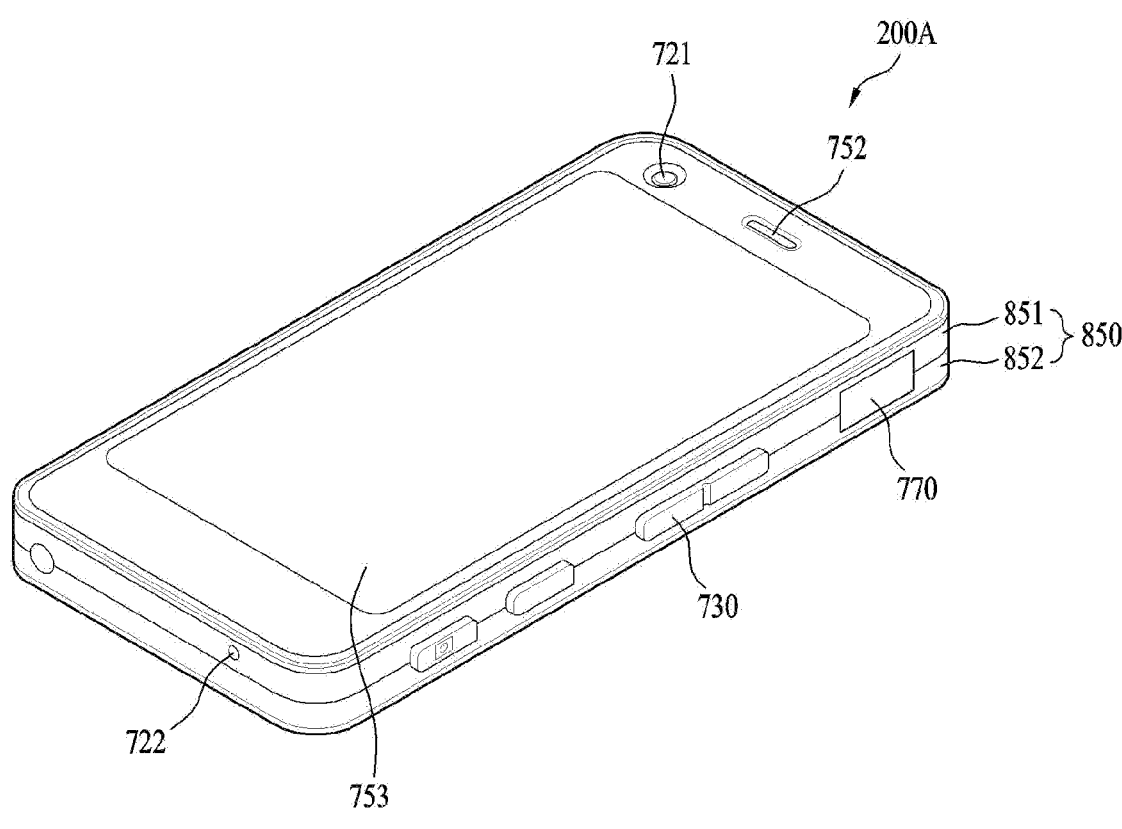
FIG. 27 is a perspective view of a portable terminal according to an embodiment.
Figure 28:
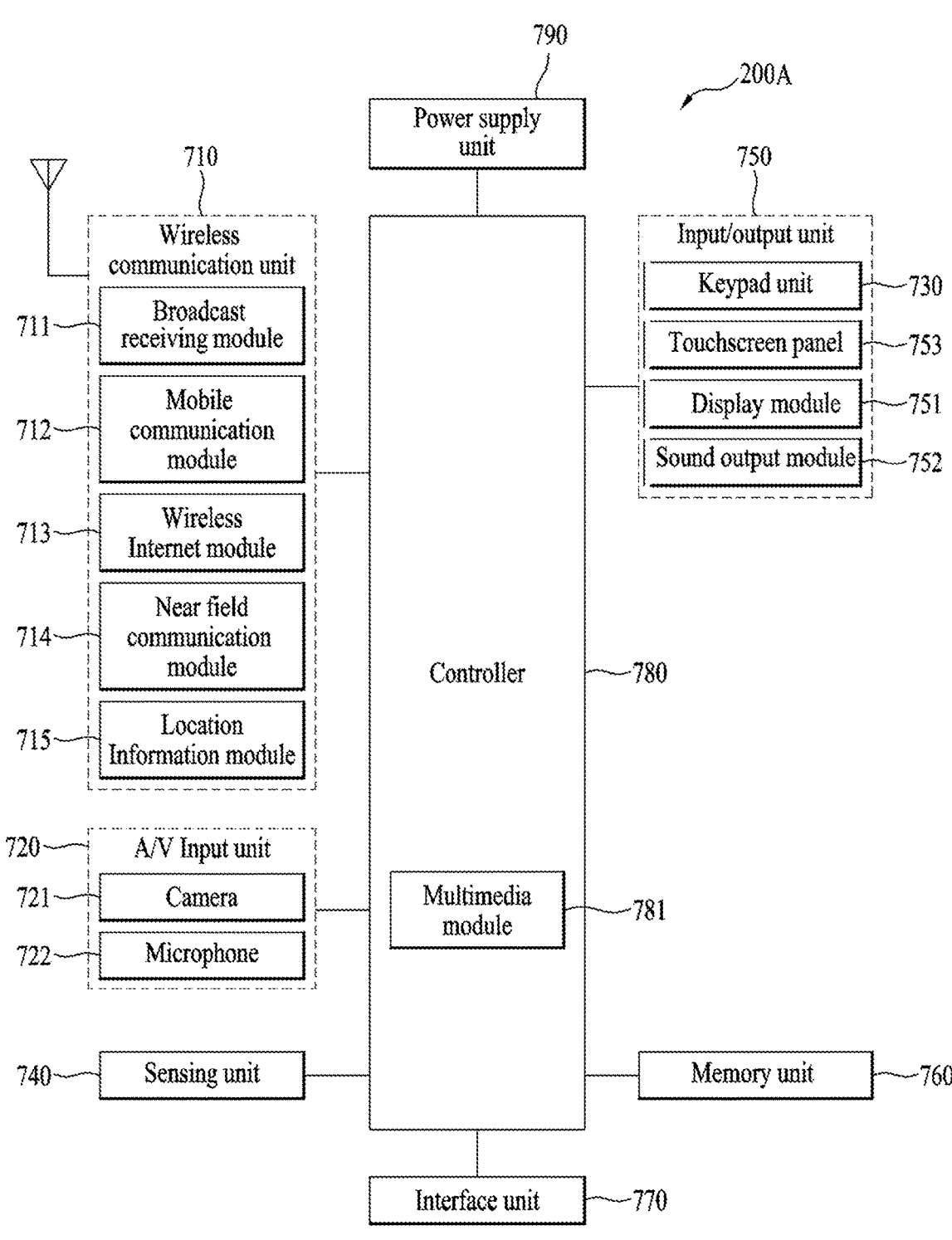
FIG. 28 is a configuration diagram of the portable terminal shown in FIG. 27.

FIG. 27 is a perspective view of a portable terminal 200A according to an embodiment, and FIG. 28 is a configuration diagram of the portable terminal shown in FIG. 27.

Referring to FIGS. 27 and 28, the portable terminal 200A (hereinafter referred to as a "terminal") may include a body 850, a wireless communication unit 710, an A/V input unit 720, a sensing unit 740, an input/output unit 750, a memory 760, an interface 770, a controller 780, and a power supply 790.

The body 850 shown in FIG. 27 may have a bar shape, without being limited thereto, and may be any of various types such as, for example, a slide type, a folder type, a swing type, or a swivel type, in which two or more sub-bodies are coupled so as to be movable relative to each other.

The body 850 may include a case (a casing, a housing, a cover, or the like) defining the external appearance thereof. In an example, the body 850 may be divided into a front case 851 and a rear case 852. A variety of electronic components of the terminal may be mounted in the space formed between the front case 851 and the rear case 852.

The wireless communication unit 710 may include one or more modules, which enable wireless communication between the terminal 200A and a wireless communication system or between the terminal 200A and a network in which the terminal 200A is located. In an example, the wireless communication unit 710 may include a broadcast reception module 711, a mobile communication module 712, a wireless Internet module 713, a nearfield communication module 714, and a location information module 715.

The audio/video (A/V) input unit 720 serves to input audio signals or video signals, and may include a camera 721 and a microphone 722.

The camera 721 may be a camera 200 including the camera module 200 according to the embodiment.

The sensing unit 740 may sense the current state of the terminal 200A, such as the open or closed state of the terminal 200A, the position of the terminal 200A, the presence or absence of a user's touch, the orientation of the terminal 200A, or the acceleration/deceleration of the terminal 200A, and may generate a sensing signal to control the operation of the terminal 200A. In an example, when the terminal 200A is a slide-type phone, whether the slide-type phone is open or closed may be detected. In addition, the sensing unit 740 serves to sense whether power is supplied from the power supply 790 or whether the interface 770 is coupled to an external device.

The input/output unit 750 serves to generate visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals. In an example, the display module 751 may include at least one of a liquid crystal display, a thin-film transistor liquid crystal display, an organic light-emitting diode, a flexible display, or a 3D display.

The sound output module 752 may output audio data received from the wireless communication unit 710 in a call-signal reception mode, a call mode, a recording mode, a voice recognition mode, or a broadcast reception mode, or may output audio data stored in the memory 760.

The touchscreen panel 753 may convert variation in capacitance, caused by a user's touch on a specific region of a touchscreen, into electrical input signals.

The memory 760 may store programs for the processing and control of the controller 780, and may temporarily store input/output data (e.g. a phone book, messages, audio, still images, pictures, and moving images). In an example, the memory 760 may store images captured by the camera 721, for example, pictures or moving images.

The interface 770 serves as a passage for connection between the terminal 200A and an external device. The interface 770 may receive data or power from the external device, and may transmit the same to respective components inside the terminal 200A, or may transmit data inside the terminal 200A to the external device. In an example, the interface 770 may include a wired/wireless headset port, an external charger port, a wired/wireless data port, a memory card port, a port for connection of a device having an identification module, an audio input/output (I/O) port, a video input/output (I/O) port, and an earphone port.

The controller 780 may control the overall operation of the terminal 200A. In an example, the controller 780 may perform control and processing related to voice calls, data communication, and video calls.

The controller 780 may include a multimedia module 781 for multimedia playback. The multimedia module 781 may be provided inside the controller 180, or may be provided separately from the controller 780.

The controller 780 may perform pattern recognition processing, by which writing or drawing input to the touchscreen is perceived as characters or images.

In place of the controller 830 of the camera module 200, the controller 780 of the optical device 200A may serve as the controller 830 of the camera module 200.

The power supply 790 may supply power required to operate the respective components upon receiving external power or internal power under the control of the controller 780.

The features, structures, effects, and the like described above in the embodiments are included in at least one embodiment of the present disclosure, but are not necessarily limited to only one embodiment. Furthermore, the features, structures, effects, and the like exemplified in the respective embodiments may be combined with other embodiments or modified by those skilled in the art. Therefore, content related to such combinations and modifications should be construed as falling within the scope of the present disclosure.

INDUSTRIAL APPLICABILITY

Embodiments may be used for a lens moving apparatus capable of alleviating or reducing the stress applied to a support member, a camera module including the same, and an optical device.

The invention claimed is:

1. A lens moving apparatus comprising:
   a housing;
   a bobbin disposed in the housing;
   a first coil disposed on the bobbin;
   a magnet disposed in the housing so as to correspond to the first coil;
   an upper elastic member coupled to an upper portion of the bobbin and to an upper portion of the housing;

a second coil disposed under the housing so as to correspond to the magnet in an optical-axis direction;

a circuit board comprising a body disposed under the second coil and an elastic connection portion extending from the body;

a base disposed under the body of the circuit board; and a support member comprising one end coupled to the upper elastic member and another end coupled to the elastic connection portion, wherein the elastic connection portion comprises a coupling portion coupled to the another end of the support member and a connection portion connecting the body to the coupling portion, and wherein the connection portion comprises a portion formed to decrease in width in a direction from the body toward the support member.

2. The lens moving apparatus according to claim 1, wherein the elastic connection portion extends from a corner of the body.

3. The lens moving apparatus according to claim 1, wherein the base comprises a stepped portion comprising a first surface having a first height difference from an upper surface of the base on which the body is disposed, and wherein the elastic connection portion is spaced apart from the first surface of the stepped portion, and overlaps the first surface of the stepped portion in the optical-axis direction.

4. The lens moving apparatus according to claim 3, wherein the stepped portion is formed at a corner region of the base, and wherein the base comprises a guide portion protruding from the first surface in an upward direction or the optical-axis direction to surround the corner region.

5. The lens moving apparatus according to claim 1, wherein the circuit board comprises a terminal portion extending from the body and comprising a terminal, and wherein the elastic connection portion conductively connects the support member to the terminal.

6. The lens moving apparatus according to claim 1, wherein the elastic connection portion has a length shorter than a length of the body in the optical-axis direction.

7. The lens moving apparatus according to claim 1, wherein the elastic connection portion is a leaf spring.

8. The lens moving apparatus according to claim 1, comprising a first damper disposed between the elastic connection portion and the body to connect the elastic connection portion to the body.

9. The lens moving apparatus according to claim 3, comprising a second damper disposed between the elastic connection portion and the first surface to connect the elastic connection portion to the first surface.

10. The lens moving apparatus according to claim 8, wherein the body comprises an extension portion extending toward the elastic connection portion and overlapping the base in the optical-axis direction, and wherein the first damper connects the extension portion and the elastic connection portion.

11. The lens moving apparatus according to claim 10, wherein the extension portion has a hole formed in one end thereof, and the hole comprises an opening, and wherein at least part of the elastic connection portion is disposed in the hole through the opening.

12. The lens moving apparatus according to claim 1, wherein the body comprises:

a first conductive layer disposed on an upper surface of the base;

a second conductive layer disposed on the first conductive layer; and a first insulating layer disposed between the first conductive layer and the second conductive layer.

13. The lens moving apparatus according to claim 12, wherein the elastic connection portion is a portion of the first conductive layer extending from the body.

14. The lens moving apparatus according to claim 12, wherein the elastic connection portion is a portion of the second conductive layer extending from the body.

15. The lens moving apparatus according to claim 1, wherein the connection portion comprises:

a first connection portion extending from one region of a corner of the body;

a second connection portion extending from another region of the corner of the body; and a third connection portion connecting to at least one of the first connection portion or the second connection portion and connected to the coupling portion.

16. The lens moving apparatus according to claim 1, wherein the connection portion comprises:

a first connection portion extending from one region of a corner of the body; and a second connection portion connecting the first connection portion and the coupling portion.

17. The lens moving apparatus according to claim 1, wherein the another end of the support member is located inside of the connection portion.

18. A lens moving apparatus comprising:

a housing;

a bobbin disposed in the housing;

a first coil disposed on the bobbin;

a magnet disposed in the housing so as to correspond to the first coil;

an upper elastic member coupled to an upper portion of the bobbin and to an upper portion of the housing;

a second coil disposed under the housing so as to correspond to the magnet in an optical-axis direction;

a circuit board disposed under the second coil;

an elastic connection portion extending from the circuit board and comprising a coupling portion;

a support member comprising one end coupled to the upper elastic member and another end coupled to the coupling portion of the elastic connection portion; and a damper disposed between the elastic connection portion and the circuit board to connect the elastic connection portion to the circuit board, wherein the connection portion comprises:

a first connection portion extending from one region of a corner of the circuit board;

a second connection portion extending from another region of the corner of the circuit board; and a third connection portion connecting to at least one of the first connection portion or the second connection portion and connected to the coupling portion.

19. A lens moving apparatus comprising:

a housing;

a bobbin disposed in the housing;

a first coil disposed on the bobbin;

a magnet disposed in the housing so as to correspond to the first coil;

an upper elastic member coupled to an upper portion of the bobbin and to an upper portion of the housing;

a second coil disposed under the housing so as to correspond to the magnet in an optical-axis direction;

a circuit board comprising a body disposed under the
second coil and an elastic connection portion extending
from the body;

a support member comprising one end coupled to the
upper elastic member and another end coupled to the
elastic connection portion, wherein the body comprises a first conductive layer, a
second conductive layer disposed on the first conduc-
tive layer, and an insulating layer disposed between the
first conductive layer and the second conductive layer, wherein the elastic connection portion is a portion of the
first conductive layer extending from the body, and wherein the connection portion comprises:
a coupling portion coupled to the another end of the
support member;
a first connection portion extending from one region of
a corner of the body; and
a second connection portion connecting the first con-
nection portion and the coupling portion.

20. A camera device comprising:
a lens;
the lens moving apparatus according to claim 1; and
an image sensor.

\* \* \* \* \*